(12) United States Patent
Hayashi et al.

(10) Patent No.: US 6,667,120 B2
(45) Date of Patent: Dec. 23, 2003

(54) MAGNETIC RECORDING MEDIUM, NON-MAGNETIC ACICULAR COMPOSITE PARTICLES AND PROCESS FOR PRODUCING THE PARTICLES

(75) Inventors: Kazuyuki Hayashi, Hiroshima (JP); Keisuke Iwasaki, Hiroshima (JP); Hiroko Morii, Hiroshima (JP)

(73) Assignee: Todyo Kogyo Corporation, Hiroshima-ken (JP)

( * ) Notice: Subject to any disclaimer, the term of this patent is extended or adjusted under 35 U.S.C. 154(b) by 21 days.

(21) Appl. No.: 09/957,236

(22) Filed: Sep. 21, 2001

(65) Prior Publication Data

US 2002/0061423 A1 May 23, 2002

(30) Foreign Application Priority Data

Sep. 26, 2000 (JP) ........................ 2000-293172
Jun. 1, 2001 (JP) ........................ 2001-167381

(51) Int. Cl.$^7$ ................................ B32B 5/16
(52) U.S. Cl. ................ 428/694 BN; 428/405; 428/694 BS
(58) Field of Search ............... 428/694 BN, 694 BS, 428/405

(56) References Cited

U.S. PATENT DOCUMENTS

| | | | |
|---|---|---|---|
| 6,352,776 B1 * | 3/2002 | Hayashi et al. | 428/403 |
| 6,416,864 B1 * | 7/2002 | Hayashi et al. | 428/403 |
| 6,420,030 B1 * | 7/2002 | Hayashi et al. | 428/407 |
| 6,440,561 B2 * | 8/2002 | Hayashi et al. | 428/407 |
| 6,475,687 B2 * | 11/2002 | Hayashi et al. | 430/106.2 |

* cited by examiner

Primary Examiner—H. Thi Le
(74) Attorney, Agent, or Firm—Nixon & Vanderhye

(57) ABSTRACT

A magnetic recording medium of the present invention comprises a non-magnetic base film; a non-magnetic undercoat layer formed on the non-magnetic base film, comprising non-magnetic acicular composite particles and a binder resin; and a magnetic recording layer formed on the non-magnetic undercoat layer, comprising magnetic particles and a binder resin, the non-magnetic acicular composite particles having an average major axis diameter of 0.01 to 0.3 $\mu$m, comprising:
acicular hematite particles or acicular iron oxide hydroxide particles as non-magnetic core particles,
a coating formed on surface of the non-magnetic core particles, comprising at least one organosilicon compound selected from the group consisting of: (1) organosilane compounds obtainable from alkoxysilane compounds, and (2) polysiloxanes or modified polysiloxanes, and
a phthalocyanine-based pigment coat formed on the organosilicon compound coating layer, in an amount of from 1 to 100 parts by weight based on 100 parts by weight of the non-magnetic core particles.

53 Claims, No Drawings

MAGNETIC RECORDING MEDIUM, NON-MAGNETIC ACICULAR COMPOSITE PARTICLES AND PROCESS FOR PRODUCING THE PARTICLES

BACKGROUND OF THE INVENTION

The present invention relates to a magnetic recording medium, non-magnetic acicular composite particles and a process for producing the non-magnetic acicular composite particles, and more particularly, to a magnetic recording medium having a high strength, a smooth surface and a lower light transmittance; non-magnetic acicular composite particles having an excellent dispersibility in vehicle and a high resin adsorptivity; a process for producing the non-magnetic acicular composite particles; and a non-magnetic substrate for magnetic recording media having a high strength, a smooth surface and a lower light transmittance.

With a development of miniaturized and lightweight video or audio magnetic recording and reproducing apparatuses for long-time recording, magnetic recording media such as a magnetic tape and magnetic disk have been increasingly and strongly required to have a higher performance, namely, a higher recording density, higher output characteristic, in particular, an improved frequency characteristic and a lower noise level.

Video tapes have recently been required more and more to have a higher picture quality, and the frequencies of carrier signals recorded in recent video tapes are higher than those recorded in conventional video tapes. In other words, the signals in the short-wave region have come to be used, and as a result, the magnetization depth from the surface of a magnetic tape has come to be remarkably small.

With respect to short wavelength signals, a reduction in the thickness of a magnetic recording layer is also strongly demanded in order to improve the high output characteristics, especially, the S/N ratio of a magnetic recording medium.

With a recent tendency toward reduction in thickness of the magnetic recording layer, magnetic recording media themselves tend to be poor in durability. Therefore, the magnetic recording media have been strongly required to have an improved durability in themselves.

As to this fact, in Japanese Patent Application Laid-Open (KOKAI) No. 5-298679(1993), it is described that ". . . With recent remarkable development of magnetic recording techniques, higher image quality and higher sound quality have been required. For satisfying these requirements, it has been attempted to improve the electromagnetic performance of magnetic recording media, especially to reduce the size of ferromagnetic particles and increase the density of the particles in the magnetic recording layer. In addition, the magnetic tape has been required to have a smoother surface in order to reduce its noise level and improve its C/N ratio. . . . However, during running of the magnetic tape within a magnetic recording/reproducing device, the friction coefficient of contact between the magnetic recording layer of the magnetic tape and the device is considerably increased, so that the magnetic recording layer tends to be severely damaged or peeled from the magnetic tape even after used for a short period of time. In particular, in the case of video tapes, since the magnetic recording medium is traveled at a high speed while contacting with a video head, ferromagnetic particles contained therein tend to be fallen off from the magnetic recording layer, resulting in clogging of the magnetic head. Therefore, the magnetic recording medium has been strongly required to show an improved running durability . . . ".

Further, in order to achieve the reduction in thickness of the magnetic recording layer, it is necessary to smoothen the surface of the magnetic recording layer and lessen the unevenness in thickness of the magnetic recording layer. For this purpose, the base film of the magnetic tape is also required to have a smooth surface.

In the progress of reduction in thickness of the magnetic recording layer, such a magnetic recording medium having at least one undercoat layer formed on a non-magnetic base film which comprises a binder resin and non-magnetic particles dispersed in the binder resin such as acicular hematite particles (hereinafter referred to as "non-magnetic undercoat layer"), has been proposed and practically used in order to solve problems such as poor surface properties, deteriorated electromagnetic performance, etc. of the magnetic recording layer (Japanese Patent Publication (KOKOKU) No. 6-93297(1994) and Japanese Patent Application Laid-Open (KOKAI) Nos. 62-159338(1987), 63-187418(1988), 4-167225(1992), 4-325915(1992), 5-73882(1993) and 5-182177(1993)).

However, when the magnetic recording layer is formed on such a non-magnetic undercoat layer, the obtained magnetic recording medium is deteriorated in durability though the surface smoothness thereof is improved.

As to this fact, in Japanese Patent Application Laid-Open (KOKAI) No. 5-182177(1993), it is described that ". . . Although the adverse influence of rough surface of the base film is avoided by forming a thick non-magnetic undercoat layer on the base film and then forming the magnetic layer as an upper layer thereon, there still remain problems such as head abrasion and poor durability. The reason therefor is considered to be that since thermosetting resins have been conventionally used as the binder resin of the non-magnetic undercoat layer, the frictional contact between the magnetic layer and the magnetic head or other members is performed under a non-buffering condition because of the hardened undercoat layer, or the magnetic recording medium having such a undercoat layer shows a somewhat poor flexibility . . . ".

The end portion of a magnetic recording medium such as a magnetic tape, especially, a video tape is judged by detecting a portion of the magnetic recording medium at which the light transmittance is large by a video deck. If the light transmittance of the whole part of a magnetic recording layer is made large by the production of a thinner magnetic recording medium or the ultrafine magnetic particles dispersed in the magnetic recording layer, it is difficult to detect the portion having a large light transmittance by a video deck. For reducing the light transmittance of the whole part of a magnetic recording layer, carbon black fine particles or the like is added to the magnetic recording layer. It is, therefore, essential to add carbon black or the like to a magnetic recording layer in the present video tapes.

However, addition of a large amount of non-magnetic particles such as carbon black fine particles impairs not only the enhancement of the magnetic recording density but also the development of a thinner recording layer. In order to reduce the magnetization depth from the surface of the magnetic tape and to produce a thinner magnetic recording layer, it is strongly demanded to reduce, as much as possible, the quantity of non-magnetic particles such as carbon black fine particles which are added to a magnetic recording layer.

Consequently, it has been strongly demanded to provide a magnetic recording medium capable of exhibiting a low light transmittance even when the amount of carbon black fine particles added to a magnetic recording layer thereof is reduced as low as possible.

Hitherto, various attempts have been conducted in order to improve properties of the non-magnetic particles. For example, there are known non-magnetic particles coated with a surface coating layer composed of a Si compound or Al compound (Japanese Patent Application Laid-Open (KOKAI) Nos. 5-182177(1993), 5-347017(1993), 6-60362 (1994), 10-21532(1998) and 10-320753(1998), etc.); and non-magnetic particles on the surface of which fine particles composed of an Al compound or Si compound are adhered (Japanese Patent Application Laid-Open (KOKAI) No. 7-192248(1995), etc.).

Further, in order to reduce a light transmittance of the magnetic recording medium while lessening the amount of carbon black fine particles added to the magnetic recording layer, it is also known to use acicular non-magnetic particles obtained by adhering 1 to 20 parts by weight of carbon black onto 100 parts by weight of acicular hematite particles or acicular iron oxide hydroxide particles, as non-magnetic particles for a non-magnetic undercoat layer (Japanese Patent Application Laid-Open (KOKAI) No. 11-242812 (1999)).

It has been presently required to provide non-magnetic particles for a non-magnetic undercoat layer which is capable of producing such a magnetic recording medium exhibiting not only excellent durability and surface smoothness, but also a low light transmittance. However, such non-magnetic particles are not known conventionally.

That is, the non-magnetic particles produced by the methods described in Japanese Patent Application Laid-Open (KOKAI) Nos. 5-182177(1993), 5-347017(1993), 6-60362 (1994), 7-192248(1995), 10-21532(1998) and 10-320753 (1998), are improved in dispersibility. However, the obtained magnetic recording medium fails to exhibit a low light transmittance and a sufficient durability.

Also, the non-magnetic particles produced by the method described in Japanese Patent Application Laid-Open (KOKAI) No. 11-242812(1999) are improved in light transmittance and dispersibility since carbon black is adhered onto the surface thereof. However, the obtained magnetic recording medium fails to exhibit a sufficient improvement of the durability.

As a result of the present inventors' earnest studies for solving the above conventional problems, it has been found that by using as non-magnetic particles non-magnetic acicular composite particles which comprise acicular hematite particles or acicular iron oxide hydroxide particles as core particles; a coating layer formed on the surface of each core particle, at least one organosilicon compound; and a phthalocyanine-based pigment coat formed on at least a part of the surface of the coating layer, and which have an average major axial diameter of 0.01 to 0.3 µm, the obtained magnetic recording medium can exhibit a high strength, a smooth surface, a lower light transmittance and an excellent durability. The present invention has been attained on the basis of this finding.

SUMMARY OF THE INVENTION

An object of the present invention is to provide a magnetic recording medium exhibiting a high strength, a smooth surface, an excellent durability and a lower light transmittance.

Another object of the present invention is to provide non-magnetic acicular composite particles exhibiting an excellent dispersibility in vehicle and an improved adsorptivity to resins used in a non-magnetic undercoat layer.

To accomplish the aim, in a first aspect of the present invention, there is provided a magnetic recording medium comprising:

a non-magnetic base film;

a non-magnetic undercoat layer formed on the non-magnetic base film, comprising non-magnetic acicular composite particles and a binder resin; and a magnetic recording layer formed on the non-magnetic undercoat layer, comprising magnetic particles and a binder resin, said non-magnetic acicular composite particles having an average major axis diameter of 0.01 to 0.3 µm, comprising:

acicular hematite particles or acicular iron oxide hydroxide particles as non-magnetic core particles, a coating formed on surface of said acicular hematite particle or acicular iron oxide hydroxide particle, comprising at least one organosilicon compound selected from the group consisting of:
(1) organosilane compounds obtainable from alkoxysilane compounds, and
(2) polysiloxanes or modified polysiloxanes, and
a phthalocyanine-based pigment coat formed on said coating comprising said organosilicon compound, in an amount of from 1 to 100 parts by weight based on 100 parts by weight of said acicular hematite particles or acicular iron oxide hydroxide particles.

In a second aspect of the present invention, there is provided a magnetic recording medium comprising:

a non-magnetic base film;

a non-magnetic undercoat layer formed on the non-magnetic base film, comprising non-magnetic acicular composite particles and a binder resin; and a magnetic recording layer formed on the non-magnetic undercoat layer, comprising magnetic particles and a binder resin, said non-magnetic acicular composite particles having an average major axis diameter of 0.01 to 0.3 µm and comprising:

acicular hematite particles or acicular iron oxide hydroxide particles coated with at least one compound selected from the group consisting of hydroxides of aluminum, oxides of aluminum, hydroxides of silicon and oxides of silicon as non-magnetic core particles, a coating formed on surface of said acicular hematite particle or acicular iron oxide hydroxide particle, comprising at least one organosilicon compound selected from the group consisting of:
(1) organosilane compounds obtainable from alkoxysilane compounds, and
(2) polysiloxanes or modified polysiloxanes, and
a phthalocyanine-based pigment coat formed on said coating comprising said organosilicon compound, in an amount of from 1 to 100 parts by weight based on 100 parts by weight of said acicular hematite particles or acicular iron oxide hydroxide particles.

In a third aspect of the present invention, there is provided a magnetic recording medium comprising:

a non-magnetic base film;

a non-magnetic undercoat layer formed on the non-magnetic base film, comprising non-magnetic acicular composite particles and a binder resin; and a magnetic recording layer formed on the non-magnetic undercoat layer, comprising magnetic particles and a binder resin, said non-magnetic acicular composite particles having an average major axis diameter of 0.01 to 0.3 μm and comprising:
as non-magnetic core particles acicular hematite particles or acicular iron oxide hydroxide particles having a coating formed on the surface of said acicular hematite particle or acicular iron oxide hydroxide particle, comprising at least one organosilicon compound selected from the group consisting of:
(1) organosilane compounds obtainable from alkoxysilane compounds, and
(2) polysiloxanes or modified polysiloxanes, and
a carbon black coat formed on at least a part of the surface of said coating comprising said organosilicon compound, in an amount of 1 to 50 parts by weight based on 100 parts by weight of the said acicular hematite particles or acicular iron oxide hydroxide particles,
a coating formed on surface of said carbon black coat, comprising at least one organosilicon compound selected from the group consisting of:
(1) organosilane compounds obtainable from alkoxysilane compounds, and
(2) polysiloxanes or modified polysiloxanes, and
a phthalocyanine-based pigment coat formed on said coating comprising said organosilicon compound, in an amount of from 1 to 100 parts by weight based on 100 parts by weight of said acicular hematite particles or acicular iron oxide hydroxide particles.

In a fourth aspect of the present invention, there is provided a magnetic recording medium comprising:
a non-magnetic base film;
a non-magnetic undercoat layer formed on the non-magnetic base film, comprising non-magnetic acicular composite particles and a binder resin; and
a magnetic recording layer formed on the non-magnetic undercoat layer, comprising magnetic particles and a binder resin,
said non-magnetic acicular composite particles having an average major axis diameter of 0.01 to 0.3 μm and comprising:
as non-magnetic core particles acicular hematite particles or acicular iron oxide hydroxide particles having a coating layer comprising at least one compound selected from the group consisting of hydroxides of aluminum, oxides of aluminum, hydroxides of silicon and oxides of silicon on the surface of said acicular hematite particle or acicular iron oxide hydroxide particle, a coating formed on said coating layer, comprising at least one organosilicon compound selected from the group consisting of:
(1) organosilane compounds obtainable from alkoxysilane compounds, and
(2) polysiloxanes or modified polysiloxanes, and
a carbon black coat formed on at least a part of the surface of said coating comprising said organosilicon compound, in an amount of 1 to 50 parts by weight based on 100 parts by weight of the said acicular hematite particles or acicular iron oxide hydroxide particles,
a coating formed on surface of said carbon black coat, comprising at least one organosilicon compound selected from the group consisting of:
(1) organosilane compounds obtainable from alkoxysilane compounds, and
(2) polysiloxanes or modified polysiloxanes, and
a phthalocyanine-based pigment coat formed on said coating comprising said organosilicon compound, in an amount of from 1 to 100 parts by weight based on 100 parts by weight of said acicular hematite particles or acicular iron oxide hydroxide particles.

In a fifth aspect of the present invention, there is provided a magnetic recording medium having a gloss of coating film of 170 to 300%, a surface roughness Ra of coating film of not more than 11.5 nm, a linear absorption of coating film of 1.20 to 5.00 μm$^{-1}$ and a surface resistivity of not more than $5.0 \times 10^{10}$ Ω/cm$^2$, comprising:
a non-magnetic base film;
a non-magnetic undercoat layer formed on the non-magnetic base film, comprising non-magnetic acicular composite particles and a binder resin; and
a magnetic recording layer formed on the non-magnetic undercoat layer, comprising magnetic particles and a binder resin,
said non-magnetic acicular composite particles having an average major axis diameter of 0.01 to 0.3 μm and comprising:
acicular hematite particles or acicular iron oxide hydroxide particles as non-magnetic core particles,
a coating formed on surface of said acicular hematite particle or acicular iron oxide hydroxide particle, comprising at least one organosilicon compound selected from the group consisting of:
(1) organosilane compounds obtainable from alkoxysilane compounds, and
(2) polysiloxanes or modified polysiloxanes, and
a phthalocyanine-based pigment coat formed on said coating comprising said organosilicon compound, in an amount of from 1 to 100 parts by weight based on 100 parts by weight of said acicular hematite particles or acicular iron oxide hydroxide particles.

In a sixth aspect of the present invention, there are provided non-magnetic acicular composite particles having an average major axis diameter of 0.01 to 0.3 μm and an aspect ratio of 2.0:1 to 20.0:1, comprising:
acicular hematite particles as non-magnetic core particles,
a coating formed on surface of said acicular hematite particle, comprising at least one organosilicon compound selected from the group consisting of:
(1) organosilane compounds obtainable from alkoxysilane compounds, and
(2) polysiloxanes or modified polysiloxanes, and
a phthalocyanine-based pigment coat formed on said coating comprising said organosilicon compound, in an amount of from 1 to 100 parts by weight based on 100 parts by weight of said acicular hematite particles.

In a seventh aspect of the present invention, there are provided non-magnetic acicular composite particles having an average major axis diameter of 0.01 to 0.3 μm and an aspect ratio of 2.0:1 to 20.0:1, comprising:
acicular hematite particles coated with at least one compound selected from the group consisting of hydroxides of aluminum, oxides of aluminum, hydroxides of silicon and oxides of silicon as non-magnetic core particles,
a coating formed on surface of said acicular hematite particle, comprising at least one organosilicon compound selected from the group consisting of:

(1) organosilane compounds obtainable from alkoxysilane compounds, and (2) polysiloxanes or modified polysiloxanes, and a phthalocyanine-based pigment coat formed on said coating comprising said organosilicon compound, in an amount of from 1 to 100 parts by weight based on 100 parts by weight of said acicular hematite particles.

In an eighth aspect of the present invention, there are provided non-magnetic acicular composite particles having an average major axis diameter of 0.01 to 0.3 µm and an aspect ratio of 2.0:1 to 20.0:1, comprising:

as non-magnetic core particles acicular hematite particles having a coating formed on the surface of said acicular hematite particle, comprising at least one organosilicon compound selected from the group consisting of:

(1) organosilane compounds obtainable from alkoxysilane compounds, and (2) polysiloxanes or modified polysiloxanes, and a carbon black coat formed on at least a part of the surface of said coating comprising said organosilicon compound, in an amount of 1 to 50 parts by weight based on 100 parts by weight of the said acicular hematite particles, a coating formed on surface of said carbon black coat, comprising at least one organosilicon compound selected from the group consisting of:

(1) organosilane compounds obtainable from alkoxysilane compounds, and (2) polysiloxanes or modified polysiloxanes, and a phthalocyanine-based pigment coat formed on said coating comprising said organosilicon compound, in an amount of from 1 to 100 parts by weight based on 100 parts by weight of said acicular hematite particles.

In a ninth aspect of the present invention, there are provided non-magnetic acicular composite particles having an average major axis diameter of 0.01 to 0.3 µm and an aspect ratio of 2.0:1 to 20.0:1, comprising:

as non-magnetic core particles acicular hematite particles having a coating layer comprising at least one compound selected from the group consisting of hydroxides of aluminum, oxides of aluminum, hydroxides of silicon and oxides of silicon on the surface of said acicular hematite particle, a coating formed on said coating layer, comprising at least one organosilicon compound selected from the group consisting of:

(1) organosilane compounds obtainable from alkoxysilane compounds, and (2) polysiloxanes or modified polysiloxanes, and a carbon black coat formed on at least a part of the surface of said coating comprising said organosilicon compound, in an amount of 1 to 50 parts by weight based on 100 parts by weight of the said acicular hematite particles, a coating formed on surface of said carbon black coat, comprising at least one organosilicon compound selected from the group consisting of:

(1) organosilane compounds obtainable from alkoxysilane compounds, and (2) polysiloxanes or modified polysiloxanes, and a phthalocyanine-based pigment coat formed on said coating comprising said organosilicon compound, in an amount of from 1 to 100 parts by weight based on 100 parts by weight of said acicular hematite particles.

In a tenth aspect of the present invention, there are provided non-magnetic acicular composite particles for a non-magnetic undercoat layer of a magnetic recording medium, having an average major axis diameter of 0.01 to 0.3 µm, an aspect ratio of 2.0:1 to 20.0:1, a BET specific surface area of 35 to 250 $m^2/g$ and a geometrical standard deviation value of the average major axis diameter of not more than 1.50, comprising:

acicular hematite particles as non-magnetic core particles, a coating formed on surface of said acicular hematite particle, comprising at least one organosilicon compound selected from the group consisting of:

(1) organosilane compounds obtainable from alkoxysilane compounds, and (2) polysiloxanes or modified polysiloxanes, and a phthalocyanine-based pigment coat formed on said coating layer comprising said organosilicon compound, in an amount of from 1 to 100 parts by weight based on 100 parts by weight of said acicular hematite particles.

In an eleventh aspect of the present invention, there are provided non-magnetic acicular composite particles for a non-magnetic undercoat layer of a magnetic recording medium, having an average major axis diameter of 0.01 to 0.3 µm, comprising:

acicular iron oxide hydroxide particles as non-magnetic core particles, a coating formed on surface of said acicular iron oxide hydroxide particles, comprising at least one organosilicon compound selected from the group consisting of:

(1) organosilane compounds obtainable from alkoxysilane compounds, and (2) polysiloxanes or modified polysiloxanes, and a phthalocyanine-based pigment coat formed on said coating layer comprising said organosilicon compound, in an amount of from more than 30 to 100 parts by weight based on 100 parts by weight of said acicular iron oxide hydroxide particles.

In a twelfth aspect of the present invention, there are provided non-magnetic acicular composite particles for a non-magnetic undercoat layer of a magnetic recording medium, having an average major axis diameter of 0.01 to 0.3 µm, comprising:

acicular iron oxide hydroxide particles coated with at least one compound selected from the group consisting of hydroxides of aluminum, oxides of aluminum, hydroxides of silicon and oxides of silicon as non-magnetic core particles, a coating formed on surface of said acicular iron oxide hydroxide particle, comprising at least one organosilicon compound selected from the group consisting of:

(1) organosilane compounds obtainable from alkoxysilane compounds, and (2) polysiloxanes or modified polysiloxanes, and a phthalocyanine-based pigment coat formed on said coating comprising said organosilicon compound, in an amount of from more than 30 to 100 parts by weight based on 100 parts by weight of said acicular iron oxide hydroxide particles.

In a thirteenth aspect of the present invention, there are provided non-magnetic acicular composite particles for a non-magnetic undercoat layer of a magnetic recording medium, having an average major axis diameter of 0.01 to 0.3 µm, comprising:

as non-magnetic core particles acicular iron oxide hydroxide particles having a coating formed on the surface of said acicular iron oxide hydroxide particle, comprising at least one organosilicon compound selected from the group consisting of:

(1) organosilane compounds obtainable from alkoxysilane compounds, and (2) polysiloxanes or modified polysiloxanes, and a carbon black coat formed on at least a part of the surface of said coating comprising said organosilicon compound, in an amount of 1 to 50 parts by weight based on 100 parts by weight of the said acicular iron oxide hydroxide particles, a coating formed on surface of said carbon black coat, comprising at least one organosilicon compound selected from the group consisting of:
(1) organosilane compounds obtainable from alkoxysilane compounds, and
(2) polysiloxanes or modified polysiloxanes, and
a phthalocyanine-based pigment coat formed on said coating comprising said organosilicon compound, in an amount of from more than 30 to 100 parts by weight based on 100 parts by weight of said acicular iron oxide hydroxide particles.

In a fourteenth aspect of the present invention, there are provided non-magnetic acicular composite particles for a non-magnetic undercoat layer of a magnetic recording medium, having an average major axis diameter of 0.01 to 0.3 µm, comprising:

as non-magnetic core particles acicular iron oxide hydroxide particles having a coating layer comprising at least one compound selected from the group consisting of hydroxides of aluminum, oxides of aluminum, hydroxides of silicon and oxides of silicon on the surface of said acicular iron oxide hydroxide particle, a coating formed on said coating layer, comprising at least one organosilicon compound selected from the group consisting of:
(1) organosilane compounds obtainable from alkoxysilane compounds, and
(2) polysiloxanes or modified polysiloxanes, and
a carbon black coat formed on at least a part of the surface of said coating comprising said organosilicon compound, in an amount of 1 to 50 parts by weight based on 100 parts by weight of the said acicular iron oxide hydroxide particles,
a coating formed on surface of said carbon black coat, comprising at least one organosilicon compound selected from the group consisting of:
(1) organosilane compounds obtainable from alkoxysilane compounds, and
(2) polysiloxanes or modified polysiloxanes, and
a phthalocyanine-based pigment coat formed on said coating comprising said organosilicon compound, in an amount of from more than 30 to 100 parts by weight based on 100 parts by weight of said acicular iron oxide hydroxide particles.

In a fifteenth aspect of the present invention, there are provided non-magnetic acicular composite particles for a non-magnetic undercoat layer of a magnetic recording medium, having an average major axis diameter of 0.01 to 0.3 µm, an aspect ratio of 2:1 to 20:1, a BET specific surface area of 35 to 250 m$^2$/g and a geometrical standard deviation value of the average major axis diameter of not more than 1.50, comprising:

acicular iron oxide hydroxide particles as non-magnetic core particles, a coating formed on surface of said acicular iron oxide hydroxide particles, comprising at least one organosilicon compound selected from the group consisting of:
(1) organosilane compounds obtainable from alkoxysilane compounds, and
(2) polysiloxanes or modified polysiloxanes, and
a phthalocyanine-based pigment coat formed on said coating layer comprising said organosilicon compound, in an amount of from more than 30 to 100 parts by weight based on 100 parts by weight of said acicular iron oxide hydroxide particles.

In a sixteenth aspect of the present invention, there is provided a process for producing said non-magnetic acicular composite particles defined in claim 18 or 33, which process comprises:

mixing acicular hematite particles or acicular iron oxide hydroxide particles together with at least one compound selected from the group consisting of:
(1) alkoxysilane compounds, and
(2) polysiloxanes or modified polysiloxanes, by using an apparatus capable of applying a shear force to the acicular hematite particles or acicular iron oxide hydroxide particles, thereby coating the surface of said acicular hematite particles or acicular iron oxide hydroxide particles with the said compounds;

mixing the obtained acicular hematite particles or acicular iron oxide hydroxide particles coated with the said compounds and a phthalocyanine-based pigments in an amount of 1 to 100 parts by weight based on 100 parts by weight of the acicular hematite particles or acicular iron oxide hydroxide particles by using an apparatus capable of applying a shear force to the acicular hematite particles or acicular iron oxide hydroxide particles coated with said compound, thereby forming a phthalocyanine-based pigments coat on the surface of a coating layer comprising the organosilicon compounds.

DETAILED DESCRIPTION OF THE INVENTION

The present invention is now described in detail below.

First, the non-magnetic acicular composite particles used as non-magnetic particles contained in a non-magnetic undercoat layer of a magnetic recording medium according to the present invention are described.

The non-magnetic acicular composite particles used as non-magnetic particles contained in a non-magnetic undercoat layer of a magnetic recording medium, comprise:

acicular hematite particles or acicular iron oxide hydroxide particles;

a coating layer formed on the surface of the acicular hematite particle or acicular iron oxide hydroxide particle, comprising at least one organosilicon compound, and a phthalocyanine-based pigment adhered on a part of the coating layer; and have an average major axis diameter of 0.01 to 0.3 µm.

As the non-magnetic core particles used in the present invention, there may be exemplified acicular hematite particles or acicular iron oxide hydroxide particles. Since the acicular hematite particles have red color and the acicular iron oxide hydroxide particles have yellow color, in the consideration of blackness of the obtained non-magnetic acicular composite particles, black acicular hematite particles or black acicular iron oxide hydroxide particles (A) and black non-magnetic acicular composite particles precursor (B) using acicular hematite particles or acicular iron oxide hydroxide particles as core particles are preferred.

As the black acicular hematite particles or black acicular iron oxide hydroxide particles (A), there may be exemplified acicular manganese-containing hematite particles or the acicular manganese-containing iron oxide hydroxide particles which contain manganese in an amount of 5 to 40% by weight (calculated as Mn) based on the weight of the acicular manganese-containing hematite particles or acicular manganese-containing iron oxide hydroxide particles.

The black non-magnetic acicular composite particles precursor (B) comprises the acicular hematite particles or the acicular iron oxide hydroxide particles, the organosilicon compound coating layer formed on the surface of each acicular hematite particles or acicular iron oxide hydroxide particles, and the carbon black coat formed on the coating layer.

The particle shape of the acicular hematite particles or the acicular iron oxide hydroxide particles as the core particles may include not only acicular shape but also spindle shape, rice ball shape or the like.

The acicular hematite particles or the acicular iron oxide hydroxide particles as the core particles have an average major axis diameter of 0.01 to 0.30 µm, preferably 0.02 to 0.25 µm, more preferably 0.03 to 0.20 µm.

When the average major axis diameter is more than 0.3 µm, the obtained non-magnetic acicular composite particles also may become coarse particles. When such coarse particles are used for forming a non-magnetic undercoat layer, a coating film formed on the undercoat layer may tend to be deteriorated in surface smoothness. When the average major axis diameter is less than 0.01 µm, the particles may tend to be agglomerated by the increase of intermolecular force therebetween due to such fine particles. As a result, it may become difficult to form a uniform coating layer composed of organosilicon compound on the surface of the core particles, and uniformly adhere the phthalocyanine-based pigment onto the surface of the coating layer.

The aspect ratio (=average major axis diameter: average minor axis diameter, hereinafter referred to merely as "aspect ratio") of the acicular hematite particles or the acicular iron oxide hydroxide particles as the core particles is usually 2.0:1 to 20.0:1, preferably 2.5:1 to 18.0:1, more preferably 3.0:1 to 15.0:1. When the aspect ratio is more than 20.0:1, the particles may be entangled with each other, so that the agglomeration of the non-magnetic particles tends to occur due to the increased intermolecular force therebetween. As a result, it is difficult to uniformly coat with an organosilicon compound and to uniformly adhere the phthalocyanine-based pigment onto the coating layer composed of the organosilicon compound. On the other hand, when the aspect ratio is less than 2.0:1, it may be difficult to obtain a coating film having a sufficient strength.

The geometrical standard deviation of the major axis diameter of the acicular hematite particles or the acicular iron oxide hydroxide particles as the core particles is usually not more than 1.50, preferably 1.48, more preferably not more than 1.45. If the geometrical standard deviation of the major axis diameter thereof exceeds 1.50, due to the coarse particles, it is difficult to uniformly coat with an organosilicon compound and to uniformly adhere the phthalocyanine-based pigment onto the coating layer composed of the organosilicon compound. From the point of view of industrial productivity, the lower limit thereof is preferably 1.01.

The BET specific surface area of the acicular hematite particles or the acicular iron oxide hydroxide particles as the core particles is usually 35 to 250 $m^2/g$, preferably 38 to 200 $m^2/g$, more preferably 40 to 180 $m^2/g$. If the BET specific surface area thereof is less than 35 $m^2/g$, the acicular hematite particles or the acicular iron oxide hydroxide particles may be coarse particles or large particles produced by sintering a particle and between particles, which are apt to exert a deleterious influence on the surface smoothness of the coating film formed using such particles. On the other hand, if the BET specific surface area thereof is more than 250 $m^2/g$, the increase of the intermolecular force due to the fine particles. As a result, it may be difficult to uniformly coat with the organosilicon compounds, and to uniformly adhere the phthalocyanine-based pigment onto the coating layer composed of the organosilicon compounds.

With respect of the blackness of the acicular hematite particles as the core particles, in case of the acicular hematite particles containing no manganese, the lower limit of the blackness thereof, when represented by the $L^*$ value, is usually more than 9.5, and the upper limit thereof is usually 33.0, preferably 32.0. In the case of the acicular black manganese-containing hematite particles, the lower limit of the blackness thereof as the core particles when represented by the $L^*$ value, is usually more than 9.5, and the upper limit thereof is usually 23.0, preferably 22.0.

With respect to the blackness of the acicular iron oxide hydroxide particles as the core particles, in the case of the acicular iron oxide hydroxide particles containing no manganese, the lower limit of the blackness thereof, when represented by the $L^*$ value, is usually more than 9.5, and the upper limit thereof is usually 36.0, preferably 35.0. In the case of the acicular black manganese-containing iron oxide hydroxide particles, the lower limit of the blackness thereof, when represented by the $L^*$ value, is usually more than 9.5, and the upper limit thereof is usually 26.0, preferably 24.0.

When the $L^*$ value is more than the above upper limit, it is difficult to obtain the non-magnetic acicular composite particles having an excellent blackness.

The volume resistivity value of the acicular hematite particles or acicular iron oxide hydroxide particles as the core particles is usually not less than $1.0 \times 10^7$ Ω·cm.

The resin adsorptivity of the acicular hematite particles or acicular iron oxide hydroxide particles as the core particles is usually not more than 60%.

Next, the black non-magnetic acicular composite particles precursor (B) comprising acicular hematite particles or acicular iron oxide hydroxide particles as core particles, an organosilicon compound coating layer formed on the surface of each of the acicular hematite particles or acicular iron oxide hydroxide particles, and a carbon black coat formed on at least a part of the coating layer, is described below.

The black non-magnetic acicular composite particles precursor comprise:
  as core particles acicular hematite particles or acicular iron oxide hydroxide particles having an average major axis diameter of 0.01 to 0.30 µm;
  a coating formed on the surface of the acicular hematite particles or acicular iron oxide hydroxide particles, comprising at least one organosilicon compound selected from the group consisting of:
    (1) organosilane compounds obtainable from alkoxysilane compounds, and
    (2) polysiloxanes or modified polysiloxanes, and
    a carbon black coat formed on at least a part of the surface of the said coating layer comprising the said organosilicon compound, in an amount of 1 to 50 parts by weight based on 100 parts by weight of the said acicular hematite particles or acicular iron oxide hydroxide particles.

The properties of the acicular hematite particles or acicular iron oxide hydroxide particles used as the core particles of the black non-magnetic acicular composite particles precursor are substantially the same as those of the acicular hematite particles or acicular iron oxide hydroxide particles, except that the an average major axis diameter of 0.009 to 0.25 μm, preferably 0.019 to 0.20 μm, more preferably 0.029 to 0.15 μm.

The coating formed on the surface of the acicular hematite particles or acicular iron oxide hydroxide particles comprises at least one organosilicon compound selected from the group consisting of (1) organosilane compounds obtainable from alkoxysilane compounds; and (2) polysiloxanes and modified polysiloxanes selected from the group consisting of (2-A) polysiloxanes modified with at least one compound selected from the group consisting of polyethers, polyesters and epoxy compounds (hereinafter referred to merely as "modified polysiloxanes"), and (2-B) polysiloxanes whose molecular terminal is modified with at least one group selected from the group consisting of carboxylic acid groups, alcohol groups and a hydroxyl group (hereinafter referred to merely as "terminal-modified polysiloxanes").

The organosilane compounds (1) may be produced from alkoxysilane compounds represented by the formula (I):

  (I)

wherein $R^1$ is $C_6H_5-$, $(CH_3)_2CHCH_2-$ or $n-C_bH_{2b+1}-$ (wherein b is an integer from 1 to 18); X is $CH_3O-$ or $C_2H_5O-$; and a is an integer from 0 to 3.

The drying or heat-treatment of the alkoxysilane compounds may be conducted, for example, at a temperature of usually 40 to 150° C., preferably 60 to 120° C. for usually 10 minutes to 12 hours, preferably 30 minutes to 3 hours.

Specific examples of the alkoxysilane compounds may include methyltriethoxysilane, dimethyldiethoxysilane, phenyltriethoxysilane, diphenyldiethoxysilane, methyltrimethoxysilane, dimethyldimethoxysilane, phenyltrimethoxysilane, diphenyldimethoxysilane, isobutyltrimethoxysilane, decyltrimethoxysilane or the like. Among these alkoxysilane compounds, in view of the desorption percentage and the adhering effect of carbon black, methyltriethoxysilane, phenyltriethoxysilane, methyltrimethoxysilane, dimethyldimethoxysilane and isobutyltrimethoxysilane are preferred, and methyltriethoxysilane, methyltrimethoxysilane and phenyltriethoxysilane are more preferred.

As the polysiloxanes (2), there may be used those compounds represented by the formula (II):

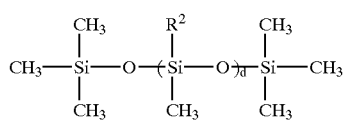  (II)

wherein $R^2$ is H— or $CH_3-$, and d is an integer from 15 to 450.

Among these polysiloxanes, in view of the desorption percentage and the adhering effect of the carbon black, polysiloxanes having methyl hydrogen siloxane units are preferred.

As the modified polysiloxanes (2-A), there may be used: (a) polysiloxanes modified with polyethers represented by the formula (III):

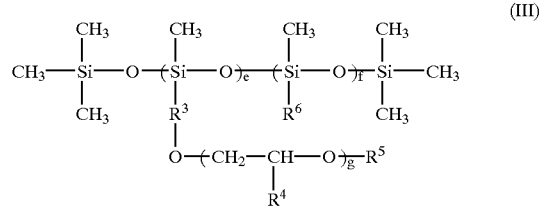

wherein $R^3$ is $-(-CH_2-)_h-$; $R^4$ is $-(-CH_2-)_i-CH_3$; $R^5$ is $-OH$, $-COOH$, $-CH=CH_2$, $-C(CH_3)=CH_2$ or $-(-CH_2-)_j-CH_3$; $R^6$ is $-(-CH_2-)_k-CH_3$; g and h are an integer from 1 to 15; i, j and k are an integer from 0 to 15; e is an integer from 1 to 50; and f is an integer from 1 to 300;

(b) polysiloxanes modified with polyesters represented by the formula (IV):

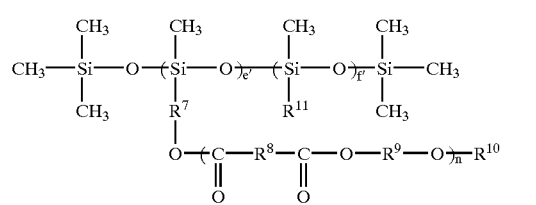

wherein $R^7$, $R^8$ and $R^9$ are $-(-CH_2-)_q-$ and may be the same or different; $R^{10}$ is $-OH$, $-COOH$, $-CH=CH_2$, $-C(CH_3)=CH_2$ or $-(-CH_2-)_r-CH_3$; $R^{11}$ is $-(-CH_2-)_s-CH_3$; n and q are an integer from 1 to 15; r and s are an integer from 0 to 15; e' is an integer from 1 to 50; and f' is an integer from 1 to 300;

(c) polysiloxanes modified with epoxy compounds represented by the formula (V):

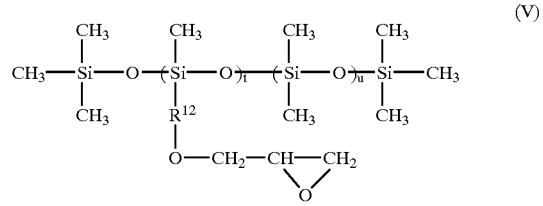

wherein $R^{12}$ is $-(-CH_2-)_v-$; v is an integer from 1 to 15; t is an integer from 1 to 50; and u is an integer from 1 to 300; or a mixture thereof.

Among these modified polysiloxanes (2-A), in view of the desorption percentage and the adhering effect of the carbon black, the polysiloxanes modified with the polyethers represented by the formula (III), are preferred.

As the terminal-modified polysiloxanes (2-B), there may be used those represented by the formula (VI):

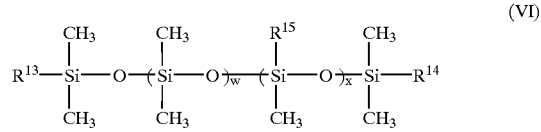

wherein $R^{13}$ and $R^{14}$ are $-OH$, $R^{16}OH$, or $R^{17}COOH$ and may be the same or different; $R^{15}$ is $-CH_3$ or $-C_6H_5$; $R^{16}$ and $R^{17}$ are $-(-CH_2-)_y-$; y is an integer from 1 to 15; w is an integer from 1 to 200; and x is an integer from 0 to 100.

Among these terminal-modified polysiloxanes, in view of the desorption percentage and the adhering effect of the carbon black, the polysiloxanes whose terminals are modified with carboxylic acid groups are preferred.

The coating amount of the organosilicon compounds is usually 0.02 to 5.0% by weight, preferably 0.03 to 4.0% by weight, more preferably 0.05 to 3.0% by weight (calculated as Si) based on the weight of the acicular hematite particles or acicular iron oxide hydroxide particles coated with the organosilicon compounds.

When the coating amount of the organosilicon compounds is less than 0.02% by weight, it may be difficult to adhere the carbon black in a predetermined.

When the coating amount of the organosilicon compounds is more than 5.0% by weight, the carbon black can be adhered in a predetermined. Therefore, it is unnecessary and meaningless to coat the acicular hematite particles or acicular iron oxide hydroxide particles with such a large amount of the organosilicon compounds.

The amount of the carbon black coat formed is 1 to 50 parts by weight based on 100 parts by weight of the acicular hematite particles or acicular iron oxide hydroxide particles as core particles.

When the amount of the carbon black coat formed is less than 1 part by weight, the amount of the carbon black may be insufficient, so that it may become difficult to obtain black non-magnetic acicular composite particles precursor having a lower volume resistivity value and a more excellent blackness.

On the other hand, when the amount of the carbon black coat formed is more than 50 parts by weight, the obtained black non-magnetic acicular composite particles precursor can show a lower volume resistivity value and a more excellent blackness.

The thickness of carbon black coat formed is preferably not more than 0.04 $\mu$m, more preferably not more than 0.03 $\mu$m, still more preferably not more than 0.02 $\mu$m. The lower limit thereof is more preferably 0.0001 $\mu$m.

The carbon black may be adhered either over a whole surface of the coating layer composed of the alkoxysilane or polysiloxanes, or on at least a part of the surface of the coating layer so as to expose a part of the coating layer composed of the alkoxysilane or polysiloxanes to the outer surface of each black non-magnetic acicular composite particle precursor so that a carbon black coat is formed on the surface of the coating layer. Even though a part of the coating layer composed of the alkoxysilane or polysiloxanes is exposed to the outer surface of each black non-magnetic acicular composite particle precursor, it is possible to suitably adhere the phthalocyanine-based pigment thereonto.

The particle shape and particle size of the black non-magnetic acicular composite particles precursor used in the present invention are considerably varied depending upon those of the acicular hematite particles or acicular iron oxide hydroxide particles as core particles. The black non-magnetic acicular composite particles precursor have a similar particle shape to that of the acicular hematite particles or acicular iron oxide hydroxide particles as core particle, and a slightly larger particle size than that of the acicular hematite particles or acicular iron oxide hydroxide particles as core particles.

More specifically, the black non-magnetic acicular composite particles precursor (B) used as the core particles in the present invention, have an average particle size of usually 0.01 to 0.30 $\mu$m, preferably 0.02 to 0.20 $\mu$m, more preferably 0.03 to 0.20 $\mu$m and an aspect ratio of usually 2.0:1 and 20.0:1, preferably 2.5:1 to 18.0:1, more preferably 3.0:1 to 15.0:1.

The geometrical standard deviation value of the black non-magnetic acicular composite particles precursor used as the core particles in the present invention is preferably not more than 1.5, more preferably 1.01 to 1.48, still more preferably 1.01 to 1.45.

The BET specific surface area of the black non-magnetic acicular composite particles precursor used as the core particles in the present invention, is usually 35 to 250 m$^2$/g, preferably 38 to 200 m$^2$/g, more preferably 40 to 180 m$^2$/g.

The lower limit of the blackness of the black non-magnetic acicular composite particles precursor used as the core particles in the present invention, when represented by the L* value, is usually more than 2.7, and the upper limit thereof is usually 14.5, preferably 14.0.

The volume resistivity value of the black non-magnetic acicular composite particles precursor used as the core particles in the present invention is usually from not more than 1.0×10$^3$ $\Omega$·cm and less than 1.0×10$^7$ $\Omega$·cm.

The resin adsorptivity of the black non-magnetic acicular composite particles precursor used as the core particles in the present invention is usually less than 70%.

The desorption percentage of the carbon black from the black non-magnetic acicular composite particles precursor used as the core particles in the present invention is preferably not more than 20% by weight, more preferably not more than 10% by weight (calculated as C).

In the black non-magnetic acicular composite particles precursor used as the core particles in the present invention, at least a part of the surface of the acicular hematite particles or the acicular iron oxide hydroxide particles may be preliminarily coated with at least one compound selected from the group consisting of hydroxides of aluminum, oxides of aluminum, hydroxides of silicon and oxides of silicon (hereinafter referred to as "hydroxides and/or oxides of aluminum and/or silicon coat"), if necessary. In this case, the obtained black non-magnetic acicular composite particles precursor having a coating layer composed of hydroxides and/or oxides of aluminum and/or silicon, can more effectively prevent the phthalocyanine-based pigment adhered thereonto from being desorbed therefrom as compared to the case where the black non-magnetic acicular composite particles precursor wherein the acicular hematite particles or acicular iron oxide hydroxide particles are uncoated with hydroxides and/or oxides of aluminum and/or silicon.

The amount of the hydroxides and/or oxides of aluminum and/or silicon coat is preferably 0.01 to 50% by weight (calculated as Al, SiO$_2$ or a sum of Al and SiO$_2$) based on the weight of the acicular hematite particles or the acicular iron oxide hydroxide particles coated.

The particle size, geometrical standard deviation, BET specific surface area, blackness (L* value), a volume resistivity and a resin absorption, wherein the surface of the acicular hematite particle is coated with the hydroxides and/or oxides of aluminum and/or silicon, are substantially the same as those of the black non-magnetic acicular composite particles precursor wherein the acicular hematite particle is uncoated with the hydroxides and/or oxides of aluminum and/or silicon.

The desorption percentage of the phthalocyanine-based pigment can be reduced by forming the coating layer composed of hydroxides and/or oxides of aluminum and/or silicon thereon, and is preferably not more than 12%, more preferably not more than 10%.

The black non-magnetic acicular composite particles precursor (B) used in the present invention can be produced by the following method.

The coating of the acicular hematite particles or the acicular iron oxide hydroxide particles with the alkoxysilane compounds, the polysiloxanes, the modified polysiloxanes or the terminal-modified polysiloxanes, may be conducted (i) by mechanically mixing and stirring the acicular hematite particles or the acicular iron oxide hydroxide particles together with the alkoxysilane compounds, the polysiloxanes, the modified polysiloxanes or the terminal-modified polysiloxanes; or (ii) by mechanically mixing and stirring both the components together while spraying the alkoxysilane compounds, the polysiloxanes, the modified polysiloxanes or the terminal-modified polysiloxanes onto the acicular hematite particles or the acicular iron oxide hydroxide particles. In these cases, substantially whole amount of the alkoxysilane compounds, the polysiloxanes, the modified polysiloxanes or the terminal-modified polysiloxanes added can be applied onto the surfaces of the acicular hematite particles or the acicular iron oxide hydroxide particles.

In order to uniformly coat the surfaces of the acicular hematite particles or the acicular iron oxide hydroxide particles with the alkoxysilane compounds, the polysiloxanes, the modified polysiloxanes or the terminal-modified polysiloxanes, it is preferred that the acicular hematite particles or the acicular iron oxide hydroxide particles are preliminarily diaggregated by using a pulverizer.

As apparatus (a) for mixing and stirring the acicular hematite particles or the acicular iron oxide hydroxide particles with the alkoxysilane compounds, the polysiloxanes, the modified polysiloxanes or the terminal-modified polysiloxanes to form the coating layer thereof, and (b) for mixing and stirring carbon black fine particles with the particles whose surfaces are coated with the alkoxysilane compounds, the polysiloxanes, the modified polysiloxanes or the terminal-modified polysiloxanes to form the carbon black coat, there may be preferably used those apparatus capable of applying a shear force to the particles, more preferably those apparatuses capable of conducting the application of shear force, spatulate-force and compressed-force at the same time. In addition, by conducting the above mixing or stirring treatment (a) of the core particles together with the alkoxysilane compounds, the polysiloxanes, the modified polysiloxanes or the terminal-modified polysiloxanes, at least a part of the alkoxysilane compounds coated on the acicular hematite particles or the acicular iron oxide hydroxide particles may be changed to the organosilane compounds.

As such apparatuses, there may be exemplified wheel-type kneaders, ball-type kneaders, blade-type kneaders, roll-type kneaders or the like. Among them, wheel-type kneaders are preferred.

Specific examples of the wheel-type kneaders may include an edge runner (equal to a mix muller, a Simpson mill or a sand mill), a multi-mull, a Stotz mill, a wet pan mill, a Conner mill, a ring muller, or the like. Among them, an edge runner, a multi-mull, a Stotz mill, a wet pan mill and a ring muller are preferred, and an edge runner is more preferred.

Specific examples of the ball-type kneaders may include a vibrating mill or the like. Specific examples of the blade-type kneaders may include a Henschel mixer, a planetary mixer, a Nawter mixer or the like. Specific examples of the roll-type kneaders may include an extruder or the like.

In order to coat the surfaces of the acicular hematite particles or the acicular iron oxide hydroxide particles with the alkoxysilane compounds, the polysiloxanes, the modified polysiloxanes or the terminal-modified polysiloxanes as uniformly as possible, the conditions of the above mixing or stirring treatment may be appropriately controlled such that the linear load is usually 19.6 to 1960 N/cm (2 to 200 Kg/cm), preferably 98 to 1470 N/cm (10 to 150 Kg/cm), more preferably 147 to 980 N/cm (15 to 100 Kg/cm); and the treating time is usually 5 minutes to 24 hours, preferably 10 minutes to 20 hours. It is preferred to appropriately adjust the stirring speed in the range of usually 2 to 2,000 rpm, preferably 5 to 1,000 rpm, more preferably 10 to 800 rpm.

The amount of the alkoxysilane compounds, the polysiloxanes, the modified polysiloxanes or the terminal-modified polysiloxanes added, is preferably 0.15 to 45 parts by weight based on 100 parts by weight of the acicular hematite particles or the acicular iron oxide hydroxide particles. When the amount of the alkoxysilane compounds, the polysiloxanes, the modified polysiloxanes or the terminal-modified polysiloxanes is added in an amount of 0.15 to 45 parts by weight, it is possible to adhere 1 to 50 parts by weight of the carbon black onto 100 parts by weight of the acicular hematite particles or acicular iron oxide hydroxide particles.

Next, the carbon black fine particles are added to the acicular hematite particles or the acicular iron oxide hydroxide particles coated with the alkoxysilane compounds, the polysiloxanes, the modified polysiloxanes or the terminal-modified polysiloxanes, and the resultant mixture is mixed and stirred to form the carbon black coat on the surfaces of the coating composed of the alkoxysilane compounds, the polysiloxanes, the modified polysiloxanes or the terminal-modified polysiloxanes added. In addition, by conducting the above mixing or stirring treatment (b) of the carbon black fine particles together with the acicular hematite particles or the acicular iron oxide hydroxide particles coated with the alkoxysilane compounds, the polysiloxanes, the modified polysiloxanes or the terminal-modified polysiloxanes, at least a part of the alkoxysilane compounds coated on the acicular hematite particles or the acicular iron oxide hydroxide particles may be changed to the organosilane compounds.

The obtained particles may be further subjected to drying or heat-treatment, if required, for example, at a temperature of usually 40 to 150° C., preferably 60 to 120° C. for usually 10 minutes to 12 hours, preferably 30 minutes to 3 hours.

By varying an adding method of the carbon black fine particles, mixing and stirring conditions, and an adhering configuration of the carbon black coat, it is possible to adhere 1 to 50 parts by weight of the carbon black onto the alkoxysilane compounds, the polysiloxanes, the modified polysiloxanes or the terminal-modified polysiloxanes coating layer.

As the adding method, a lump addition method, a continuous addition method, a divided addition method may be exemplified. When a large amount of the organic pigment is added, it is preferred to conduct the continuous addition method and the divided addition method.

In case of continuously adding the carbon black fine particles, the carbon black fine particles may be added slowly and little by little, especially for a period of 5 minutes to 24 hours, preferably 5 minutes to 20 hours.

In case of dividedly adding the carbon black fine particles, the adding step of the carbon black fine particles of 5 to 20 parts by weight based on 100 parts by weight of the acicular hematite or acicular iron oxide hydroxide particles, and mixing and stirring step under the following conditions can be repeated until the added amount of the carbon black fine particles reaches a predetermined amount thereof.

In order to form carbon black onto the coating layer composed of the alkoxysilane compounds, the polysiloxanes, the modified polysiloxanes or the terminal-modified polysiloxanes as uniformly as possible, the conditions of the above mixing or stirring treatment can be appropriately controlled such that the linear load is usually 19.6 to 1960 N/cm (2 to 200 Kg/cm), preferably 98 to 1470 N/cm (10 to 150 Kg/cm), more preferably 147 to 980 N/cm (15 to 100 Kg/cm); and the treating time is usually 5 minutes to 24 hours, preferably 10 minutes to 20 hours. It is preferred to appropriately adjust the stirring speed in the range of usually 2 to 2,000 rpm, preferably 5 to 1,000 rpm, more preferably 10 to 800 rpm.

The amount of the carbon black fine particles added, is preferably 1 to 50 parts by weight based on 100 parts by weight of the acicular hematite particles or the acicular iron oxide hydroxide particles. When the amount of the carbon black fine particles added is less than 1 part by weight, it may become difficult to form the carbon black coat in such an amount enough to improve the blackness and volume resistivity value of the obtained black non-magnetic acicular composite particles precursor. On the other hand, when the amount of the carbon black fine particles added is more than 50 parts by weight, a sufficient blackness and volume resistivity value of the resultant black non-magnetic acicular composite particles precursor can be obtained, but the carbon black tend to be desorbed from the surface of the coating layer because of too large amount of the carbon black adhered, so that it may become difficult to uniformly coat the surface of the black non-magnetic acicular composite particles precursor with the alkoxysilanes or polysiloxanes, and uniformly adhere the phthalocyanine-based pigment on the surface of the coating layer comprising the alkoxysilanes or polysiloxanes.

At least a part of the surface of the acicular hematite particles or the acicular iron oxide hydroxide particles may be coated with at least one compound selected from the group consisting of hydroxides of aluminum, oxides of aluminum, hydroxides of silicon and oxides of silicon, if required.

The coat of the hydroxides and/or oxides of aluminum and/or silicon may be conducted by adding an aluminum compound, a silicon compound or both the compounds to a water suspension in which the acicular hematite particles or the acicular iron oxide hydroxide particles are dispersed, followed by mixing and stirring, and further adjusting the pH value of the suspension, if required, thereby coating the surfaces of the acicular hematite particles or the acicular iron oxide hydroxide particles with at least one compound selected from the group consisting of hydroxides of aluminum, oxides of aluminum, hydroxides of silicon and oxides of silicon. The thus obtained hematite particles or the acicular iron oxide hydroxide particles coated with the hydroxides and/or oxides of aluminum and/or silicon are then filtered out, washed with water, dried and pulverized. Further, the acicular hematite particles or the acicular iron oxide hydroxide particles coated with the hydroxides and/or oxides of aluminum and/or silicon may be subjected to post-treatments such as deaeration treatment and compaction treatment, if required.

As the aluminum compounds, there may be exemplified aluminum salts such as aluminum acetate, aluminum sulfate, aluminum chloride or aluminum nitrate, alkali aluminates such as sodium aluminate or the like.

The amount of the aluminum compound added is 0.01 to 20% by weight (calculated as Al) based on the weight of the acicular hematite particles or the acicular iron oxide hydroxide particles.

As the silicon compounds, there may be exemplified water glass #3, sodium orthosilicate, sodium metasilicate or the like.

The amount of the silicon compound added is 0.01 to 20% by weight (calculated as $SiO_2$) based on the weight of the acicular hematite particles or the acicular iron oxide hydroxide particles.

In the case where both the aluminum and silicon compounds are used in combination for the coating, the total amount of the aluminum and silicon compounds added is preferably 0.01 to 20% by weight (calculated as a sum of Al and $SiO_2$) based on the weight of the acicular hematite particles or the acicular iron oxide hydroxide particles.

Next, the coating layer formed on the surface of the acicular hematite particles or acicular iron oxide hydroxide particles including the black acicular hematite particles or black acicular iron oxide hydroxide particles (A) and the black non-magnetic acicular composite particles precursor (B) as core particles, comprising the organosilicon compound selected from the group consisting of: (1) organosilane compounds obtainable from alkoxysilane compounds, and (2) polysiloxanes or modified polysiloxanes, is explained.

The organosilane compounds (1) may be produced from alkoxysilane compounds represented by the formula (I):

$$R^1{}_a SiX_{4-a} \quad (I)$$

wherein $R^1$ is $C_6H_5$—, $(CH_3)_2CHCH_2$— or n—$C_bH_{2b+1}$— (wherein b is an integer from 1 to 18); X is $CH_3O$— or $C_2H_5O$—; and a is an integer from 0 to 3.

The drying or heat-treatment of the alkoxysilane compounds may be conducted, for example, at a temperature of usually 40 to 150° C., preferably 60 to 120° C. for usually 10 minutes to 12 hours, preferably 30 minutes to 3 hours.

Specific examples of the alkoxysilane compounds may include methyltriethoxysilane, dimethyldiethoxysilane, phenyltriethoxysilane, diphenyldiethoxysilane, methyltrimethoxysilane, dimethyldimethoxysilane, phenyltrimethoxysilane, diphenyldimethoxysilane, isobutyltrimethoxysilane, decyltrimethoxysilane or the like. Among these alkoxysilane compounds, in view of the desorption percentage and the adhering effect of the phthalocyanine-based pigments, methyltriethoxysilane, phenyltriethoxysilane, methyltrimethoxysilane, dimethyldimethoxysilane and isobutyltrimethoxysilane are preferred, and methyltriethoxysilane, methyltrimethoxysilane and phenyltriethoxysilane are more preferred.

As the polysiloxanes (2), there may be used those compounds represented by the formula (II):

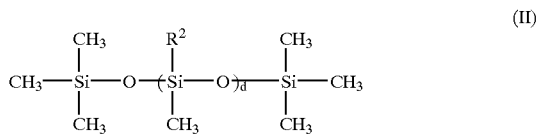

wherein $R^2$ is H— or $CH_3$—, and d is an integer from 15 to 450.

Among these polysiloxanes, in view of the desorption percentage and the adhering effect of the phthalocyanine-based pigments, polysiloxanes having methyl hydrogen siloxane units are preferred.

As the modified polysiloxanes (2-A), there may be used:

(a) polysiloxanes modified with polyethers represented by the formula (III):

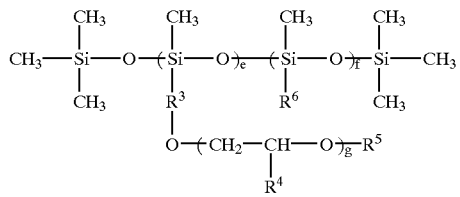

wherein $R^3$ is —$(-CH_2-)_h$—; $R^4$ is —$(-CH_2-)_i$—$CH_3$; $R^5$ is —OH, —COOH, —CH=$CH_2$, —$C(CH_3)$=$CH_2$ or —$(-CH_2-)_j$—$CH_3$; $R^6$ is —$(-CH_2-)_k$—$CH_3$; g and h are an integer from 1 to 15; i, j and k are an integer from 0 to 15; e is an integer from 1 to 50; and f is an integer from 1 to 300;

(b) polysiloxanes modified with polyesters represented by the formula (IV):

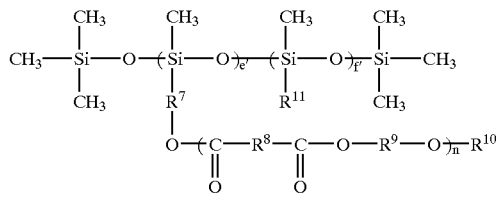

wherein $R^7$, $R^8$ and $R^9$ are —$(-CH_2-)_q$—and may be the same or different; $R^{10}$ is —OH, —COOH, —CH=$CH_2$, —$C(CH_3)$=$CH_2$ or —$(-CH_2-)_r$—$CH_3$; $R^{11}$ is —$(-CH_2-)_s$—$CH_3$; n and q are an integer from 1 to 15; r and s are an integer from 0 to 15; e' is an integer from 1 to 50; and f' is an integer from 1 to 300;

(c) polysiloxanes modified with epoxy compounds represented by the formula (V):

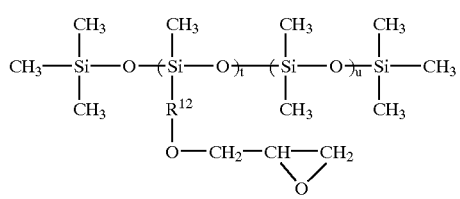

wherein $R^{12}$ is —$(-CH_2-)_v$—; v is an integer from 1 to 15; t is an integer from 1 to 50; and u is an integer from 1 to 300; or a mixture thereof.

Among these modified polysiloxanes (2-A), in view of the desorption percentage and the adhering effect of the phthalocyanine-based pigments, the polysiloxanes modified with the polyethers represented by the formula (III), are preferred.

As the terminal-modified polysiloxanes (2-B), there may be used those represented by the formula (VI):

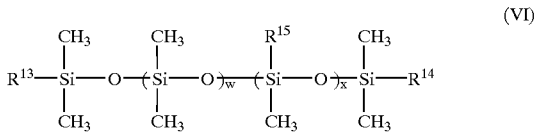

wherein $R^{13}$ and $R^{14}$ are —OH, $R^{16}$OH or $R^{17}$COOH and may be the same or different; $R^{15}$ is —$CH_3$ or —$C_6H_5$; $R^{16}$ and $R^{17}$ are —$(-CH_2-)_y$—; y is an integer from 1 to 15; w is an integer from 1 to 200; and x is an integer from 0 to 100.

Among these terminal-modified polysiloxanes, in view of the desorption percentage and the adhering effect of the phthalocyanine-based pigments, the polysiloxanes whose terminals are modified with carboxylic acid groups are preferred.

The coating amount of the organosilicon compounds is usually 0.02 to 5.0% by weight, preferably 0.03 to 4.0% by weight, more preferably 0.05 to 3.0% by weight (calculated as Si) based on the weight of the non-magnetic core particles coated with the organosilicon compounds.

When the coating amount of the organosilicon compounds is less than 0.02% by weight, it may be difficult to adhere the phthalocyanine-based pigments in a predetermined.

When the coating amount of the organosilicon compounds is more than 5.0% by weight, the phthalocyanine-based pigments can be adhered in a predetermined. Therefore, it is unnecessary and meaningless to coat the non-magnetic core particles with such a large amount of the organosilicon compounds.

As the phthalocyanine-based pigments used in the present invention, there may be used phthalocyanine-based pigments such as metal-free phthalocyanine blue, phthalocyanine blue (copper phthalocyanine) and fast sky blue (sulfonated copper phthalocyanine), and phthalocyanine green, or the like. In the consideration of the blackness of the obtained non-magnetic acicular composite particles, among these pigments, it is preferred to use of phthalocyanine blue.

The amount of the phthalocyanine-based pigment adhered is usually 1 to 100 parts by weight, preferably 1.5 to 90 parts by weight, more preferably 2 to 80 parts by weight based on 100 parts by weight of the acicular hematite particles or the acicular iron oxide hydroxide particles.

When the amount of the phthalocyanine-based pigment adhered is less than 1 part by weight, it may be difficult to obtain non-magnetic acicular composite particles having sufficient blackness and resin adsorptivity because of the insufficient amount of the phthalocyanine-based pigment adhered. When the amount of the phthalocyanine-based pigment adhered is more than 100 parts by weight, although the obtained non-magnetic acicular composite particles can show a sufficient resin adsorptivity, the phthalocyanine-based pigment may tend to desorbed therefrom because the amount of the phthalocyanine-based pigment adhered is too large. As a result, the obtained non-magnetic acicular composite particles may tend to be deteriorated in dispersibility in vehicle upon the production of a non-magnetic coating composition.

The particle shape and particle size of the non-magnetic acicular composite particles according to the present invention are considerably varied depending upon those of acicular hematite particles or acicular iron oxide hydroxide particles as core particles. Specifically, the non-magnetic acicular composite particles are substantially similar in particle shape to that of the core particles, and have a slightly larger particle size than that of the core particles.

The average major axis diameter of the non-magnetic acicular composite particles according to the present invention is usually 0.01 to 0.3.0 μm, preferably 0.02 to 0.25 μm, more preferably 0.03 to 0.20 μm.

When the average major axis diameter thereof is more than 0.3 μm, since the non-magnetic acicular composite particles are coarse, the surface smoothness of the coating film formed using such particles may be impaired. On the other hand, when the average major axis diameter of the non-magnetic acicular composite particles is less than 0.01 μm, the intermolecular force between the particles may be increased due to the fineness thereof, so that it may become difficult to uniformly disperse the particles in a vehicle.

The aspect ratio (average major axis diameter/average minor axis diameter) of the non-magnetic acicular composite particles according to the present invention is usually 2.0:1 to 20.0:1, preferably 2.5:1 to 18.0:1, more preferably 3.0:1 to 15.0:1.

When the aspect ratio is more than 20.0:1, the particles may be entangled with each other in vehicle, thereby causing a tendency that the dispersibility thereof may be deteriorated or the viscosity thereof may be increased. On the other hand, when the aspect ratio is less than 2.0:1, it may be difficult to obtain a coating film having a sufficient strength.

Further, it is preferred that the non-magnetic acicular composite particles according to the present invention have a geometrical standard deviation of major axis diameter of not more than 1.50. When the geometrical standard deviation of major axis diameter is more than 1.50, since coarse particles tend to be present in the non-magnetic acicular composite particles, the surface smoothness of the coating film formed using such particles may be impaired. With the consideration of the surface smoothness, the geometrical standard deviation of major axis diameter of the non-magnetic acicular composite particles according to the present invention is preferably not more than 1.48, more preferably not more than 1.45. Further, in view of industrial production of the non-magnetic acicular composite particles, the lower limit of the geometrical standard deviation of major axis diameter is preferably 1.01.

The BET specific surface area of the non-magnetic acicular composite particles according to the present invention is usually 35 to 250 m$^2$/g, preferably 38 to 200 m$^2$/g, more preferably 40 to 180 m$^2$/g.

If the BET specific surface area thereof is less than 35 m$^2$/g, the acicular hematite particles or the acicular iron oxide hydroxide particles may be coarse particles or large particles produced by sintering a particle and between particles, which are apt to exert a deleterious influence on the surface smoothness of the coating film formed using such particles. On the other hand, if the BET specific surface area thereof is more than 250 m$^2$/g, the increase of the intermolecular force due to the fine particles. As a result, it may be difficult to uniformly disperse the particles in a vehicle.

The percentage of desorption of the phthalocyanine-based pigment from the non-magnetic acicular composite particles according to the present invention is usually not more than 15%, preferably not more than 12%. When the desorption percentage of the phthalocyanine-based pigment is more than 15%, the desorbed the phthalocyanine-based pigment tend to inhibit the composite particles from being uniformly dispersed in a vehicle upon the production of non-magnetic coating composition.

As to the blackness of the non-magnetic acicular composite particles, the upper limit of the L* value thereof is usually 20.0. When the L* value is more than 20.0, the obtained particles may show a too high lightness and, therefore, become insufficient in blackness. As a result, it is difficult to sufficiently reduce the light transmittance of a substrate for magnetic recording medium obtained from such particles. The upper limit of the L* value is preferably 19.0, and the lower limit of the L* value is preferably about 4.0. As to the blackness of the non-magnetic acicular composite particles produced by using the black acicular hematite particles or black acicular iron oxide hydroxide particles as core particles, the upper limit of the L* value is preferably 18.0, more preferably 17.0, and the lower limit of the L* value is about 4.0. As to the blackness of the non-magnetic acicular composite particles produced by using acicular hematite particles or acicular iron oxide hydroxide particles onto which carbon black is adhered, as core particles, the upper limit of the L* value is preferably 12.5, more preferably 11.0, and the lower limit of the L* value is about 2.0.

The volume resistivity of the non-magnetic acicular composite particles according to the present invention is preferably not more than $1.0 \times 10^9$ Ω·cm, more preferably not more than $7.5 \times 10^8$ Ω·cm, still more preferably not more than $5.0 \times 10^8$ Ω·cm.

The resin adsorptivity of the non-magnetic acicular composite particles according to the present invention is usually not less than 72%, preferably not less than 73%, more preferably not less than 74%. The upper limit thereof is preferably 95%.

In the non-magnetic acicular composite particles according to the present invention, the acicular hematite particle or acicular iron oxide hydroxide particle as non-magnetic core particle may be preliminarily coated with at least one compound selected from the group consisting of hydroxides of aluminum, oxides of aluminum, hydroxides of silicon and oxides of silicon (hereinafter referred to as "hydroxides and/or oxides of aluminum and/or silicon"), if required. The obtained acicular hematite particles or the acicular iron oxide hydroxide particles having a coating layer composed of hydroxides and/or oxides of aluminum and/or silicon can more effectively prevent the phthalocyanine-based pigment adhered thereonto from being desorbed therefrom as compared to the case where the hematite particles or the acicular iron oxide hydroxide particles are uncoated with hydroxides and/or oxides of aluminum and/or silicon.

The amount of the coating layer composed of hydroxides and/or oxides of aluminum and/or silicon is preferably 0.01 to 20% by weight (calculated as Al, SiO$_2$ or a sum of Al and SiO$_2$) based on the weight of the hematite particles or the acicular iron oxide hydroxide particles coated.

When the amount of the coating layer composed of hydroxides and/or oxides of aluminum and/or silicon is less than 0.01% by weight, the improvement effect of preventing the desorption of the phthalocyanine-based pigment may not be obtained. When the amount of the coating layer composed of hydroxides and/or oxides of aluminum and/or silicon falls within the above-specified range of 0.01 to 20% by weight, the effect of preventing the desorption of the phthalocyanine-based pigment can be sufficiently exhibited. Therefore, it is unnecessary and meaningless to form the coating layer composed of hydroxides and/or oxides of aluminum and/or silicon in such a large amount exceeding 20% by weight.

The particle size, geometrical standard deviation value, BET specific surface area value, volume resistivity value, resin adsorptivity and L* value of the non-magnetic acicular composite particles comprising the acicular hematite particles or the acicular iron oxide hydroxide particles having the coating layer composed of hydroxides and/or oxides of aluminum and/or silicon, are substantially the same as those of the non-magnetic acicular composite particles comprising the acicular hematite particles or the acicular iron oxide hydroxide particles uncoated with the hydroxides and/or oxides of aluminum and/or silicon. The desorption percentage of the phthalocyanine-based pigment from the non-magnetic acicular composite particles can be reduced by forming the coating layer composed of hydroxides and/or oxides of aluminum and/or silicon on each hematite particle, and is preferably not more than 12%, more preferably not more than 10%.

Next, the magnetic recording medium according to the present invention is described.

The magnetic recording medium according to the present invention is constituted by a non-magnetic base film, a non-magnetic undercoat layer formed on the non-magnetic base film, comprising a binder resin and the non-magnetic acicular composite particles, and a magnetic coating film formed on the non-magnetic undercoat layer, comprising a binder resin and magnetic particles.

As the non-magnetic base film, the following materials which are at present generally used for the production of a magnetic recording medium are usable as a raw material: a synthetic resin such as polyethylene terephthalate, polyethylene, polypropylene, polycarbonate, polyethylene naphthalate, polyamide, polyamideimide and polyimide; foil and plate of a metal such as aluminum and stainless steel; and various kinds of paper. The thickness of the non-magnetic base film varies depending upon the material, but it is usually about 1.0 to 300 μm, preferably 2.0 to 200 μm.

In the case of a magnetic disc, polyethylene terephthalate is usually used as the non-magnetic base film. The thickness thereof is usually 50 to 300 μm, preferably 60 to 200 μm. In the case of a magnetic tape, when polyethylene terephthalate is used as the base film, the thickness thereof is usually 3 to 100 μm, preferably 4 to 20 μm. When polyethylene naphthalate is used, the thickness thereof is usually 3 to 50 μm, preferably 4 to 20 μm. When polyamide is used, the thickness thereof is usually 2 to 10 μm, preferably 3 to 7 μm.

The non-magnetic undercoat layer formed on the non-magnetic base film, comprises a binder resin and the non-magnetic acicular composite particles or the coated non-magnetic acicular composite particles with the coating layer composed of hydroxides and/or oxides of aluminum and/or silicon.

As the binder resin used in the present invention, the following resins which are at present generally used for the production of a magnetic recording medium are usable: vinyl chloride-vinyl acetate copolymer, urethane resin, vinyl chloride-vinyl acetate-maleic acid copolymer, urethane elastomer, butadiene-acrylonitrile copolymer, polyvinyl butyral, cellulose derivative such as nitrocellulose, polyester resin, synthetic rubber resin such as polybutadiene, epoxy resin, polyamide resin, polyisocyanate, electron radiation curing acryl urethane resin and mixtures thereof.

Each of these resin binders may contain a functional group such as —OH, —COOH, —SO$_3$M, —OPO$_2$M$_2$ and —NH$_2$, wherein M represents H, Na or K. With the consideration of the dispersibility of the particles, a binder resin containing a functional group —COOH or —SO$_3$M is preferable.

The mixing ratio of the non-magnetic acicular composite particles with the binder resin is usually 5 to 2000 parts by weight, preferably 100 to 1000 parts by weight based on 100 parts by weight of the binder resin.

When the amount of the non-magnetic acicular composite particles blended is less than 5 parts by weight, the amount of the non-magnetic acicular composite particles contained in the non-magnetic coating composition is too small. As a result, there may not be formed a coating film in which the non-magnetic acicular composite particles are continuously dispersed, and the surface smoothness of the coating film and the stiffness of the non-magnetic substrate may become insufficient. When the amount of the non-magnetic acicular composite particles blended is more than 2,000 parts by weight, the amount of the non-magnetic acicular composite particles becomes too large as compared to that of the binder resin, thereby failing to sufficiently disperse the non-magnetic acicular composite particles in the non-magnetic coating composition. As a result, it may be difficult to form a coating film having a sufficiently smooth surface. Further, the non-magnetic acicular composite particles may not be sufficiently bound together by the binder resin, so that the obtained coating film becomes brittle.

A lubricant, a polishing agent, an antistatic agent, etc. which are generally used for the production of a magnetic recording medium may be added to the non-magnetic undercoat layer in amount of usually 0.1 to 50 parts by weight based on 100 parts by weight of the binder resin.

The non-magnetic undercoat layer of the present invention preferably has a film thickness of 0.2 to 10.0 μm. When the thickness of the non-magnetic undercoat layer is less than 0.2 μm, it is difficult to improve the surface roughness of the non-magnetic substrate, and the stiffness of the non-magnetic undercoat layer tends to be insufficient. In the consideration of reduction in thickness of the obtained magnetic recording medium and stiffness of the coating film, the thickness of the non-magnetic undercoat layer is more preferably in the range of 0.5 to 5.0 μm.

The non-magnetic undercoat layer according to the present invention has the following properties.

The non-magnetic undercoat layer according to the present invention has a gloss (of the coating film) of usually 176 to 300%; a surface roughness Ra (of the coating film) of usually 0.5 to 11.0 nm; a Young's modulus (relative value to a commercially available video tape: and AV T-120 produced by Victor Company of Japan, Limited) of usually 126 to 160; a linear adsorption coefficient (of the coating film) of usually 1.20 to 10.0 μm$^{-1}$; and a surface resistivity of 1×10$^5$ to 5.0×10$^{12}$ Ω/cm$^2$.

In case of using the non-magnetic acicular composite particles as non-magnetic particles, in which no coating layer composed of hydroxides and/or oxides of aluminum and/or silicon are used as non-magnetic particles is formed between the coating layer composed of the organosilicon compound and the surface of the acicular hematite particle or acicular iron oxide hydroxide particle, the non-magnetic undercoat layer according to the present invention has a gloss (of the coating film) of usually 176 to 300%, preferably 180 to 300%, more preferably 184 to 300%; a surface roughness Ra (of the coating film) of usually 0.5 to 11.0 nm, preferably 0.5 to 10.5 nm; a Young's modulus (relative value to a commercially available video tape: and AV T-120 produced by Victor Company of Japan, Limited) of usually 126 to 160, preferably 128 to 160; a linear adsorption coefficient (of the coating film) of usually 1.20 to 5.0 μm$^{-1}$, preferably 1.25 to 5.0 μm$^{-1}$; and a surface resistivity of 1.0×10$^5$ to 5.0×10$^{12}$ Ω/cm$^2$, preferably 1.0×10$^5$ to 2.5×10$^{12}$ Ω/cm$^2$, more preferably 1.0×10$^5$ to 1.0×10$^{12}$ Ω/cm$^2$.

In case of using the non-magnetic acicular composite particles as non-magnetic particles, in which the coating layer composed of hydroxides and/or oxides of aluminum and/or silicon are used as non-magnetic particles is formed between the coating layer composed of the organosilicon compound and the surface of the acicular hematite particle or acicular iron oxide hydroxide particle, the non-magnetic undercoat layer according to the present invention has a gloss (of the coating film) of usually 180 to 300%, preferably 184 to 300%, more preferably 188 to 300%; a surface roughness Ra (of the coating film) of usually 0.5 to 10.5 nm, preferably 0.5 to 10.0 nm; a Young's modulus (relative value to a commercially available video tape: and AV T-120 produced by Victor Company of Japan, Limited) of usually 128 to 160, preferably 130 to 160; a linear adsorption coefficient (of the coating film) of usually 1.20 to 5.0 $\mu m^{-1}$, preferably 1.25 to 5.0 $\mu m^{-1}$; and a surface resistivity of $1.0 \times 10^5$ to $5.0 \times 10^{12}$ $\Omega/cm^2$, preferably $1.0 \times 10^5$ to $2.5 \times 10^{12}$ $\Omega/cm^2$, more preferably $1.0 \times 10^5$ to $1.0 \times 10^{12}$ $\Omega/cm^2$.

In case of using the non-magnetic acicular composite particles as non-magnetic particles, in which the black non-magnetic acicular composite particles precursor (B) is used as core particle, and no coating layer composed of hydroxides and/or oxides of aluminum and/or silicon are used as non-magnetic particles is formed between the coating layer composed of the organosilicon compound and the surface of the acicular hematite particle or acicular iron oxide hydroxide particle, the non-magnetic undercoat layer according to the present invention has a gloss (of the coating film) of usually 180 to 300%, preferably 184 to 300%, more preferably 188 to 300%; a surface roughness Ra (of the coating film) of usually 0.5 to 10.5 nm, preferably 0.5 to 10.0 nm; a Young's modulus (relative value to a commercially available video tape: and AV T-120 produced by Victor Company of Japan, Limited) of usually 128 to 160, preferably 130 to 160; a linear adsorption coefficient (of the coating film) of usually 1.30 to 10.0 $\mu m^{-1}$, preferably 1.35 to 10.0 $\mu m^{-1}$; and a surface resistivity of $1.0 \times 10^5$ to $5.0 \times 10^{12}$ $\Omega/cm^2$, preferably $1.0 \times 10^5$ to $1.0 \times 10^{12}$ $\Omega/cm^2$, more preferably $1.0 \times 10^5$ to $5.0 \times 10^{11}$ $\Omega/cm^2$.

In case of using the non-magnetic acicular composite particles as non-magnetic particles, in which the black non-magnetic acicular composite particles precursor (B) is used as core particle, and the coating layer composed of hydroxides and/or oxides of aluminum and/or silicon are used as non-magnetic particles is formed between the coating layer composed of the organosilicon compound and the surface of the acicular hematite particle or acicular iron oxide hydroxide particle, the non-magnetic undercoat layer according to the present invention has a gloss (of the coating film) of usually 184 to 300%, preferably 188 to 300%, more preferably 192 to 300%; a surface roughness Ra (of the coating film) of usually 0.5 to 10.0 nm, preferably 0.5 to 9.5 nm; a Young's modulus (relative value to a commercially available video tape: and AV T-120 produced by Victor Company of Japan, Limited) of usually 130 to 160, preferably 132 to 160; a linear adsorption coefficient (of the coating film) of usually 1.30 to 10.0 $\mu m^{-1}$, preferably 1.35 to 10.0 $\mu m^{-1}$; and a surface resistivity of $1.0 \times 10^5$ to $5.0 \times 10^{12}$ $\Omega/cm^2$, preferably $1.0 \times 10^5$ to $1.0 \times 10^{12}$ $\Omega/cm^2$, more preferably $1.0 \times 10^5$ to $5.0 \times 10^{11}$ $\Omega/cm^2$.

The magnetic recording layer formed on the non-magnetic undercoat layer, is constituted by a binder resin and magnetic particles.

As the magnetic particles used in the present invention, magnetic particles containing iron as a main component are usable, and there may be exemplified magnetic iron oxide particles such as magnetic particles ($\gamma$-$Fe_2O_3$), magnetite particles ($Fe_x \cdot Fe_2O_3$ ($0<x\leq 1$)) and berthollide compound particles which are an intermediate oxide between magnetite and magnetite; Co or Co—Fe coated magnetic iron oxide particles; particles obtained by incorporating any one or more different kinds of elements other than Fe, such as Co, Al, Ni, P, Zn, Si, B or the like in Co or Co—Fe coated magnetic iron oxide particles; magnetic acicular metal particles containing iron as a main component, which may contain elements other than Fe at least one selected from the group consisting of Co, Al, Ni, P, Si, Zn, B, Nd, La and Y, including magnetic acicular iron-based alloy particles; magnetoplumbite-type ferrite particles such as plate-like ferrite particles containing Ba, Sr or Ba—Sr; plate-like magnetoplumbite-type ferrite particles obtained by incorporating other metals such as Co, Ni, Zn, Mg, Mn, Ti, Sn, Zr, Nb, Cu, Mo or the like as a coercive force-reducing agent in the plate-like magnetoplumbite-type ferrite particles; or the like.

With the consideration of the short-wavelength recording and the high-density recording, Co-coated magnetic iron oxide particles, magnetic acicular metal particles containing iron as a main component and magnetic acicular iron-based alloy particles containing elements other than Fe at least one selected from the group consisting of Co, Al, Ni, P, Si, Zn, B, Nd, La, Y or the like are preferable.

The magnetic acicular iron-based alloy particles comprising (i) iron and Al; (ii) iron, Co and Al, (iii) iron, Al and at least one rare-earth metal such as Nd, La and Y, or (iv) iron, Co, Al and at least one rare-earth metal such as Nd, La and Y is even more preferable from the point of the durability of the magnetic recording medium. Further, the magnetic acicular iron-based alloy particles comprising iron, Al and at least one rare-earth metal such as Nd, La and Y is most preferable.

More specifically, the magnetic acicular iron-based alloy particles may be exemplified as follows.

1) Magnetic acicular iron-based alloy particles comprises iron; and cobalt of usually 0.05 to 40% by weight, preferably 1.0 to 35% by weight, more preferably 3 to 30% by weight (calculated as Co) based on the weight of the magnetic acicular iron-based alloy particles.

2) Magnetic acicular iron-based alloy particles comprises iron; and aluminum of usually 0.05 to 10% by weight, preferably 0.1 to 7% by weight (calculated as Al) based on the weight of the magnetic acicular iron-based alloy particles.

3) Magnetic acicular iron-based alloy particles comprises iron; cobalt of usually 0.05 to 40% by weight, preferably 1.0 to 35% by weight, more preferably 3 to 30% by weight (calculated as Co) based on the weight of the magnetic acicular iron-based alloy particles; and aluminum of usually 0.05 to 10% by weight, preferably 0.1 to 7% by weight (calculated as Al) based on the weight of the magnetic acicular iron-based alloy particles.

4) Magnetic acicular iron-based alloy particles comprises iron; cobalt of usually 0.05 to 40% by weight, preferably 1.0 to 35% by weight, more preferably 3 to 30% by weight (calculated as Co) based on the weight of the magnetic acicular iron-based alloy particles; and at least one selected from the group consisting of Nd, La and Y of usually 0.05 to 10% by weight, preferably 0.1 to 7% by weight (calculated as the corresponding element) based on the weight of the magnetic acicular iron-based alloy particles.

5) Magnetic acicular iron-based alloy particles comprises iron; aluminum of usually 0.05 to 10% by weight, preferably 0.1 to 7% by weight (calculated as Al) based on the weight of the magnetic acicular iron-based alloy particles; and at least one selected from the group consisting of Nd, La and Y of usually 0.05 to 10% by weight, preferably 0.1 to 7% by weight (calculated as the corresponding element) based on the weight of the magnetic acicular iron-based alloy particles.

6) Magnetic acicular iron-based alloy particles comprises iron; cobalt of usually 0.05 to 40% by weight, preferably 1.0 to 35% by weight, more preferably 3 to 30% by weight (calculated as Co) based on the weight of the magnetic acicular iron-based alloy particles; aluminum of usually 0.05 to 10% by weight, preferably 0.1 to 7% by weight (calculated as Al) based on the weight of the magnetic acicular iron-based alloy particles; and at least one selected from the group consisting of Nd, La and Y of usually 0.05 to 10% by weight, preferably 0.1 to 7% by weight (calculated as the corresponding element) based on the weight of the magnetic acicular iron-based alloy particles.

7) Magnetic acicular iron-based alloy particles comprises iron; cobalt of usually 0.05 to 40% by weight, preferably 1.0 to 35% by weight, more preferably 3 to 30% by weight (calculated as Co) based on the weight of the magnetic acicular iron-based alloy particles; and at least one selected from the group consisting of Ni, P, Si, Zn, Ti, Cu and B of usually 0.05 to 10% by weight, preferably 0.1 to 7% by weight (calculated as the corresponding element) based on the weight of the magnetic acicular iron-based alloy particles.

8) Magnetic acicular iron-based alloy particles comprises iron; aluminum of usually 0.05 to 10% by weight, preferably 0.1 to 7% by weight (calculated as Al) based on the weight of the magnetic acicular iron-based alloy particles; and at least one selected from the group consisting of Ni, P, Si, Zn, Ti, Cu and B of usually 0.05 to 10% by weight, preferably 0.1 to 7% by weight (calculated as the corresponding element) based on the weight of the magnetic acicular iron-based alloy particles.

9) Magnetic acicular iron-based alloy particles comprises iron; cobalt of usually 0.05 to 40% by weight, preferably 1.0 to 35% by weight, more preferably 3 to 30% by weight (calculated as Co) based on the weight of the magnetic acicular iron-based alloy particles; aluminum of usually 0.05 to 10% by weight, preferably 0.1 to 7% by weight (calculated as Al) based on the weight of the magnetic acicular iron-based alloy particles; and at least one selected from the group consisting of Ni, P, Si, Zn, Ti, Cu and B of usually 0.05 to 10% by weight, preferably 0.1 to 7% by weight (calculated as the corresponding element) based on the weight of the magnetic acicular iron-based alloy particles.

10) Magnetic acicular iron-based alloy particles comprises iron; cobalt of usually 0.05 to 40% by weight, preferably 1.0 to 35% by weight, more preferably 3 to 30% by weight (calculated as Co) based on the weight of the magnetic acicular iron-based alloy particles; at least one selected from the group consisting of Nd, La and Y of usually 0.05 to 10% by weight, preferably 0.1 to 7% by weight (calculated as the corresponding element) based on the weight of the magnetic acicular iron-based alloy particles; and at least one selected from the group consisting of Ni, P, Si, Zn, Ti, Cu and B of usually 0.05 to 10% by weight, preferably 0.1 to 7% by weight (calculated as the corresponding element) based on the weight of the magnetic acicular iron-based alloy particles.

11) Magnetic acicular iron-based alloy particles comprises iron; aluminum of usually 0.05 to 10% by weight, preferably 0.1 to 7% by weight (calculated as Al) based on the weight of the magnetic acicular iron-based alloy particles; at least one selected from the group consisting of Nd, La and Y of ordinarily 0.05 to 10% by weight, preferably 0.1 to 7% by weight (calculated as the corresponding element) based on the weight of the magnetic acicular iron-based alloy particles; and at least one selected from the group consisting of Ni, P, Si, Zn, Ti, Cu and B of usually 0.05 to 10% by weight, preferably 0.1 to 7% by weight (calculated as the corresponding element) based on the weight of the magnetic acicular iron-based alloy particles.

12) Magnetic acicular iron-based alloy particles comprises iron; cobalt of usually 0.05 to 40% by weight, preferably 1.0 to 35% by weight, more preferably 3 to 30% by weight (calculated as Co) based on the weight of the magnetic acicular iron-based alloy particles; aluminum of usually 0.05 to 10% by weight, preferably 0.1 to 7% by weight (calculated as Al) based on the weight of the magnetic acicular iron-based alloy particles; at least one selected from the group consisting of Nd, La and Y of usually 0.05 to 10% by weight, preferably 0.1 to 7% by weight (calculated as the corresponding element) based on the weight of the magnetic acicular iron-based alloy particles; and at least one selected from the group consisting of Ni, P, Si, Zn, Ti, Cu and B of usually 0.05 to 10% by weight, preferably 0.1 to 7% by weight (calculated as the corresponding element) based on the weight of the magnetic acicular iron-based alloy particles.

The iron content in the particles is the balance, and is preferably 50 to 99% by weight, more preferably 60 to 95% by weight (calculated as Fe) based on the weight of the magnetic acicular metal particles containing iron as a main component or the magnetic acicular iron-based alloy particles.

It is preferred that the shape of the magnetic particles is acicular, cubic or plate-like. The acicular shape may include not only needle-shape but also spindle-shape, rice ball-shape, or the like.

In the case that the shape of the magnetic particles is acicular, the magnetic particles used in the present invention have an average major axis diameter of usually 0.01 to 0.5 $\mu$m, preferably 0.03 to 0.3 $\mu$m, an average minor axis diameter of usually 0.0007 to 0.17 $\mu$m, preferably 0.003 to 0.10 $\mu$m.

In the case that the shape of the magnetic particles is plate-like, the magnetic particles used in the present invention have an average major axis diameter of usually 0.01 to 0.5 $\mu$m, preferably 0.03 to 0.3 $\mu$m, an average thickness of usually 0.0007 to 0.17 $\mu$m, preferably 0.003 to 0.10 $\mu$m.

In the case that the shape of the magnetic particles is acicular, the magnetic particles have an aspect ratio of usually not less than 3.0:1, preferably and not less than 5.0:1. The upper limit of the aspect ratio is usually 15.0:1, preferably 10.0:1 with the consideration of the dispersibility in the vehicle.

In the case that the shape of the magnetic particles is plate-like, the magnetic particles have a plate ratio (an average major axis diameter/average thickness) of usually not less than 2.0:1, preferably and not less than 3.0:1. The upper limit of the plate ratio is usually 20.0:1, preferably 15.0:1 with the consideration of the dispersibility in the vehicle.

As to the magnetic properties of the magnetic particles used in the present invention, the coercive force is usually 39.8 to 318.3 kA/m (500 to 4000 Oe), preferably 43.8 to 318.3 kA/m (550 to 4000 Oe), and the saturation magnetization is usually 50 to 170 Am$^2$/kg (50 to 170 emu/g), preferably 60 to 170 Am$^2$/kg (60 to 170 emu/g).

As to the magnetic properties of the magnetic iron oxide particles or Co-coated magnetic iron oxide particles used in the present invention, the coercive force is usually 39.8 to 135.3 kA/m (500 to 1700 Oe), preferably 43.8 to 135.3 kA/m (550 to 1700 Oe), and the saturation magnetization is usually 60 to 90 Am$^2$/kg (60 to 90 emu/g), preferably 65 to 90 Am$^2$/kg (65 to 90 emu/g).

With the consideration of the high-density recording, as to the magnetic properties of the magnetic acicular metal particles containing iron as a main component or magnetic acicular iron-based alloy particles used in the present invention, the coercive force is usually 63.7 to 278.5 kA/m (800 to 3500 Oe), preferably 71.6 to 278.5 kA/m (900 to 3500 Oe), and the saturation magnetization is usually 90 to 170 Am$^2$/kg (90 to 170 emu/g), preferably 100 to 170 Am$^2$/kg (100 to 170 emu/g).

As to the magnetic properties of the magnetoplumbite-type ferrite particles used in the present invention, the coercive force is usually 39.8 to 318.3 kA/m (500 to 4000 Oe), preferably 51.7 to 318.3 kA/m (650 to 4000 Oe), and the saturation magnetization is usually 40 to 70 Am$^2$/kg (40 to 70 emu/g), preferably 45 to 70 Am$^2$/kg (45 to 70 emu/g).

As the binder resin for the magnetic recording layer, the same binder resin as that used for the production of the non-magnetic undercoat layer is usable.

The thickness of the magnetic recording layer obtained by applying the magnetic coating composition on the surface of the non-magnetic undercoat layer and dried, is usually in the range of 0.01 to 5.0 μm, preferably 0.05 to 1.0 μm. If the thickness is less than 0.01 μm, uniform coating may be difficult, so that unfavorable phenomenon such as unevenness on the coating surface is observed. On the other hand, when the thickness exceeds 5.0 μm, it may be difficult to obtain desired electromagnetic performance due to an influence of diamagnetism.

The mixing ratio of the magnetic particles with the binder resin in the magnetic recording layer is usually 200 to 2000 parts by weight, preferably 300 to 1500 parts by weight based on 100 parts by weight of the binder resin.

A lubricant, a polishing agent, an antistatic agent, etc., which are generally used for the production of a magnetic recording medium may be added to the magnetic recording layer in an amount of usually 0.1 to 50 parts by weight based on 100 parts by weight of the binder resins.

The magnetic recording medium according to the present invention has the following properties.

The magnetic recording medium according to the present invention has a coercive force of usually 39.8 to 318.3 kA/m (500 to 4000 Oe); a squareness (residual magnetic flux density Br/saturation magnetic flux density Bm) of usually 0.85 to 0.95; a gloss (of the coating film) of usually 170 to 300%; a surface roughness Ra (of the coating film) of usually not more than 11.5 nm; a Young's modulus (relative value to a commercially available video tape: AV T-120 produced by Victor Company of Japan, Limited) of usually 128 to 160; a linear adsorption coefficient (of the coating film) of usually 1.20 to 5.00 μm$^{-1}$; a surface resistivity of not more than 5×10$^{10}$ Ω/cm$^2$. As to the durability, the running durability of the magnetic recording medium is usually not less than 22 minutes; and the scratch resistance of the magnetic recording medium is usually A or B, when evaluated into four ranks: A (No scratch), B (A few scratches), C (Many scratches) and D (A great many scratches).

In case of using the non-magnetic acicular composite particles as non-magnetic particles, in which no coating layer composed of hydroxides and/or oxides of aluminum and/or silicon is formed between the coating layer composed of the organosilicon compound and the surface of the acicular hematite particle or acicular iron oxide hydroxide particle, and using the above-mentioned magnetic particles, the magnetic recording medium according to the present invention has a coercive force of usually 39.8 to 318.3 kA/m (500 to 4000 Oe), preferably 43.8 to 318.3 kA/m (550 to 4000 Oe); a squareness (residual magnetic flux density Br/saturation magnetic flux density Bm) of usually 0.85 to 0.95, preferably 0.86 to 0.95; a gloss (of the coating film) of usually 170 to 300%, preferably 175 to 300%; a surface roughness Ra (of the coating film) of usually not more than 11.5 nm, preferably 2.0 to 11.0 nm, more preferably 2.0 to 10.5 nm; a Young's modulus (relative value to a commercially available video tape: AV T-120 produced by Victor Company of Japan, Limited) of usually 128 to 160, preferably 130 to 160; a linear adsorption coefficient (of the coating film) of usually 1.20 to 5.00 μm$^{-1}$, preferably 1.25 to 5.00 μm$^{-1}$; a surface resistivity of not more than 5.0×10$^{10}$ Ω/cm$^2$, preferably not more than 2.5×10$^{10}$ Ω/cm$^2$, more preferably not more than 1.0×10$^{10}$ Ω/cm$^2$. As to the durability, the running durability of the magnetic recording medium is usually not less than 22 minutes, preferably not less than 24 minutes; and the scratch resistance of the magnetic recording medium is usually A or B, preferably A, when evaluated into four ranks: A (No scratch), B (A few scratches), C (Many scratches) and D (A great many scratches).

In case of using the non-magnetic acicular composite particles as non-magnetic particles, in which the coating layer composed of hydroxides and/or oxides of aluminum and/or silicon is formed between the coating layer composed of the organosilicon compound and the surface of the acicular hematite particle or acicular iron oxide hydroxide particle, and using the above-mentioned magnetic particles, the magnetic recording medium according to the present invention has a coercive force of usually 39.8 to 318.3 kA/m (500 to 4000 Oe), preferably 43.8 to 318.3 kA/m (550 to 4000 Oe); a squareness (residual magnetic flux density Br/saturation magnetic flux density Bm) of usually 0.85 to 0.95, preferably 0.86 to 0.95; a gloss (of the coating film) of usually 175 to 300%, preferably 180 to 300%; a surface roughness Ra (of the coating film) of usually not more than 11.0 nm, preferably 2.0 to 10.5 nm, more preferably 2.0 to 10.0 nm; a Young's modulus (relative value to a commercially available video tape: AV T-120 produced by Victor Company of Japan, Limited) of usually 130 to 160, preferably 132 to 160; a linear adsorption coefficient (of the coating film) of usually 1.20 to 5.00 μm$^{-1}$, preferably 1.25 to 5.00 μm$^{-1}$; a surface resistivity of not more than 5.0×10$^{10}$ Ω/cm$^2$, preferably not more than 2.5×10$^{10}$ Ω/cm$^2$, more preferably not more than 1.0×10$^{10}$ Ω/cm$^2$. As to the durability, the running durability of the magnetic recording medium is usually not less than 23 minutes, preferably not less than 25 minutes; and the scratch resistance of the magnetic recording medium is usually A or B, preferably A, when evaluated into four ranks: A (No scratch), B (A few scratches), C (Many scratches) and D (A great many scratches).

With the consideration of the high-density recording, in case of using the magnetic acicular metal particles containing iron as a main component or magnetic acicular iron-based alloy particles as the magnetic particles, and using the non-magnetic acicular composite particles as non-magnetic particles, in which no coating layer composed of hydroxides and/or oxides of aluminum and/or silicon is formed between the coating layer composed of the organosilicon compound and the surface of the acicular hematite particle or acicular iron oxide hydroxide particle, the magnetic recording medium according to the present invention has a coercive force of usually 63.8 to 278.5 kA/m (800 to 3500 Oe), preferably 71.6 to 278.5 kA/m (900 to 3500 Oe); a squareness (residual magnetic flux density Br/saturation magnetic flux density Bm) of usually 0.87 to 0.95, preferably 0.88 to 0.95; a gloss (of the coating film) of usually 195 to 300%, preferably 200 to 300%; a surface roughness Ra (of the coating film) of usually not more than 9.0 nm, preferably 2.0 to 8.5 nm, more preferably 2.0 to 8.0 nm; a Young's modulus (relative value to a commercially available video tape: AV T-120 produced by Victor Company of Japan, Limited) of usually 130 to 160, preferably 132 to 160; a linear adsorption coefficient (of the coating film) of usually 1.20 to 5.00 $\mu m^{-1}$, preferably 1.25 to 5.00 $\mu m^{-1}$; a surface resistivity of not more than $5.0 \times 10^{10}$ $\Omega/cm^2$, preferably not more than $2.5 \times 10^{10}$ $\Omega/cm^2$, more preferably not more than $1.0 \times 10^{10}$ $\Omega/cm^2$. As to the durability, the running durability of the magnetic recording medium is usually not less than 24 minutes, preferably not less than 26 minutes; and the scratch resistance of the magnetic recording medium is usually A or B, preferably A, when evaluated into four ranks: A (No scratch), B (A few scratches), C (Many scratches) and D (A great many scratches).

In case of using the magnetic acicular metal particles containing iron as a main component or magnetic acicular iron-based alloy particles as the magnetic particles, and using the non-magnetic acicular composite particles as non-magnetic particles, in which the coating layer composed of hydroxides and/or oxides of aluminum and/or silicon is formed between the coating layer composed of the organosilicon compound and the surface of the acicular hematite particle or acicular iron oxide hydroxide particle, the magnetic recording medium according to the present invention has a coercive force of usually 63.8 to 278.5 kA/m (800 to 3500 Oe), preferably 71.6 to 278.5 kA/m (900 to 3500 Oe); a squareness (residual magnetic flux density Br/saturation magnetic flux density Bm) of usually 0.87 to 0.95, preferably 0.88 to 0.95; a gloss (of the coating film) of usually 200 to 300%, preferably 205 to 300%; a surface roughness Ra (of the coating film) of usually not more than 8.5 nm, preferably 2.0 to 8.0 nm, more preferably 2.0 to 7.5 nm; a Young's modulus (relative value to a commercially available video tape: AV T-120 produced by Victor Company of Japan, Limited) of usually 132 to 160, preferably 134 to 160; a linear adsorption coefficient (of the coating film) of usually 1.20 to 5.00 $\mu m^{-1}$, preferably 1.25 to 5.00 $\mu m^{-1}$; a surface resistivity of not more than $5.0 \times 10^{10}$ $\Omega/cm^2$, preferably not more than $2.5 \times 10^{10}$ $\Omega/cm^2$, more preferably not more than $1.0 \times 10^{10}$ $\Omega/cm^2$. As to the durability, the running durability of the magnetic recording medium is usually not less than 25 minutes, preferably not less than 27 minutes; and the scratch resistance of the magnetic recording medium is usually A or B, preferably A, when evaluated into four ranks: A (No scratch), B (A few scratches), C (Many scratches) and D (A great many scratches).

With the consideration of the high-density recording, in case of using the magnetic acicular metal particles containing iron as a main component or magnetic acicular iron-based alloy particles as the magnetic particles, and using the non-magnetic acicular composite particles as non-magnetic particles, in which the black non-magnetic acicular composite particles precursor (B) is used as core particle thereof, and no coating layer composed of hydroxides and/or oxides of aluminum and/or silicon is formed between the coating layer composed of the organosilicon compound and the surface of the acicular hematite particle or acicular iron oxide hydroxide particle used as core particles of the black non-magnetic acicular composite particles precursor (B), and using the above-mentioned magnetic particles, the magnetic recording medium according to the present invention has a coercive force of usually 63.8 to 278.5 kA/m (800 to 3500 Oe), preferably 71.6 to 278.5 kA/m (900 to 3500 Oe); a squareness (residual magnetic flux density Br/saturation magnetic flux density Bm) of usually 0.87 to 0.95, preferably 0.88 to 0.95; a gloss (of the coating film) of usually 200 to 300%, preferably 205 to 300%; a surface roughness Ra (of the coating film) of usually not more than 8.5 nm, preferably 2.0 to 8.0 nm, more preferably 2.0 to 7.5 nm; a Young's modulus (relative value to a commercially available video tape: AV T-120 produced by Victor Company of Japan, Limited) of usually 132 to 160, preferably 134 to 160; a linear adsorption coefficient (of the coating film) of usually 1.30 to 5.00 $\mu m^{-1}$, preferably 1.35 to 5.00 $\mu m^{-1}$; a surface resistivity of not more than $1.0 \times 10^{10}$ $\Omega/cm^2$, preferably not more than $7.5 \times 10^{9}$ $\Omega/cm^2$, more preferably not more than $5.0 \times 10^{9}$ $\Omega/cm^2$. As to the durability, the running durability of the magnetic recording medium is usually not less than 25 minutes, preferably not less than 27 minutes; and the scratch resistance of the magnetic recording medium is usually A or B, preferably A, when evaluated into four ranks: A (No scratch), B (A few scratches), C (Many scratches) and D (A great many scratches).

In case of using the magnetic acicular metal particles containing iron as a main component or magnetic acicular iron-based alloy particles as the magnetic particles, and using the non-magnetic acicular composite particles as non-magnetic particles, in which the black non-magnetic acicular composite particles precursor (B) is used as core particle thereof, and the coating layer composed of hydroxides and/or oxides of aluminum and/or silicon is formed between the coating layer composed of the organosilicon compound and the surface of the acicular hematite particle or acicular iron oxide hydroxide particle used as core particles of the black non-magnetic acicular composite particles precursor (B), the magnetic recording medium according to the present invention has a coercive force of usually 63.8 to 278.5 kA/m (800 to 3500 Oe), preferably 71.6 to 278.5 kA/m (900 to 3500 Oe); a squareness (residual magnetic flux density Br/saturation magnetic flux density Bm) of usually 0.87 to 0.95, preferably 0.88 to 0.95; a gloss (of the coating film) of usually 205 to 300%, preferably 210 to 300%; a surface roughness Ra (of the coating film) of usually not more than 8.0 nm, preferably 2.0 to 7.5 nm, more preferably 2.0 to 7.0 nm; a Young's modulus (relative value to a commercially available video tape: AV T-120 produced by Victor Company of Japan, Limited) of usually 134 to 160, preferably 136 to 160; a linear adsorption coefficient (of the coating film) of usually 1.30 to 5.00 $\mu m^{-1}$, preferably 1.35 to 5.00 $\mu m^{-1}$; a surface resistivity of not more than $1.0 \times 10^{10}$ $\Omega/cm^2$, preferably not more than $7.5 \times 10^{9}$ $\Omega/cm^2$, more preferably not more than $5.0 \times 10^{9}$ $\Omega/cm^2$. As to the durability, the running durability of the magnetic recording medium is usually not less than 26 minutes, preferably not less than 28 minutes; and the scratch resistance of the magnetic recording medium is usually A or B, preferably A, when evaluated into four ranks: A (No scratch), B (A few scratches), C (Many scratches) and D (A great many scratches).

Next, the process for producing the non-magnetic acicular composite particles according to the present invention, is described.

The non-magnetic acicular composite particles of the present invention can be produced by mixing acicular hematite particles or the acicular iron oxide hydroxide particles (A) or the black non-magnetic acicular composite particles precursor (B) as non-magnetic core particles with alkoxysilane compounds or polysiloxanes to coat the surfaces of the non-magnetic core particles with the alkoxysilane compounds or polysiloxanes; and then mixing the non-magnetic core particles coated with the alkoxysilane compounds or polysiloxanes, with a phthalocyanine-based pigment.

The coating of the acicular hematite particles or the acicular iron oxide hydroxide particles (A), or the black non-magnetic acicular composite particles precursor (B) as non-magnetic core particles with the alkoxysilane compounds, the polysiloxanes, the modified polysiloxanes, or the terminal-modified polysiloxanes, may be conducted (i) by mechanically mixing and stirring the acicular hematite particles or the acicular iron oxide hydroxide particles (A), or the black non-magnetic acicular composite particles precursor (B) together with the alkoxysilane compounds, the polysiloxanes, the modified polysiloxanes, or the terminal-modified polysiloxanes; or (ii) by mechanically mixing and stirring both the components together while spraying the alkoxysilane compounds, the polysiloxanes, the modified polysiloxanes, or the terminal-modified polysiloxanes onto the non-magnetic core particles. In these cases, substantially whole amount of the alkoxysilane compounds, the polysiloxanes, the modified polysiloxanes, or the terminal-modified polysiloxanes added can be applied onto the surfaces of the non-magnetic core particles.

In addition, by conducting the above-mentioned mixing or stirring treatment (i) of the acicular hematite particles or the acicular iron oxide hydroxide particles (A), or the black non-magnetic acicular composite particles precursor (B) as non-magnetic core particles together with the alkoxysilane compounds, at least a part of the alkoxysilane compounds coated on the non-magnetic core particles may be changed to the organosilane compounds. In this case, there is also no affection against the formation of the phthalocyanine-based pigment coat thereon.

In order to uniformly coat the surfaces of the acicular hematite particles or the acicular iron oxide hydroxide particles (A), or the black non-magnetic acicular composite particles precursor (B) as non-magnetic core particles with the alkoxysilane compounds, the polysiloxanes, the modified polysiloxanes, or the terminal-modified polysiloxanes, it is preferred that the acicular hematite particles or the acicular iron oxide hydroxide particles (A) or the black non-magnetic acicular composite particles precursor (B) are preliminarily diaggregated by using a pulverizer.

As apparatus (a) for mixing and stirring treatment (i) of the non-magnetic core particles with the alkoxysilane compounds, the polysiloxanes, the modified polysiloxanes, or the terminal-modified polysiloxanes to form the coating layer thereof, and as apparatus (b) for mixing and stirring treatment (ii) of the phthalocyanine-based pigment with the non-magnetic core particles whose surfaces are coated with the alkoxysilane compounds, the polysiloxanes, the modified polysiloxanes, or the terminal-modified polysiloxanes to form the phthalocyanine-based pigment coat, there may be preferably used those apparatus capable of applying a shear force to the particles, more preferably those apparatuses capable of conducting the application of shear force, spaturate force and compressed force at the same time.

As such apparatuses, there may be exemplified wheel-type kneaders, ball-type kneaders, blade-type kneaders, roll-type kneaders or the like. Among them, wheel-type kneaders are preferred.

Specific examples of the wheel-type kneaders may include an edge runner (equal to a mix muller, a Simpson mill or a sand mill), a multi-mull, a Stotz mill, a wet pan mill, a Conner mill, a ring muller, or the like. Among them, an edge runner, a multi-mull, a Stotz mill, a wet pan mill and a ring muller are preferred, and an edge runner is more preferred.

Specific examples of the ball-type kneaders may include a vibrating mill or the like. Specific examples of the blade-type kneaders may include a Henschel mixer, a planetary mixer, a Nawter mixer or the like. Specific examples of the roll-type kneaders may include an extruder or the like.

In order to coat the surfaces of the non-magnetic core particles with the alkoxysilane compounds, the polysiloxanes, the modified polysiloxanes, or the terminal-modified polysiloxanes as uniformly as possible, the conditions of the above mixing or stirring treatment may be appropriately controlled such that the linear load is usually 19.6 to 1960 N/cm (2 to 200 Kg/cm), preferably 98 to 1470 N/cm (10 to 150 Kg/cm), more preferably 147 to 980 N/cm (15 to 100 Kg/cm); and the treating time is usually 5 to 120 minutes, preferably 10 to 90 minutes. It is preferred to appropriately adjust the stirring speed in the range of usually 2 to 2,000 rpm, preferably 5 to 1,000 rpm, more preferably 10 to 800 rpm.

The amount of the alkoxysilane compounds, the polysiloxanes, the modified polysiloxanes, or the terminal-modified polysiloxanes added, is preferably 0.15 to 45 parts by weight based on 100 parts by weight of the acicular hematite particles or the acicular iron oxide hydroxide particles (A), or the black non-magnetic acicular composite particles precursor (B) as non-magnetic core particles. When the amount of the alkoxysilane compounds, the polysiloxanes, the modified polysiloxanes or the terminal-modified polysiloxanes added is less than 0.15 part by weight, it may become difficult to adhere the phthalocyanine-based pigment in such an amount enough to obtain the non-magnetic acicular composite particles according to the present invention. On the other hand, when the amount of the alkoxysilane compounds, the polysiloxanes, the modified polysiloxanes or the terminal-modified polysiloxanes added is more than 45 parts by weight, since a sufficient amount of the phthalocyanine-based pigment can be adhered on the surface of the coating layer, it is meaningless to add more than 45 parts by weight.

Next, the phthalocyanine-based pigment are added to the acicular hematite particles or the acicular iron oxide hydroxide particles (A), or the black non-magnetic acicular composite particles precursor (B) as non-magnetic core particles, which are coated with the alkoxysilane compounds, the polysiloxanes, the modified polysiloxanes, or the terminal-modified polysiloxanes, and the resultant mixture is mixed and stirred to form the phthalocyanine-based pigment coat on the surfaces of the coating layer composed of the alkoxysilane compounds, the polysiloxanes, the modified polysiloxanes or the terminal-modified polysiloxanes. The drying or heat-treatment may be conducted.

It is preferred that the phthalocyanine-based pigment are added little by little and slowly, especially about 5 to 60 minutes.

In order to form phthalocyanine-based pigment coat onto the coating layer composed of the alkoxysilane compounds, the polysiloxanes, the modified polysiloxanes, or the terminal-modified polysiloxanes as uniformly as possible, the conditions of the above mixing or stirring treatment can be appropriately controlled such that the linear load is usually 19.6 to 1960 N/cm (2 to 200 Kg/cm), preferably 98 to 1470 N/cm (10 to 150 Kg/cm), more preferably 147 to 980 N/cm (15 to 100 Kg/cm); and the treating time is usually 5 to 120 minutes, preferably 10 to 90 minutes. It is preferred to appropriately adjust the stirring speed in the range of usually 2 to 2,000 rpm, preferably 5 to 1,000 rpm, more preferably 10 to 800 rpm.

The preferable amount of the phthalocyanine-based pigment added is 1 to 100 parts by weight based on 100 parts by weight of the acicular hematite particles or the acicular iron oxide hydroxide particles (A) or the black non-magnetic acicular composite particles precursor (B). When the amount of the phthalocyanine-based pigment added is less than 1 parts by weight, it may be difficult to obtain non-magnetic acicular composite particles having sufficient dispersibility in vehicle and resin adsorptivity because of the insufficient amount of the phthalocyanine-based pigment adhered.

In case of drying the obtained non-magnetic acicular composite particles, the temperature is usually 40 to 150° C., preferably 60 to 120° C. The treating time of these steps is usually from 10 minutes to 12 hours, preferably from 30 minutes to 3 hours.

When the obtained non-magnetic acicular composite particles is subjected to the above step, the alkoxysilane compounds used as the coating thereof are finally converted into organosilane compounds.

If required, prior to mixing and stirring with the alkoxysilane compounds or polysiloxanes, the hematite particles or the acicular iron oxide hydroxide particles may be preliminarily coated with at least one compound selected from the group consisting of hydroxides of aluminum, oxides of aluminum, hydroxides of silicon and oxides of silicon to form an intermediate coating layer thereon.

At least a part of the surface of the acicular hematite particles or the acicular iron oxide hydroxide particles may be coated with at least one compound selected from the group consisting of hydroxides of aluminum, oxides of aluminum, hydroxides of silicon and oxides of silicon (hereinafter referred to merely as "hydroxides and/or oxides of aluminum and/or silicon"), if required, in advance of mixing and stirring with the alkoxysilane compounds, the polysiloxanes, the modified polysiloxanes or the terminal-modified polysiloxanes.

The coating of the hydroxides and/or oxides of aluminum and/or silicon may be conducted by adding an aluminum compound, a silicon compound or both the compounds to a water suspension in which the acicular hematite particles or the acicular iron oxide hydroxide particles are dispersed, followed by mixing and stirring, and further adjusting the pH value of the suspension, if required, thereby coating the surfaces of the acicular hematite particles or the acicular iron oxide hydroxide particles with hydroxides and/or oxides of aluminum and/or silicon. The thus obtained acicular hematite particles or the acicular iron oxide hydroxide particles coated with the hydroxides and/or oxides of aluminum and/or silicon are then filtered out, washed with water, dried and pulverized. Further, the acicular hematite particles or the acicular iron oxide hydroxide particles coated with the hydroxides and/or oxides of aluminum and/or silicon may be subjected to post-treatments such as deaeration treatment and compaction treatment, if required.

As the aluminum compounds, there may be exemplified aluminum salts such as aluminum acetate, aluminum sulfate, aluminum chloride or aluminum nitrate, alkali aluminates such as sodium aluminate or the like.

The amount of the aluminum compound added is 0.01 to 20% by weight (calculated as Al) based on the weight of the acicular hematite particles or the acicular iron oxide hydroxide particles. When the amount of the aluminum compound added is less than 0.01% by weight, it may be difficult to sufficiently coat the surfaces of the acicular hematite particles or the acicular iron oxide hydroxide particles with hydroxides and/or oxides of aluminum, thereby failing to improve the effective reduction of the phthalocyanine-based pigment desorption percentage. On the other hand, when the amount of the aluminum compound added is more than 20% by weight, the coating effect is saturated and, therefore, it is meaningless to add such an excess amount of the aluminum compound.

As the silicon compounds, there may be exemplified #3 water glass, sodium orthosilicate, sodium metasilicate or the like.

The amount of the silicon compound added is 0.01 to 20% by weight (calculated as $SiO_2$) based on the weight of the hematite particles or the acicular iron oxide hydroxide particles.

In the case where both the aluminum and silicon compounds are used in combination for the coating, the total amount of the aluminum and silicon compounds added is preferably 0.01 to 20% by weight (calculated as a sum of Al and $SiO_2$) based on the weight of the acicular hematite particles or the acicular iron oxide hydroxide particles.

Next, magnetic recording medium according to the present invention is described.

The non-magnetic undercoat layer according to the present invention is produced by applying a non-magnetic coating composition which contains the non-magnetic acicular composite particles, a binder resin and a solvent, to the surface of the non-magnetic base film, followed by drying, thereby forming the non-magnetic undercoat layer.

As the solvents, there may be used methyl ethyl ketone, toluene, cyclohexanone, methyl isobutyl ketone, tetrahydrofuran, a mixture of these solvents or the like.

The total amount of the solvent used is 50 to 1,000 parts by weight based on 100 parts by weight of the non-magnetic acicular composite particles. When the amount of the solvent used is less than 50 parts by weight, the viscosity of the non-magnetic coating composition prepared therefrom may become too high, thereby making it difficult to apply the non-magnetic coating composition. On the other hand, when the amount of the solvent used is more than 1,000 parts by weight, the amount of the solvent volatilized during the formation of the coating film may become too large, thereby rendering the coating process industrially disadvantageous.

The magnetic recording medium according to the present invention can be produced by applying a magnetic coating composition containing the magnetic particles, a binder resin and a solvent, on the non-magnetic undercoat layer, followed by drying, to form a magnetic recording layer thereon.

As the solvents, there may be used methyl ethyl ketone, toluene, cyclohexanone, methyl isobutyl ketone, tetrahydrofuran, a mixture of these solvents or the like.

The total amount of the solvent used is 65 to 1,000 parts by weight based on 100 parts by weight of the magnetic particles. When the amount of the solvent used is less than 65 parts by weight, the viscosity of the magnetic coating composition prepared therefrom becomes too high, thereby making it difficult to apply the magnetic coating composition. On the other hand, when the amount of the solvent used is more than 1,000 parts by weight, the amount of the solvent volatilized during the formation of the coating film becomes too large, thereby rendering the coating process industrially disadvantageous.

A point of the present invention is that the non-magnetic acicular composite particles produced by forming a coating layer composed of an organosilicon compound selected from the group consisting of organosilane compounds obtainable from alkoxysilanes and polysiloxanes on the surface of the acicular hematite particles or acicular iron oxide hydroxide particles and then adhering a phthalocyanine-based pigment on the coating layer, exhibit a high resin adsorptivity and an excellent dispersibility.

The reason why the non-magnetic acicular composite particles of the present invention can show a high resin adsorptivity, is considered as follows. That is, since the phthalocyanine-based pigment is adhered onto the surface of acicular hematite particles or acicular iron oxide hydroxide particles through the organosilicon compound, the phthalocyanine-based pigment having a benzene ring is present on the outer surface of the non-magnetic acicular composite particles. As a result, the obtained non-magnetic acicular composite particles can be improved in compatibility with resins, especially polyurethane resins ordinarily used in the non-magnetic undercoat layer.

In addition, the reason why the non-magnetic acicular composite particles of the present invention can show an excellent dispersibility, is considered as follows. That is, since the amount of the phthalocyanine-based pigment desorbed from the surface of the non-magnetic acicular composite particles is very small, it is unlikely that the desorbed phthalocyanine-based pigment prevents well-dispersed condition of the system. Further, since the phthalocyanine-based pigment is adhered onto the surface of the acicular hematite particles or acicular iron oxide hydroxide particles, irregularities are formed on the obtained composite particles, thereby inhibiting the contact between the particles.

Also, the magnetic recording medium having the non-magnetic undercoat layer obtained by using the non-magnetic acicular composite particles of the present invention, exhibits an excellent durability and a sufficient surface smoothness. The reason why the magnetic recording medium of the present invention can show an excellent durability, is considered by the present inventors as follows. That is, as described above, the non-magnetic acicular composite particles are improved in resin adsorptivity and, therefore, are enhanced in compatibility with the resin used in the magnetic recording medium. Also, the reason why the magnetic recording medium of the present invention can show an excellent surface smoothness, is considered as follows. That is, since the organosilicon compound on which the phthalocyanine-based pigment is adhered, are firmly bonded to the surface of the acicular hematite particles or acicular iron oxide hydroxide particles, the amount of the phthalocyanine-based pigment desorbed from the surface of the non-magnetic acicular composite particles can be reduced. As a result, since the non-magnetic acicular composite particles are not prevented from being well dispersed in vehicle, and show an excellent dispersibility in themselves, the obtained non-magnetic undercoat layer can be improved in surface smoothness.

When the non-magnetic acicular composite particles of the present invention are used as non-magnetic particles for the non-magnetic undercoat layer, it is possible to obtain a magnetic recording medium exhibiting more excellent durability and surface smoothness. Therefore, the non-magnetic acicular composite particles of the present invention are suitable as materials for the production of high-density magnetic recording media.

The magnetic recording medium of the present invention can show more excellent durability and surface smoothness since the above non-magnetic acicular composite particles are used as non-magnetic particles for the non-magnetic undercoat layer. Therefore, the magnetic recording medium can serve as a high-density magnetic recording medium.

EXAMPLES

The present invention is described in more detail by Examples and Comparative Examples, but the Examples are only illustrative and, therefore, not intended to limit the scope of the present invention.

Various properties were evaluated by the following methods.

(1) The average major axis diameter and average minor axis diameter of acicular hematite particles, acicular iron oxide hydroxide particles, phthalocyanine-based pigment, carbon black fine particles, non-magnetic acicular composite particles and magnetic particles were respectively expressed by average values (measured in a predetermined direction) of about 350 particles which were sampled from a micrograph obtained by magnifying an original electron micrograph (×30,000) by four times in each of the longitudinal and transverse directions.

(2) The aspect ratio of the particles was expressed by a ratio of average major axis diameter to minor axis diameter thereof. The plate ratio of the particles was expressed by a ratio of average particle diameter to average plate thickness thereof.

(3) The geometrical standard deviation of the major axis diameters of the particles was expressed by values obtained by the following method. That is, the major axis diameters of the particles were measured from the above-magnified photograph. The actual major axis diameters and the number of the particles were obtained from the calculation on the basis of the measured values. On a logarithmic normal probability paper, the major axis diameters of the particles were plotted at regular intervals on the abscissa-axis and the accumulative number of particles belonging to each interval of the major axis diameters of the particles were plotted by percentage on the ordinate-axis by a statistical technique. The major axis diameters of the particles corresponding to the number of particles of 50% and 84.13%, respectively, were read from the graph, and the geometrical standard deviation was measured from the following formula:

Geometrical standard deviation={major axis diameter of the particle corresponding to 84.13% under integration sieve}/{major axis diameter of the particle (geometrical average diameter) corresponding to 50% under integration sieve}

The more the geometrical standard deviation closer to 1.0, the more excellent the major axis diameter distribution of the particles.

(4) The specific surface area was expressed by values measured by a BET method.

(5) The amounts of Mn, Al and Si which were present within acicular hematite particles and acicular iron oxide hydroxide particles or on the surfaces thereof, the amount of Si contained in organosilicon compounds, were measured by a fluorescent X-ray spectroscopy device 3063M (manufactured by RIGAKU DENKI KOGYO CO., LTD.) according to JIS K0119 "General rule of fluorescent X-ray analysis".

Meanwhile, the amount of Si contained in oxides of silicon, hydroxides of silicon and organosilicon compounds coated on the surfaces of the acicular hematite particles or the acicular iron oxide hydroxide particles or the black non-magnetic acicular composite particles precursor, is expressed by the value obtained by subtracting the amount of Si measured prior to the respective treatment steps from that measured after the respective treatment steps.

(6) The amount of carbon black coat formed in the black non-magnetic acicular composite particles precursor, and phthalocyanine-based pigment adhered in the non-magnetic acicular composite particles was measured by "Horiba Metal, Carbon and Sulfur Analyzer EMIA-2200 Model" (manufactured by HORIBA SEISAKUSHO CO., LTD.).

(7) The thickness of carbon black coat formed on the surfaces of the black non-magnetic acicular composite particles precursor is expressed by the value which was obtained by first measuring an average thickness of carbon black coat formed onto the surfaces of the particles on a photograph (×5,000,000) obtained by magnifying (ten times) a micrograph (×500,000) produced at an accelerating voltage of 200 kV using a transmission-type electron microscope (JEM-2010, manufactured by JAPAN ELECTRON Co., Ltd.), and then calculating an actual thickness of carbon black coat formed from the measured average thickness.

(8) The blackness of acicular hematite particles, acicular iron oxide hydroxide particles, phthalocyanine-based pigment and non-magnetic acicular composite particles, were measured by the following method. That is, 0.5 g of sample particles and 1.5 ml of castor oil were intimately kneaded together by a Hoover's muller to form a paste. 4.5 g of clear lacquer was added to the obtained paste and was intimately mixed to form a paint. The paint was applied on a cast-coated paper by using a 150 $\mu$m (6-mil) applicator to produce a coating film piece (having a film thickness of about 30 $\mu$m). The thus obtained coating film piece was measured according to JIS Z 8729 by a portable spectro-colorimeter "COLOR-GUIDE 45/0" (manufactured by BYK CHEMIE JAPAN CO., LTD.) to determine a L* value of calorimetric indices thereof.

Here, the L* value represents a lightness, and the smaller the L* value, the more excellent the blackness.

(9) The volume resistivity of the acicular hematite particles, the acicular iron oxide hydroxide particles and the non-magnetic acicular composite particles were measured as follows. First, 0.5 g of the respective particles were weighed, and pressure-molded into a cylindrical shape at $1.372 \times 10^7$ Pa (140 Kg/cm$^2$) using a KBr tablet machine (manufactured by SIMAZU SEISAKUSHO CO., LTD.), thereby producing a cylindrical sample to be measured.

The thus-produced sample was then exposed to an atmosphere kept at a temperature of 25° C. and a relative humidity of 60%, for not less than 12 hours. Thereafter, the sample was fixed between stainless steel electrodes, and a voltage of 15V was applied to the sample using a Wheatstone bridge (TYPE2768, manufactured by YOKOGAWA-HOKUSHIN DENKI CO., LTD.), thereby measuring a resistance value R ($\Omega$) of the sample.

Next, an upper surface area A (cm$^2$) and a thickness $t_0$ (cm) of the cylindrical sample were measured, and the respective measured values were substituted for A and $t_0$ of the following formula to obtain the volume resistivity ($\Omega$·cm) of the sample.

Volume resistivity ($\Omega$·cm)=R×(A/$t_0$)

(10) The desorption percentage (%) of phthalocyanine-based pigment desorbed from the non-magnetic acicular composite particles was measured by the following method.

That is, 3 g of the non-magnetic acicular composite particles and 40 ml of ethanol were placed in a 50-ml precipitation pipe and then was subjected to ultrasonic dispersion for 20 minutes. Thereafter, the obtained dispersion was allowed to stand for 120 minutes, and separated the phthalocyanine-based pigment desorbed from the non-magnetic acicular composite particles on the basis of the difference in specific gravity therebetween. Next, the thus separated non-magnetic acicular composite particles were mixed again with 40 ml of ethanol, and the obtained mixture was further subjected to ultrasonic dispersion for 20 minutes. Thereafter, the obtained dispersion was allowed to stand for 120 minutes, thereby separating the non-magnetic acicular composite particles and phthalocyanine-based pigment desorbed, from each other. The thus separated non-magnetic acicular composite particles were dried at 80° C. for one hour, and then the residual amount of the phthalocyanine-based pigment was measured by the "Horiba Metal, Carbon and Sulfur Analyzer EMIA-2200 Model" (manufactured by HORIBA SEISAKUSHO CO., LTD.). The desorption percentage (%) was calculated according to the following formula:

Desorption percentage (%)=$\{(W_a-W_e)/W_a\} \times 100$ wherein $W_a$ represents an amount of phthalocyanine-based pigment initially adhered on the non-magnetic acicular composite particles; and $W_e$ represents an amount of phthalocyanine-based pigment which still remains on the non-magnetic acicular composite particles after the above desorption test.

The closer to zero the desorption percentage (%), the smaller the amount of phthalocyanine-based pigment desorbed from the non-magnetic acicular composite particles.

(11) The resin adsorptivity of the particles represents the degree at which a resin is adsorbed to the particles. The closer to 100% the value obtained in the following manner, the firmer the resin adsorptivity to the particles surfaces in the vehicle and the more favorable.

The resin adsorptivity (Ya) was first obtained. 20 g of particles and 56 g of a mixed solvent (27.0 g of methyl ethyl ketone, 16.2 g of toluene, and 10.8 g of cyclohexanone) with 2 g of a polyurethane resin having a sodium sulfonate group dissolved therein were charged into a 100-ml polyethylene bottle together with 120 g of 3 mm$\phi$ steel beads. The particles and the solvent were mixed and dispersed by a paint shaker for 60 minutes.

Thereafter, 50 g of the coating composition was taken out, and charged into a 50-ml settling cylinder. The solid content was separated from the solvent portion by the centrifugal-ization at a rate of 10000 rpm for 15 minutes. The concentration of the solid resin content contained in the solvent portion was determined by a gravimetric method and the resin content existing in the solid portion was determined by deducting the obtained resin content from the amount of the resin charged as the resin adsorptivity Ya (mg/g) to the particles.

The total quantity of separated solid content was taken into a 100 ml-tall beaker, and 50 g of a mixed solvent (25.0 g of methyl ethyl ketone, 15.0 g of toluene, and 10.0 g of cyclohexanone) was added thereto. The obtained mixture was to ultrasonic dispersion for 15 minutes, and the thus-obtained suspension was charged into a 50-ml settling cylinder. The solid content was separated from the solvent portion by centrifuging them at a rate of 10000 rpm for 15 minutes. The concentration of the solid resin content contained in the solvent portion was measured so as to determine the resin content dissolved from the resin which had been adsorbed to the particle surfaces into the solvent phase.

The process from the step of taking the solid content into the 100 ml-tall beaker to the determination of the resin content dissolved into the solvent phase was repeated twice. The total quantity Ye (mg/g) of resin content dissolved into the solvent phase in the three cycles was obtained, and the value calculated in accordance with the following formula is expressed as the resin adsorptivity T(%):

T(%)=[(Ya−Ye)/Ya]×100.

(12) The magnetic properties of the magnetic particles and magnetic recording medium were measured under an external magnetic field of 795.8 kA/m (10 kOe) by "Vibration Sample Magnetometer VSM-3S-15 (manufactured by TOEI KOGYO, CO., LTD.)". The magnetic properties of the Co-coated magnetic particles and magnetic recording medium using the Co-coated magnetic particles as the magnetic particles were measured under an external magnetic field of 39.79 kA/m (5.0 kOe) by "Vibration Sample Magnetometer VSM-3S-15 (manufactured by TOEI KOGYO, CO., LTD.)".

(13) The viscosity of the coating composition was obtained by measuring the viscosity of the coating composition at 25° C. at a shear rate D of 1.92 sec$^{-1}$ by using "E type viscometer EMD-R" (manufactured by TOKYO KEIKI, CO., LTD.).

(14) The gloss of the surface of the coating film of each of the non-magnetic undercoat layer and the magnetic recording layer was measured at an angle of incidence of 45° by "glossmeter UGV-5D" (manufactured by SUGA SHIKENKI, CO., LTD.).

(15) The surface roughness Ra is expressed by the centerline average roughness of the surface of the coating film by using "Surfcom-575A" (manufactured by TOKYO SEIMITSU CO., LTD.).

(16) The light transmittance is expressed by the linear adsorption coefficient measured by using "UV-Vis Recording Spectrophotometer UV-2100" (manufactured by SHIMAZU SEISAKUSHO, Co. Ltd.). The linear adsorption coefficient is defined by the following formula, and the larger the value, the more the transmittance of light become difficult:

Linear adsorption coefficient $(\mu m^{-1}) = \{1 \ n \ (1/t)\}/FT$ wherein t represents a light transmittance (-) at $\lambda=900$ nm, and FT represents thickness ($\mu$m) of the coating composition of the film used for the measurement.

As a blank for measuring the linear adsorption coefficient, in case of the non-magnetic substrate composed of the base film and the non-magnetic undercoat layer, the same non-magnetic base film was used, and in case of the magnetic recording medium composed of the base film, the non-magnetic undercoat layer and the magnetic recording layer, the same non-magnetic base film was used.

(17) The surface resistivity value of a coating film was measured as follows. The coating film to be measured was exposed to an atmosphere kept at a temperature of 25° C. and a relative humidity of 60%, for not less than 12 hours. Thereafter, the coating film was slit into 6 mm width, and then placed on metal electrodes each having a width of 6.5 mm such that a coating surface thereof was contacted with the metal electrodes. Two 170-gram weights were fitted to opposite ends of the coating film so as to bring the coating film into close contact with the metal electrodes. Then, a D.C. voltage of 500V was applied between the metal electrodes, thereby measuring a surface resistivity value of the coating film.

(18) The strength of the coating film was expressed the Young's modulus obtained by "Autograph" (produced by SHIMAZU SEISAKUSHO Co., Ltd.). The Young's modulus was expressed by the ratio of the Young's modulus of the coating film to that of a commercially available video tape "AV T-120" (produce by VICTOR COMPANY OF JAPAN, LIMITED). The higher the relative value, the more the strength of the coating film is favorable.

(19) The durability of the magnetic medium was evaluated by the following running durability and the scratch resistance.

The running durability was evaluated by the actual operating time under the conditions that the load was 1.96 N (200 gw) and the relative speed of the head and the tape was 16 m/s by using "Media Durability Tester MDT-3000" (manufactured by Steinberg Associates). The longer the actual operating time, the higher the running durability.

The scratch resistance was evaluated by observing through the microscope the surface of the magnetic tape after running and visually judging the degree of scratching. Evaluation was divided into the following four ranks.

A: No scratch
B: A few scratches
C: Many scratches
D: Great many scratches

(20) The thickness of each of the base film, the non-magnetic undercoat layer and the magnetic recording layer constituting the magnetic recording medium was measured in the following manner by using "Digital Electronic Micrometer R351C" (manufactured by ANRITSU CORP.)

The thickness (A) of a base film was first measured. Similarly, the thickness (B) (B=the sum of the thicknesses of the base film and the non-magnetic undercoat layer) of a non-magnetic substrate obtained by forming a non-magnetic undercoat layer on the base film was measured. Furthermore, the thickness (C) (C=the sum of the thicknesses of the base film, the non-magnetic undercoat layer and the magnetic recording layer) of a magnetic recording medium obtained by forming a magnetic recording layer on the non-magnetic substrata was measured. The thickness of the non-magnetic undercoat layer is expressed by (B)–(A), and the thickness of the magnetic recording layer is expressed by (C)–(B).

Example 1

Production of Non-magnetic Acicular Composite Particles 20 kg of black-brown acicular hematite particles (average major axis diameter: 0.162 $\mu$m; average minor axis diameter: 0.0225 $\mu$m; aspect ratio: 7.2:1; geometrical standard deviation of major axis diameter: 1.38; BET specific surface area value: 48.6 m$^2$/g; Mn content: 13.7% by weight (calculated as Mn) based on the weight of the particle; blackness (L* value): 19.3; volume resistivity value: 6.2× 10$^7$ Ω·cm and resin adsorptivity: 57.1%), were diaggregated in 150 liters of pure water using a stirrer, and further passed through a TK pipeline homomixer (manufactured by TOKUSHU KIKA KOGYO CO., LTD.) three times, to obtain a slurry containing the black-brown acicular hematite particles.

Successively, the obtained slurry was passed through a transverse-type sand grinder (tradename "MIGHTY MILL MHG-1.5L", manufactured by INOUE SEISAKUSHO CO., LTD.) five times at an axis-rotating speed of 2,000 rpm, thereby obtaining a slurry in which the black-brown acicular hematite particles were dispersed.

The black-brown acicular hematite particles in the obtained slurry, which remain on a sieve of 325 meshes (mesh size: 44 $\mu$m) was 0%. The slurry was filtered and washed with water, thereby obtaining a wet cake composed of the black-brown acicular hematite particles. The obtained wet cake composed of the black-brown acicular hematite particles was dried at 120° C. 11.0 kg of the dried particles were then charged into an edge runner "MPUV-2 Model" (tradename, manufactured by MATSUMOTO CHUZO TEKKOSHO CO., LTD.), and mixed and stirred at 392 N/cm (40 Kg/cm) for 20 minutes, thereby lightly diaggregating the particles.

220 g of methyltriethoxysilane (tradename: "TSL8123", produced by GE TOSHIBA SILICONE CO., LTD.) was mixed and diluted with 200 ml of ethanol to obtain a solution of methyltriethoxysilane. The methyltriethoxysilane solution was added to the thus diaggregated black-brown acicular hematite particles while operating the edge runner. The black-brown acicular hematite particles were continuously mixed and stirred at a linear load of 392 N/cm (40 Kg/cm) and a stirring speed of 22 rpm for 30 minutes.

Next, 1100 g of a phthalocyanine-based pigment A (kind: Copper phthalocyanine blue; particle shape: granular shape; average particle size: 0.06 $\mu$m; BET specific surface area: 71.6 m$^2$/g; blackness (L* value): 5.2), were added to the above mixture for 10 minutes while operating the edge runner. Further, the obtained mixture was mixed and stirred at a linear load of 392 N/cm (40 Kg/cm) and a stirring speed of 22 rpm for 30 minutes to form a coating layer composed of the phthalocyanine-based pigment A on the methyltriethoxysilane coat, thereby obtaining composite particles. The obtained composite particles were heat-treated at 105° C. for 60 minutes by using a drier, thereby obtaining non-magnetic acicular composite particles.

The obtained non-magnetic acicular composite particles had an average major axis diameter of 0.163 $\mu$m, an average minor axis diameter of 0.0228 $\mu$m and an aspect ratio of 7.1:1 as shown in the electron photograph. In addition, the non-magnetic acicular composite particles showed a geometrical standard deviation of major axis diameter of 1.38, a BET specific surface area value of 50.5 m$^2$/g, a blackness (L* value) of 11.1, a volume resistivity value of $5.3 \times 10^6$ $\Omega$·cm, and resin adsorptivity: 79.2%. The amount of a coating layer composed of organosilane compounds produced from methyltriethoxysilane was 0.30% by weight (calculated as Si). The amount of the coating layer composed of the phthalocyanine-based pigment A was 6.00% by weight (calculated as C) (corresponding to 10 parts by weight based on 100 parts by weight of the black-brown acicular hematite particles). The desorption percentage of the phthalocyanine-based pigment A from the non-magnetic acicular composite particles was 6.7% by weight.

As a result of the observation of electron micrograph, almost no phthalocyanine-based pigment A liberated was recognized, so that it was confirmed that a substantially whole amount of the phthalocyanine-based pigment A added was adhered on the coating layer composed of the organosilane compounds produced from methyltriethoxysilane.

Example 2

Production of Non-Magnetic Substrate: Formation of Non-magnetic Undercoat Layer on Base Film 12 g of the non-magnetic acicular composite particles obtained in Example 1 were mixed with a binder resin solution (30% by weight of vinyl chloride-vinyl acetate copolymer resin having a sodium sulfonate group and 70% by weight of cyclohexanone) and cyclohexanone, and each of the obtained mixtures (solid content: 72% by weight) was kneaded by a plast-mill for 30 minutes.

Each of the thus-obtained kneaded material was charged into a 140 ml-glass bottle together with 95 g of 1.5 mm$\phi$ glass beads, a binder resin solution (30% by weight of polyurethane resin having a sodium sulfonate group and 70% by weight of a solvent (methyl ethyl ketone:toluene=1:1)), cyclohexanone, methyl ethyl ketone and toluene, and the obtained mixture was mixed and dispersed by a paint shaker for 6 hours. Thereafter, the lubricant was added to the resultant mixture, and the obtained mixture was mixed and dispersed by a paint shaker for 15 minutes to obtain a non-magnetic coating composition.

The thus-obtained non-magnetic coating composition containing the non-magnetic acicular composite particles was as follows:

| | |
|---|---|
| Non-magnetic acicular composite particles | 100.0 parts by weight |
| Vinyl chloride-vinyl acetate copolymer resin having a sodium sulfonate group | 10.0 parts by weight |
| Polyurethane resin having a sodium sulfonate group | 10.0 parts by weight |
| Cyclohexanone | 44.6 parts by weight |
| Methylethyl ketone | 111.4 parts by weight |
| Toluene | 66.9 parts by weight |

The viscosity of the obtained non-magnetic coating composition was 377 cP.

The non-magnetic coating composition obtained was applied to a polyethylene terephthalate film of 12 $\mu$m thick to a thickness of 55 $\mu$m by an applicator, and the coating film was then dried, thereby forming a non-magnetic undercoat layer. The thickness of the non-magnetic undercoat layer was 3.3 $\mu$m.

The thus obtained non-magnetic undercoat layer had a gloss of 195%, and a surface roughness Ra of 6.3 nm. The Young's modulus (relative value) thereof was 134. The linear adsorption coefficient (of the coating film) thereof was 1.26 $\mu$m$^{-1}$; and the surface resistivity value thereof was $3.7 \times 10^{10}$ $\Omega$/cm$^2$.

Production of Magnetic Recording Medium: Formation of Magnetic Recording Layer 12 g of magnetic acicular metal particles containing iron as a main component (average major axis diameter: 0.115 $\mu$m, average minor axis diameter: 0.0182 $\mu$m, aspect ratio: 6.3:1, coercive force: 152.0 kA/m (1,910 Oe), saturation magnetization: 131 Am$^2$/kg (131 emu/g)), 1.2 g of a polishing agent (AKP-30: trade name, produced by SUMITOMO CHEMICAL CO., LTD.), 0.12 g of carbon black (#3250B, trade name, produced by MITSUBISHI CHEMICAL CORP.), a binder resin solution (30% by weight of vinyl chloride-vinyl acetate copolymer resin having a sodium sulfonate group and 70% by weight of cyclohexanone) and cyclohexanone were mixed to obtain a mixture (solid content: 78% by weight). The mixture was further kneaded by a plast-mill for 30 minutes to obtain a kneaded material.

The thus-obtained kneaded material was charged into a 140 ml-glass bottle together with 95 g of 1.5 mm$\phi$ glass beads, a binder resin solution (30% by weight of polyurethane resin having a sodium sulfonate group and 70% by weight of a solvent (methyl ethyl ketone:toluene=1:1)), cyclohexanone, methyl ethyl ketone and toluene, and the mixture was mixed and dispersed by a paint shaker for 6 hours. Then, the lubricant and hardening agent were added to the mixture, and the resultant mixture was mixed and dispersed by a paint shaker for 15 minutes.

The thus-obtained magnetic coating composition was as follows:

| | |
|---|---|
| Magnetic acicular metal particles containing iron as a main component | 100.0 parts by weight |
| Vinyl chloride-vinyl acetate copolymer resin having a sodium sulfonate group | 10.0 parts by weight |

| | |
|---|---|
| Polyurethane resin having a sodium sulfonate group | 10.0 parts by weight |
| Polishing agent (AKP-30) | 10.0 parts by weight |
| Carbon black (#3250B) | 1.0 parts by weight |
| Lubricant (myristic acid: butyl stearate = 1:2) | 3.0 parts by weight |
| Hardening agent (polyisocyanate) | 5.0 parts by weight |
| Cyclohexanone | 65.8 parts by weight |
| Methyl ethyl ketone | 164.5 parts by weight |
| Toluene | 98.7 parts by weight |

The magnetic coating composition obtained was applied to the non-magnetic undercoat layer obtained in the above to a thickness of 15 μm by an applicator, and the magnetic recording medium obtained was oriented and dried in a magnetic field, and then calendered. The magnetic recording medium was then subjected to a curing reaction at 60° C. for 24 hours, and thereafter slit into a width of 1.27 cm (0.5 inch), thereby obtaining a magnetic tape. The thickness of the respective magnetic recording layer was 1.0 μm.

The coercive force of the magnetic tape produced by forming a magnetic recording layer on the non-magnetic undercoat layer was 161.4 kA/m (2,028 Oe), the squareness (Br/Bm) thereof was 0.88, the gloss thereof was 218%, the surface roughness Ra thereof was 6.1 nm, the Young's modulus (relative value) thereof was 134, the linear absorption coefficient thereof was 1.72 $\mu m^{-1}$. the surface resistivity thereof was $9.3 \times 10^8$ $\Omega/cm^2$. The running durability thereof was 28.7 minutes, and the scratch resistance thereof was A.

Core Particles 1 to 6

Various acicular hematite particles and acicular iron oxide hydroxide particles produced by known methods, were prepared. The same procedure as defined in Example 1 was conducted by using these particles, thereby obtaining diaggregated acicular hematite particles and acicular iron oxide hydroxide particles.

Various properties of the acicular hematite particles and acicular iron oxide hydroxide particles as core particles are shown in Table 1.

Core Particles 7

The same procedure as defined in Example 1 was conducted by using 20 kg of the diaggregated acicular hematite particles (core particles 1) and 150 liters of water, thereby obtaining a slurry containing the acicular hematite particles. The pH value of the obtained re-dispersed slurry containing the acicular hematite particles was adjusted to 10.5 by using sodium hydroxide, and then the concentration of the solid content in the slurry was adjusted to 98 g/liter by adding water thereto. After 150 liters of the slurry was heated to 60° C., 5444 ml of a 1.0 mol/liter $NaAlO_2$ solution (corresponding to 1.0% by weight (calculated as Al) based on the weight of the acicular hematite particles) was added to the slurry. After allowing the obtained slurry to stand for 30 minutes, the pH value of the slurry was adjusted to 7.5 by using acetic acid. After further allowing the resultant slurry to stand for 30 minutes, the slurry was subjected to filtration, washing with water, drying and pulverization, thereby obtaining the acicular hematite particles whose surface was coated with hydroxides of aluminum.

The essential treating conditions are shown in Table 2, and various properties of the obtained surface-treated acicular hematite particles are shown in Table 3.

Meanwhile, "A" and "S" as described in Table 2, represent hydroxides of aluminum and oxides of silicon, respectively.

Core Particles 8 to 11

The same procedure as defined above for the production of the core particles 7, was conducted except that kinds of core particles and kinds and amounts of additives used in the above surface treatment were changed variously, thereby obtaining surface-treated acicular hematite particles and surface-treated acicular iron oxide hydroxide particles.

The essential treating conditions are shown in Table 2, and various properties of the obtained surface-treated core particles are shown in Table 3.

Phthalocyanine-based Pigments A to C

Various properties of the phthalocyanine-based pigments used are shown in Table 4.

Examples 3 to 7, 9 to 13 and Comparative Examples 1 to 4

Production of Non-magnetic Acicular Composite Particles

The same procedure as defined in Example 1 was conducted except that kinds of acicular hematite particles and acicular iron oxide hydroxide particles, addition or non-addition of alkoxysilane or polysiloxane, kinds and amounts of alkoxysilane or polysiloxane added, treating conditions of an edge runner used in the alkoxysilane or polysiloxane-coating process, kinds and amounts of the phthalocyanine-based pigment coat formed, and treating conditions of an edge runner used in the process for forming the phthalocyanine-based pigment coat, were changed variously, thereby obtaining non-magnetic acicular composite particles. As a result of the observation by an electron microscope, phthalocyanine-based pigment was not recognized in the non-magnetic acicular composite particles obtained in Production Examples 3 to 7 and 9 to 13. Therefore, it was confirmed that a substantially whole amount of the phthalocyanine-based pigment used in Production Examples 3 to 7 and 9 to 13 contributed to the formation of the phthalocyanine-based pigment coat on the coating layer composed of an organosilane compound produced from the alkoxysilane or polysiloxane.

The main production conditions are shown in Table 5, and various properties of the obtained non-magnetic acicular composite particles are shown in Table 6.

Examples 14 to 18, 20 to 24 and Comparative Examples 5 to 14

Production of Non-magnetic Substrate: Formation of Non-magnetic Undercoat Layer on Non-magnetic Base Film By using the non-magnetic acicular composite particles obtained in Example 3 to 7 and 9 to 13, Core particles 1 to 6, Comparative Example 1 to 4, non-magnetic undercoat layers were formed in the same way as in Example 2.

The main producing conditions and various properties are shown in Tables 7 and 8.

Examples 25 to 29, 31 to 35 Comparative Examples 15 to 24

Production of Magnetic Recording Medium: Formation of Magnetic Coating Film

Magnetic recording media were produced in the same way as in Example 2 except for varying the kind of non-magnetic undercoat layer and the kind of magnetic particles.

Various properties of the magnetic particles (1) to (4) used, are shown in Table 9.

The main producing conditions are shown in Table 10 and various properties are shown in Tables 11 and 12.

Example 8

Production of Non-magnetic Acicular Composite Particles 20 kg of acicular hematite particles (core particles 1)(average major axis diameter: 0.143 μm; average minor axis diameter: 0.0210 μm; aspect ratio: 6.8:1; geometrical standard deviation of major axis diameter: 1.38; BET specific surface area value: 55.3 m$^2$/g; 21.0; volume resistivity value: 2.3×10$^8$ Ω·cm and resin adsorptivity: 49.2%), were diaggregated in 150 liters of pure water using a stirrer, and further passed through a TK pipeline homomixer (manufactured by TOKUSHU KIKA KOGYO CO., LTD.) three times, to obtain a slurry containing the acicular hematite particles.

Successively, the obtained slurry was passed through a transverse-type sand grinder (tradename "MIGHTY MILL MHG-1.5L", manufactured by INOUE SEISAKUSHO CO., LTD.) five times at an axis-rotating speed of 2,000 rpm, thereby obtaining a slurry in which the acicular hematite particles were dispersed.

The acicular hematite particles in the obtained slurry, which remain on a sieve of 325 meshes (mesh size: 44 μm) was 0%. The slurry was filtered and washed with water, thereby obtaining a wet cake composed of the acicular hematite particles. The obtained wet cake composed of the acicular hematite particles was dried at 120° C. 11.0 kg of the dried particles were then charged into an edge runner "MPUV-2 Model" (tradename, manufactured by MATSUMOTO CHUZO TEKKOSHO CO., LTD.), and mixed and stirred at 294 N/cm (30 Kg/cm) for 30 minutes, thereby lightly diaggregating the particles.

220 g of methyltriethoxysilane (tradename: "TSL8123", produced by GE TOSHIBA SILICONE CO., LTD.) was mixed and diluted with 200 ml of ethanol to obtain a solution of methyltriethoxysilane. The methyltriethoxysilane solution was added to the thus diaggregated acicular hematite particles while operating the edge runner. The acicular hematite particles were continuously mixed and stirred at a linear load of 588 N/cm (60 Kg/cm ) and a stirring speed of 22 rpm for 30 minutes.

Next, 1100 g of carbon black fine particles (particle shape: granular shape; particle size: 0.022 μm; geometrical standard deviation of particle sizes: 1.78; BET specific surface area value: 133.5 m$^2$/g; blackness (L* value): 2.1), were added to the acicular hematite particles coated with methyltriethoxysilane for 10 minutes while operating the edge runner. Further, the particles were continuously mixed and stirred at a linear load of 588 N/cm (60 Kg/cm) and a stirring speed of 22 rpm for 30 minutes to form a carbon black coat on the coating layer composed of methyltriethoxysilane, thereby obtaining composite particles. The obtained composite particles were heat-treated at 105° C. for 60 minutes by using a drier, thereby obtaining black non-magnetic acicular composite particles precursor.

The obtained black non-magnetic acicular composite particles precursor (core particles 6) had an average major axis diameter of 0.144 μm, an average minor axis diameter of 0.0211 μm and an aspect ratio of 6.8:1 as shown in the electron photograph. In addition, the non-magnetic acicular composite particles precursor showed a geometrical standard deviation of major axis diameter of 1.38, a BET specific surface area value of 56.3 m$^2$/g, a blackness (L* value) of 8.2, a volume resistivity value of 8.3×10$^3$ Ω·cm . The total amount of the carbon black coat is 9.01% by weight (calculated as C) based on the weight of the acicular hematite particles (corresponding to 10 parts by weight based on 100 parts by weight of the acicular hematite particles). The thickness of the carbon black coat formed was 0.0024 μm. The amount of methyltriethoxysilane coated was 0.30% by weight (calculated as Si). Since no carbon black were recognized on the electron photograph, it was confirmed that a whole amount of the carbon black used contributed to the formation of the carbon black coat.

20 kg of the obtained black non-magnetic acicular composite particles precursor (core particles 6) were diaggregated in 150 liters of pure water using a stirrer, and further passed through a TK pipeline homomixer (manufactured by TOKUSHU KIKA KOGYO CO., LTD.) three times, to obtain a slurry containing the black non-magnetic acicular composite particles precursor.

Successively, the obtained slurry was passed through a transverse-type sand grinder (tradename "MIGHTY MILL MHG-1.5L", manufactured by INOUE SEISAKUSHO CO., LTD.) five times at an axis-rotating speed of 2,000 rpm, thereby obtaining a slurry in which the black non-magnetic acicular composite particles precursor were dispersed.

The black non-magnetic acicular composite particles precursor in the obtained slurry, which remain on a sieve of 325 meshes (mesh size: 44 μm) was 0%. The slurry was filtered and washed with water, thereby obtaining a wet cake composed of the black non-magnetic acicular composite particles precursor. The obtained wet cake composed of the black non-magnetic acicular composite particles precursor was dried at 120° C. 11.0 kg of the dried particles were then charged into an edge runner "MPUV-2 Model" (tradename, manufactured by MATSUMOTO CHUZO TEKKOSHO CO., LTD.), and mixed and stirred at 392 N/cm (40 Kg/cm) for 20 minutes, thereby lightly diaggregating the particles.

110 g of methyltriethoxysilane (tradename: "TSL8123", produced by GE TOSHIBA SILICONE CO., LTD.) was mixed and diluted with 200 ml of ethanol to obtain a solution of methyltriethoxysilane. The methyltriethoxysilane solution was added to the thus diaggregated black non-magnetic acicular composite particles precursor while operating the edge runner. The black non-magnetic acicular composite particles precursor were continuously mixed and stirred at a linear load of 441 N/cm (45 Kg/cm ) and a stirring speed of 22 rpm for 20 minutes.

Next, 1100 g of a phthalocyanine-based pigment A (kind: Copper phthalocyanine blue; particle shape: granular shape; average particle size: 0.06 μm; BET specific surface area: 71.6 m$^2$/g; blackness (L* value): 5.2), were added to the above mixture for 10 minutes while operating the edge runner. Further, the obtained mixture was mixed and stirred at a linear load of 294 N/cm (30 Kg/cm) and a stirring speed of 22 rpm for 30 minutes to form a coating layer composed of the phthalocyanine-based pigment A on the methyltriethoxysilane coat, thereby obtaining composite particles. The obtained composite particles were heat-treated at 105° C. for 60 minutes by using a drier, thereby obtaining non-magnetic acicular composite particles.

The obtained non-magnetic acicular composite particles had an average major axis diameter of 0.144 μm, an average minor axis diameter of 0.0212 μm and an aspect ratio of 6.8:1 as shown in the electron photograph. In addition, the non-magnetic acicular composite particles showed a geometrical standard deviation of major axis diameter of 1.38, a BET specific surface area value of 57.7 m$^2$/g, a blackness (L* value) of 8.0, a volume resistivity value of 1.5×10$^6$ Ω·cm, and resin adsorptivity: 82.4%.

The amount of a coating layer composed of organosilane compounds produced from methyltriethoxysilane was 0.15% by weight (calculated as Si). The amount of the coating layer composed of the phthalocyanine-based pigment A was 5.98% by weight (calculated as C) (corresponding to 10 parts by weight based on 100 parts by weight of the black non-magnetic acicular composite particles precursor). The desorption percentage of the phthalocyanine-based pigment A from the non-magnetic acicular composite particles was 5.9% by weight.

As a result of the observation of electron micrograph, almost no phthalocyanine-based pigment A liberated was recognized, so that it was confirmed that a substantially whole amount of the phthalocyanine-based pigment A added was adhered on the coating layer composed of the organosilane compounds produced from methyltriethoxysilane.

Example 19
Production of Non-magnetic Substrate: Formation of Non-magnetic Undercoat Layer on Base Film 12 g of the non-magnetic acicular composite particles obtained in Example 8 were mixed with a binder resin solution (30% by weight of vinyl chloride-vinyl acetate copolymer resin having a sodium sulfonate group and 70% by weight of cyclohexanone) and cyclohexanone, and each of the obtained mixtures (solid content: 72% by weight) was kneaded by a plast-mill for 30 minutes.

Each of the thus-obtained kneaded material was charged into a 140 ml-glass bottle together with 95 g of 1.5 mm$\phi$ glass beads, a binder resin solution (30% by weight of polyurethane resin having a sodium sulfonate group and 70% by weight of a solvent (methyl ethyl ketone:toluene=1:1)), cyclohexanone, methyl ethyl ketone and toluene, and the obtained mixture was mixed and dispersed by a paint shaker for 6 hours. Thereafter, the lubricant was added to the resultant mixture, and the obtained mixture was mixed and dispersed by a paint shaker for 15 minutes to obtain a non-magnetic coating composition.

The thus-obtained non-magnetic coating composition containing the non-magnetic acicular composite particles was as follows:

| | |
|---|---|
| Non-magnetic acicular composite particles | 100 parts by weight |
| Vinyl chloride-vinyl acetate copolymer resin having a sodium sulfonate group | 10 parts by weight |
| Polyurethane resin having a sodium sulfonate group | 10 parts by weight |
| Lubricant (myristic acid: butyl stearate = 1:2) | 2.0 parts by weight |
| Cyclohexanone | 56.9 parts by weight |
| Methylethyl ketone | 142.3 parts by weight |
| Toluene | 85.4 parts by weight |

The viscosity of the obtained non-magnetic coating composition was 448 cP.

The non-magnetic coating composition obtained was applied to a polyethylene terephthalate film of 12 $\mu$m thick to a thickness of 55 $\mu$m by an applicator, and the coating film was then dried, thereby forming a non-magnetic undercoat layer. The thickness of the non-magnetic undercoat layer was 3.5 $\mu$m.

The thus obtained non-magnetic undercoat layer had a gloss of 198%, and a surface roughness Ra of 6.2 nm. The Young's modulus (relative value) thereof was 136. The linear adsorption coefficient (of the coating film) thereof was 1.92 $\mu m^{-1}$; and the surface resistivity value thereof was 7.4×10$^9$ $\Omega/cm^2$.

Example 30
Production of Magnetic Recording Medium: Formation of Magnetic Recording Layer 12 g of magnetic acicular metal particles containing iron as a main component (average major axis diameter: 0.101 $\mu$m, average minor axis diameter: 0.0129 $\mu$m, aspect ratio: 7.8:1, geometrical standard deviation of major axis diameter: 1.36, coercive force: 147.5 kA/m (1,853 Oe), saturation magnetization: 136.0 Am$^2$/kg (136.0 emu/g)), 1.2 g of a polishing agent (AKP-30: trade name, produced by SUMITOMO CHEMICAL CO., LTD.), 0.12 g of carbon black (#3250B, trade name, produced by MITSUBISHI CHEMICAL CORP.), a binder resin solution (30% by weight of vinyl chloride-vinyl acetate copolymer resin having a sodium sulfonate group and 70% by weight of cyclohexanone) and cyclohexanone were mixed to obtain a mixture (solid content: 78% by weight). The mixture was further kneaded by a plast-mill for 30 minutes to obtain a kneaded material.

The thus-obtained kneaded material was charged into a 140 ml-glass bottle together with 95 g of 1.5 mm$\phi$ glass beads, a binder resin solution (30% by weight of polyurethane resin having a sodium sulfonate group and 70% by weight of a solvent (methyl ethyl ketone:toluene=1:1)), cyclohexanone, methyl ethyl ketone and toluene, and the mixture was mixed and dispersed by a paint shaker for 6 hours. Then, the lubricant and hardening agent were added to the mixture, and the resultant mixture was mixed and dispersed by a paint shaker for 15 minutes.

The thus-obtained magnetic coating composition was as follows:

| | |
|---|---|
| Magnetic acicular metal particles containing iron as a main component | 100 parts by weight |
| Vinyl chloride-vinyl acetate copolymer resin having a sodium sulfonate group | 10 parts by weight |
| Polyurethane resin having a sodium sulfonate group | 10 parts by weight |
| Polishing agent (AKP-30) | 10 parts by weight |
| Carbon black (#3250B) | 1.0 parts by weight |
| Lubricant (myristic acid: butyl stearate = 1:2) | 3.0 parts by weight |
| Hardening agent (polyisocyanate) | 5.0 parts by weight |
| Cyclohexanone | 65.8 parts by weight |
| Methyl ethyl ketone | 164.5 parts by weight |
| Toluene | 98.7 parts by weight |

The magnetic coating composition obtained was applied to the non-magnetic undercoat layer obtained in Example 19 to a thickness of 15 $\mu$m by an applicator, and the magnetic recording medium obtained was oriented and dried in a magnetic field, and then calendered. The magnetic recording medium was then subjected to a curing reaction at 60° C. for 24 hours, and thereafter slit into a width of 1.27 cm (0.5 inch), thereby obtaining a magnetic tape. The thickness of the respective magnetic recording layer was 1.0 $\mu$m.

The coercive force of the magnetic tape produced by forming a magnetic recording layer on the non-magnetic undercoat layer was 146.5 kA/m (1,841 Oe), the squareness (Br/Bm) thereof was 0.90, the gloss thereof was 239%, the surface roughness Ra thereof was 5.6 nm, the Young's modulus (relative value) thereof was 139, the linear absorption coefficient thereof was 1.95 $\mu m^{-1}$. and the surface resistivity thereof was 5.4×10$^8$ $\Omega/cm^2$. The running durability thereof was more than 30 minutes, and the scratch resistance thereof was A.

TABLE 1

| Core particles | Properties of acicular hematite particles or acicular iron oxide hydroxide particles | |
|---|---|---|
| | Kind | Particle shape |
| Core particles 1 | Hematite particles | Acicular |
| Core particles 2 | Hematite particles | Spindle-shaped |
| Core particles 3 | Black-brown hematite particles (Mn content: 9.0% by weight) | Acicular |
| Core particles 4 | Goethite particles | Acicular |
| Core particles 5 | Black-brown goethite particles (Mn content: 8.1% by weight) | Acicular |
| Core particles 6 | Black hematite composite particles precursor | Acicular |

| Core particles | Properties of acicular hematite particles or acicular iron oxide hydroxide particles | | | |
|---|---|---|---|---|
| | Average major axis diameter ($\mu$m) | Average minor axis diameter ($\mu$m) | Aspect ratio (-) | Geometrical standard deviation value (-) |
| Core particles 1 | 0.143 | 0.0210 | 6.8:1 | 1.38 |
| Core particles 2 | 0.187 | 0.0240 | 7.8:1 | 1.33 |
| Core particles 3 | 0.158 | 0.0211 | 7.5:1 | 1.43 |
| Core particles 4 | 0.240 | 0.0272 | 8.8:1 | 1.37 |
| Core particles 5 | 0.189 | 0.0220 | 8.6:1 | 1.41 |
| Core particles 6 | 0.144 | 0.0211 | 6.8:1 | 1.38 |

| Core particles | Properties of acicular hematite particles or acicular iron oxide hydroxide particles | | |
|---|---|---|---|
| | BET specific surface area (m²/g) | Amount of carbon black adhered (calculated as C) (wt. %) | Volume resistivity value ($\Omega \cdot$ cm) |
| Core particles 1 | 55.3 | — | $2.3 \times 10^8$ |
| Core particles 2 | 43.3 | — | $8.6 \times 10^8$ |
| Core particles 3 | 53.6 | — | $3.2 \times 10^7$ |
| Core particles 4 | 86.3 | — | $9.6 \times 10^7$ |
| Core particles 5 | 110.6 | — | $2.6 \times 10^7$ |
| Core particles 6 | 56.3 | 9.01 | $8.3 \times 10^3$ |

| Core particles | Properties of acicular hematite particles or acicular iron oxide hydroxide particles | |
|---|---|---|
| | Blackness (L* value) (-) | Resin adsorptivity (%) |
| Core particles 1 | 21.0 | 49.2 |
| Core particles 2 | 26.7 | 48.6 |
| Core particles 3 | 17.2 | 53.1 |
| Core particles 4 | 28.4 | 47.0 |
| Core particles 5 | 21.0 | 50.9 |
| Core particles 6 | 8.2 | 65.9 |

TABLE 2

| Core particles | Kind of core particles | Surface-treatment step Additives | | |
|---|---|---|---|---|
| | | Kind | Calculated as | Amount (wt. %) |
| Core particles 7 | Core particles 1 | Sodium aluminate | Al | 1.0 |
| Core particles 8 | Core particles 2 | Water glass #3 | SiO$_2$ | 0.5 |
| Core particles 9 | Core particles 3 | Aluminum sulfate | Al | 1.5 |
| | | Water glass #3 | SiO$_2$ | 0.5 |
| Core particles 10 | Core particles 4 | Sodium aluminate | Al | 1.0 |
| | | Colloidal silica | SiO$_2$ | 3.0 |
| Core particles 11 | Core particles 5 | Aluminum acetate | Al | 5.5 |

| Core particles | Surface-treatment step Coating material | | |
|---|---|---|---|
| | Kind | Calculated as | Amount (wt. %) |
| Core particles 7 | A | Al | 0.98 |
| Core particles 8 | S | SiO$_2$ | 0.48 |
| Core particles 9 | A | Al | 1.47 |
| | S | SiO$_2$ | 0.46 |
| Core particles 10 | A | Al | 0.96 |
| | S | SiO$_2$ | 2.81 |
| particles 11 | A | Al | 5.21 |

TABLE 3

| Core particles | Properties of surface-treated core particles | | | |
|---|---|---|---|---|
| | Average major axis diameter ($\mu$m) | Average minor axis diameter ($\mu$m) | Aspect ratio (-) | Geometrical standard deviation value (-) |
| Core particles 7 | 0.143 | 0.0210 | 6.8:1 | 1.37 |
| Core particles 8 | 0.187 | 0.0241 | 7.8:1 | 1.33 |
| Core particles 9 | 0.158 | 0.0212 | 7.5:1 | 1.43 |
| Core particles 10 | 0.241 | 0.0272 | 8.9:1 | 1.36 |
| Core particles 11 | 0.189 | 0.0220 | 8.6:1 | 1.41 |

TABLE 3-continued

Properties of surface-treated core particles

| Core particles | BET specific surface area (m²/g) | Volume resistivity value (Ω · cm) |
|---|---|---|
| Core particles 7 | 54.9 | $4.6 \times 10^8$ |
| Core particles 8 | 43.6 | $9.1 \times 10^8$ |
| Core particles 9 | 53.5 | $4.2 \times 10^7$ |
| Core particles 10 | 85.8 | $9.3 \times 10^7$ |
| Core particles 11 | 111.3 | $4.8 \times 10^7$ |

Properties of surface-treated core particles

| Core particles | Blackness (L* value) (−) | Resin adsorptivity (%) |
|---|---|---|
| Core particles 7 | 21.2 | 56.5 |
| Core particles 8 | 27.3 | 54.3 |
| Core particles 9 | 17.7 | 58.3 |
| Core particles 10 | 29.7 | 52.1 |
| Core particles 11 | 21.3 | 57.8 |

TABLE 4

Properties of phthalocyanine-based pigment

| Phthalocyanine-based pigment | Kind | Particle shape | Average particle size (μm) |
|---|---|---|---|
| Phthalocyanine-based pigment A | Phthalocyanine blue | Granular | 0.06 |
| Phthalocyanine-based pigment B | Phthalocyanine blue | Granular | 0.08 |
| Phthalocyanine-based pigment C | Phthalocyanine blue | Granular | 0.10 |

Properties of phthalocyanine-based pigment

| Phthalocyanine-based pigment | BET specific surface area (m²/g) | Blackness (L* value) (−) |
|---|---|---|
| Phthalocyanine-based pigment A | 71.6 | 5.2 |
| Phthalocyanine-based pigment B | 56.3 | 4.6 |
| Phthalocyanine-based pigment C | 45.2 | 3.9 |

TABLE 5

| Examples and Comparative Examples | Kind of core particles |
|---|---|
| Example 3 | Core particles 1 |
| Example 4 | Core particles 2 |
| Example 5 | Core particles 3 |
| Example 6 | Core particles 4 |
| Example 7 | Core particles 5 |
| Example 8 | Core particles 6 |
| Example 9 | Core particles 7 |
| Example 10 | Core particles 8 |
| Example 11 | Core particles 9 |
| Example 12 | Core particles 10 |
| Example 13 | Core particles 11 |
| Comparative Example 1 | Core particles 1 |
| Comparative Example 2 | Core particles 1 |
| Comparative Example 3 | Core particles 1 |
| Comparative Example 4 | Core particles 1 |

Production of non-magnetic acicular composite particles
Coating with alkoxysilanes or polysiloxanes
Additives

| Examples and Comparative Examples | Kind | Amount added (part by weight) |
|---|---|---|
| Example 3 | Methyl triethoxysilane | 2.0 |
| Example 4 | Methyl trimethoxysilane | 1.0 |
| Example 5 | Phenyl triethoxysilane | 1.0 |
| Example 6 | Methyl hydrogen polysiloxane | 0.5 |
| Example 7 | Isobutyl trimethoxysilane | 2.0 |
| Example 8 | Methyl triethoxysilane | 1.0 |
| Example 9 | Methyl triethoxysilane | 1.0 |
| Example 10 | Methyl trimethoxysilane | 2.0 |
| Example 11 | Phenyl triethoxysilane | 2.0 |
| Example 12 | Methyl hydrogen polysiloxane | 1.5 |
| Example 13 | Isobutyl trimethoxysilane | 2.0 |
| Comparative Example 1 | — | — |
| Comparative Example 2 | Methyl triethoxysilane | 1.0 |
| Comparative Example 3 | Methyl triethoxysilane | 1.0 |
| Comparative Example 4 | Methyl triethoxysilane | 0.005 |

Production of non-magnetic acicular composite particles
Coating with alkoxysilanes or polysiloxanes

| Examples and Comparative Examples | Edge runner treatment Linear load (N/cm) | Edge runner treatment Linear load (Kg/cm) | Time (min.) | Coating amount (calculated as Si) (wt. %) |
|---|---|---|---|---|
| Example 3 | 392 | 40 | 20 | 0.30 |
| Example 4 | 588 | 60 | 15 | 0.20 |
| Example 5 | 392 | 40 | 20 | 0.14 |
| Example 6 | 588 | 60 | 20 | 0.20 |
| Example 7 | 735 | 75 | 15 | 0.30 |
| Example 8 | 441 | 45 | 20 | 0.15 |
| Example 9 | 294 | 30 | 30 | 0.15 |
| Example 10 | 392 | 40 | 20 | 0.40 |
| Example 11 | 441 | 45 | 15 | 0.27 |
| Example 12 | 588 | 60 | 20 | 0.61 |
| Example 13 | 588 | 60 | 15 | 0.30 |

TABLE 5-continued

| | | | | |
|---|---|---|---|---|
| Comparative Example 1 | — | — | — | — |
| Comparative Example 2 | 392 | 40 | 20 | 0.15 |
| Comparative Example 3 | 392 | 40 | 20 | 0.15 |
| Comparative Example 4 | 392 | 40 | 20 | $7 \times 10^{-4}$ |

Production of non-magnetic acicular composite particles
Adhesion step with phthalocyanine-based pigment

| Examples and Comparative Examples | Phthalocyanine-based pigment Kind | Amount adhered (weight part) |
|---|---|---|
| Example 3 | A | 10.0 |
| Example 4 | B | 5.0 |
| Example 5 | C | 20.0 |
| Example 6 | A | 10.0 |
| Example 7 | B | 7.5 |
| Example 8 | A | 10.0 |
| Example 9 | C | 15.0 |
| Example 10 | A | 10.0 |
| Example 11 | B | 20.0 |
| Example 12 | C | 50.0 |
| Example 13 | A | 15.0 |
| Comparative Example 1 | A | 10.0 |
| Comparative Example 2 | — | — |
| Comparative Example 3 | A | 200.0 |
| Comparative Example 4 | A | 10.0 |

Production of non-magnetic acicular composite particles
Adhesion steip with phthalocyanine-based pigment

| Examples and Comparative Examples | Edge runner treatment Linear load (N/cm) | Linear load (Kg/cm) | Time (min.) | Amount adhered (calculated as C) (wt. %) |
|---|---|---|---|---|
| Example 3 | 392 | 40 | 20 | 5.99 |
| Example 4 | 392 | 40 | 20 | 3.15 |
| Example 5 | 441 | 45 | 20 | 11.06 |
| Example 6 | 588 | 60 | 20 | 6.01 |
| Example 7 | 294 | 30 | 40 | 4.60 |
| Example 8 | 294 | 30 | 30 | 5.98 |
| Example 9 | 588 | 60 | 20 | 8.61 |
| Example 10 | 441 | 45 | 30 | 6.00 |
| Example 11 | 588 | 60 | 20 | 11.05 |
| Example 12 | 490 | 50 | 20 | 22.16 |
| Example 13 | 441 | 45 | 40 | 8.58 |
| Comparative Example 1 | 392 | 40 | 20 | 6.01 |
| Comparative Example 2 | — | — | — | — |
| Comparative Example 3 | 392 | 40 | 20 | 44.33 |
| Comparative Example 4 | 392 | 40 | 20 | 6.01 |

TABLE 6

| Examples and Comparative Examples | Average major axis diameter ($\mu$m) | Average minor axis diameter ($\mu$m) | Aspect ratio (-) | Geometrical standard deviation value (-) |
|---|---|---|---|---|
| Example 3 | 0.144 | 0.0213 | 6.8:1 | 1.38 |
| Example 4 | 0.187 | 0.0242 | 7.7:1 | 1.33 |
| Example 5 | 0.159 | 0.0216 | 7.4:1 | 1.44 |
| Example 6 | 0.241 | 0.0275 | 8.8:1 | 1.37 |
| Example 7 | 0.190 | 0.0222 | 8.6:1 | 1.41 |
| Example 8 | 0.144 | 0.0212 | 6.8:1 | 1.38 |
| Example 9 | 0.144 | 0.0215 | 6.7:1 | 1.38 |
| Example 10 | 0.188 | 0.0244 | 7.7:1 | 1.33 |
| Example 11 | 0.160 | 0.0217 | 7.4:1 | 1.43 |
| Example 12 | 0.243 | 0.0280 | 8.7:1 | 1.37 |
| Example 13 | 0.190 | 0.0224 | 8.5:1 | 1.41 |
| Comparative Example 1 | 0.143 | 0.0210 | 6.8:1 | — |
| Comparative Example 2 | 0.143 | 0.0210 | 6.8:1 | 1.38 |
| Comparative Example 3 | 0.148 | 0.0225 | 6.6:1 | — |
| Comparative Example 4 | 0.143 | 0.0210 | 6.8:1 | — |

| Examples and Comparative Examples | BET specific surface area value ($m^2/g$) | Volume resistivity value ($\Omega \cdot cm$) |
|---|---|---|
| Example 3 | 56.4 | $2.4 \times 10^7$ |
| Example 4 | 45.6 | $1.6 \times 10^8$ |
| Example 5 | 54.2 | $3.6 \times 10^6$ |
| Example 6 | 86.5 | $2.8 \times 10^7$ |
| Example 7 | 110.0 | $4.3 \times 10^6$ |
| Example 8 | 57.7 | $1.5 \times 10^6$ |
| Example 9 | 55.9 | $4.2 \times 10^7$ |
| Example 10 | 45.9 | $8.3 \times 10^7$ |
| Example 11 | 54.6 | $4.6 \times 10^6$ |
| Example 12 | 86.0 | $2.8 \times 10^7$ |
| Example 13 | 111.2 | $2.9 \times 10^6$ |
| Comparative Example 1 | 83.2 | $9.2 \times 10^7$ |
| Comparative Example 2 | 54.3 | $4.6 \times 10^8$ |
| Comparative Example 3 | 146.5 | $1.3 \times 10^7$ |
| Comparative Example 4 | 76.8 | $6.2 \times 10^7$ |

| Examples and Comparative Examples | Blackness (L* value) (-) | Resin adsorptivity (%) | Desorption percentage of phthalocyanine-based pigment (%) |
|---|---|---|---|
| Example 3 | 11.7 | 77.3 | 6.5 |
| Example 4 | 13.8 | 78.6 | 5.7 |
| Example 5 | 10.3 | 80.5 | 7.6 |
| Example 6 | 13.6 | 74.9 | 7.1 |
| Example 7 | 12.3 | 77.8 | 6.5 |
| Example 8 | 8.0 | 82.4 | 5.9 |
| Example 9 | 10.2 | 83.2 | 3.6 |
| Example 10 | 12.7 | 81.9 | 2.2 |
| Example 11 | 10.6 | 85.1 | 3.8 |
| Example 12 | 8.6 | 84.3 | 4.4 |
| Example 13 | 10.7 | 82.2 | 4.0 |

TABLE 6-continued

| | | | |
|---|---|---|---|
| Comparative Example 1 | 17.4 | 50.1 | 63.8 |
| Comparative Example 2 | 21.7 | 52.2 | — |
| Comparative Example 3 | 6.9 | 66.2 | 36.2 |
| Comparative Example 4 | 17.2 | 51.5 | 43.2 |

TABLE 7

| | Production of non-magnetic coating composition | | Properties of non-magnetic coating composition |
|---|---|---|---|
| Examples | Kind of non-magnetic particles | Weight ratio of particles to resin (-) | Viscosity (cP) |
| Example 14 | Example 3 | 5.0:1 | 410 |
| Example 15 | Example 4 | 5.0:1 | 384 |
| Example 16 | Example 5 | 5.0:1 | 435 |
| Example 17 | Example 6 | 5.0:1 | 377 |
| Example 18 | Example 7 | 5.0:1 | 512 |
| Example 19 | Example 8 | 5.0:1 | 448 |
| Example 20 | Example 9 | 5.0:1 | 410 |
| Example 21 | Example 10 | 5.0:1 | 333 |
| Example 22 | Example 11 | 5.0:1 | 640 |
| Example 23 | Example 12 | 5.0:1 | 512 |
| Example 24 | Example 13 | 5.0:1 | 470 |

| | Properties of non-magnetic undercoat layer | | |
|---|---|---|---|
| Examples | Thickness of coating film ($\mu$m) | Gloss (%) | Surface roughness Ra (nm) |
| Example 14 | 3.5 | 194 | 6.4 |
| Example 15 | 3.5 | 191 | 6.8 |
| Example 16 | 3.5 | 193 | 6.2 |
| Example 17 | 3.4 | 191 | 6.4 |
| Example 18 | 3.5 | 193 | 6.1 |
| Example 19 | 3.5 | 198 | 6.2 |
| Example 20 | 3.5 | 203 | 5.8 |
| Example 21 | 3.4 | 198 | 6.0 |
| Example 22 | 3.5 | 211 | 5.4 |
| Example 23 | 3.5 | 197 | 5.8 |
| Example 24 | 3.5 | 200 | 6.0 |

| | Properties of non-magnetic undercoat layer | | |
|---|---|---|---|
| Examples | Young's modulus (relative value) | Linear absorption ($\mu$m$^{-1}$) | Surface resistivity value ($\Omega$/cm$^2$) |
| Example 14 | 135 | 1.66 | $7.6 \times 10^{10}$ |
| Example 15 | 133 | 1.57 | $9.4 \times 10^{10}$ |
| Example 16 | 132 | 1.73 | $9.2 \times 10^{9}$ |
| Example 17 | 135 | 1.57 | $6.6 \times 10^{10}$ |
| Example 18 | 135 | 1.63 | $1.3 \times 10^{10}$ |
| Example 19 | 136 | 1.92 | $7.4 \times 10^{9}$ |
| Example 20 | 138 | 1.74 | $6.1 \times 10^{10}$ |
| Example 21 | 139 | 1.61 | $7.9 \times 10^{9}$ |
| Example 22 | 136 | 1.76 | $1.8 \times 10^{10}$ |
| Example 23 | 137 | 1.88 | $7.3 \times 10^{10}$ |
| Example 24 | 136 | 1.71 | $8.3 \times 10^{9}$ |

TABLE 8

| | Production of non-magnetic coating composition | | Properties of non-magnetic coating composition |
|---|---|---|---|
| Comparative Examples | Kind of non-magnetic particles | Weight ratio of particles to resin (-) | Viscosity (cP) |
| Comparative Example 5 | Core particles 1 | 5.0:1 | 435 |
| Comparative Example 6 | Core particles 2 | 5.0:1 | 310 |
| Comparative Example 7 | Core particles 3 | 5.0:1 | 486 |
| Comparative Example 8 | Core particles 4 | 5.0:1 | 1,126 |
| Comparative Example 9 | Core particles 5 | 5.0:1 | 2,355 |
| Comparative Example 10 | Core particles 6 | 5.0:1 | 396 |
| Comparative Example 11 | Comparative Example 1 | 5.0:1 | 8,749 |
| Comparative Example 12 | Comparative Example 2 | 5.0:1 | 435 |
| Comparative Example 13 | Comparative Example 3 | 5.0:1 | 12,589 |
| Comparative Example 14 | Comparative Example 4 | 5.0:1 | 7,728 |

| | Properties of non-magnetic undercoat layer | | |
|---|---|---|---|
| Comparative Examples | Thickness of coating film ($\mu$m) | Gloss (%) | Surface roughness Ra (nm) |
| Comparative Example 5 | 3.5 | 198 | 7.0 |
| Comparative Example 6 | 3.4 | 193 | 8.2 |
| Comparative Example 7 | 3.5 | 186 | 9.2 |
| Comparative Example 8 | 3.5 | 180 | 12.1 |
| Comparative Example 9 | 3.6 | 171 | 14.2 |
| Comparative Example 10 | 3.5 | 189 | 6.7 |
| Comparative Example 11 | 3.8 | 116 | 21.9 |
| Comparative Example 12 | 3.5 | 184 | 8.6 |
| Comparative Example 13 | 3.9 | 88 | 22.6 |
| Comparative Example 14 | 3.8 | 121 | 21.3 |

| | Properties of non-magnetic undercoat layer | | |
|---|---|---|---|
| Comparative Examples | Young's modulus (relative value) | Linear absorption ($\mu$m$^{-1}$) | Surface resistivity value ($\Omega$/cm$^2$) |
| Comparative Example 5 | 121 | 0.98 | $5.8 \times 10^{13}$ |
| Comparative Example 6 | 123 | 1.01 | $1.1 \times 10^{14}$ |
| Comparative Example 7 | 120 | 1.21 | $5.6 \times 10^{12}$ |
| Comparative Example 8 | 126 | 0.78 | $1.6 \times 10^{13}$ |
| Comparative Example 9 | 121 | 1.18 | $2.3 \times 10^{12}$ |
| Comparative Example 10 | 124 | 2.35 | $1.1 \times 10^{9}$ |

TABLE 8-continued

| | | | |
|---|---|---|---|
| Comparative Example 11 | 103 | 1.05 | $6.4 \times 10^{12}$ |
| Comparative Example 12 | 121 | 0.97 | $8.3 \times 10^{13}$ |
| Comparative Example 13 | 115 | 1.92 | $8.2 \times 10^{11}$ |
| Comparative Example 14 | 111 | 1.08 | $1.6 \times 10^{12}$ |

TABLE 9

| Magnetic particles | Kind |
|---|---|
| Magnetic particles (1) | Magnetic metal particles containing iron as main component |
| Magnetic particles (2) | Magnetic metal particles containing iron as main component |
| Magnetic particles (3) | Co-coated magnetite particles (Co content: 4.16 wt. %) |
| Magnetic particles (4) | Co-coated maghemite particles (Co content: 3.51 wt. %) |

| | Properties of magnetic particles | | | |
|---|---|---|---|---|
| Magnetic particles | Average major axis diameter ($\mu$m) | Average minor axis diameter ($\mu$m) | Aspect ratio (−) | Geometrical standard deviation value (−) |
| Magnetic particles (1) | 0.153 | 0.0184 | 8.3:1 | 1.37 |
| Magnetic particles (2) | 0.101 | 0.0129 | 7.8:1 | 1.36 |
| Magnetic particles (3) | 0.212 | 0.0283 | 7.5:1 | 1.41 |
| Magnetic particles (4) | 0.251 | 0.0313 | 8.0:1 | 1.38 |

| | Properties of magnetic particles | | | |
|---|---|---|---|---|
| Magnetic particles | Coercive force value (kA/m) | (Oe) | Saturation magnetization value (Am²/kg) | (emu/g) |
| Magnetic particles (1) | 128.1 | 1,610 | 131.3 | 131.3 |
| Magnetic particles (2) | 147.5 | 1,853 | 136.0 | 136.0 |
| Magnetic particles (3) | 67.8 | 852 | 83.0 | 83.0 |
| Magnetic particles (4) | 57.6 | 724 | 79.8 | 79.8 |

TABLE 10

| | Production of magnetic recording medium | | |
|---|---|---|---|
| Examples and Comparative Examples | Kind of non-magnetic undercoat layer | Kind of magnetic particles | Weight ratio of particles to resin (−) |
| Example 25 | Example 14 | Magnetic particles (1) | 5.0:1 |
| Example 26 | Example 15 | Magnetic particles (1) | 5.0:1 |
| Example 27 | Example 16 | Magnetic particles (1) | 5.0:1 |
| Example 28 | Example 17 | Magnetic particles (2) | 5.0:1 |
| Example 29 | Example 18 | Magnetic particles (2) | 5.0:1 |
| Example 30 | Example 19 | Magnetic particles (2) | 5.0:1 |
| Example 31 | Example 20 | Magnetic particles (1) | 5.0:1 |
| Example 32 | Example 21 | Magnetic particles (1) | 5.0:1 |
| Example 33 | Example 22 | Magnetic particles (2) | 5.0:1 |
| Example 34 | Example 23 | Magnetic particles (3) | 5.0:1 |
| Example 35 | Example 24 | Magnetic particles (4) | 5.0:1 |
| Comparative Example 15 | Comparative Example 5 | Magnetic particles (1) | 5.0:1 |
| Comparative Example 16 | Comparative Example 6 | Magnetic particles (1) | 5.0:1 |
| Comparative Example 17 | Comparative Example 7 | Magnetic particles (1) | 5.0:1 |
| Comparative Example 18 | Comparative Example 8 | Magnetic particles (1) | 5.0:1 |
| Comparative Example 19 | Comparative Example 9 | Magnetic particles (1) | 5.0:1 |
| Comparative Example 20 | Comparative Example 10 | Magnetic particles (1) | 5.0:1 |
| Comparative Example 21 | Comparative Example 11 | Magnetic particles (1) | 5.0:1 |
| Comparative Example 22 | Comparative Example 12 | Magnetic particles (1) | 5.0:1 |
| Comparative Example 23 | Comparative Example 13 | Magnetic particles (1) | 5.0:1 |
| Comparative Example 24 | Comparative Example 14 | Magnetic particles (1) | 5.0:1 |

TABLE 11

| | Properties of magnetic recording medium | | |
|---|---|---|---|
| | Thickness of magnetic layer | Coercive force value | |
| Examples | ($\mu$m) | (kA/m) | (Oe) |
| Example 25 | 1.0 | 130.7 | 1,643 |
| Example 26 | 1.1 | 130.3 | 1,637 |
| Example 27 | 1.0 | 130.1 | 1,635 |
| Example 28 | 1.1 | 146.4 | 1,840 |
| Example 29 | 1.1 | 146.3 | 1,838 |
| Example 30 | 1.0 | 146.5 | 1,841 |
| Example 31 | 1.0 | 131.4 | 1,651 |
| Example 32 | 1.1 | 131.1 | 1,648 |
| Example 33 | 1.0 | 146.6 | 1,842 |
| Example 34 | 1.1 | 72.6 | 912 |
| Example 35 | 1.1 | 60.6 | 762 |

| | Properties of magnetic recording medium | | |
|---|---|---|---|
| Examples | Squareness Br/Bm (−) | Gloss (%) | Surface roughness Ra (nm) |
| Example 25 | 0.89 | 225 | 6.0 |
| Example 26 | 0.89 | 218 | 6.1 |
| Example 27 | 0.90 | 226 | 5.9 |
| Example 28 | 0.88 | 235 | 5.7 |
| Example 29 | 0.89 | 238 | 5.7 |
| Example 30 | 0.90 | 239 | 5.6 |
| Example 31 | 0.89 | 230 | 6.0 |
| Example 32 | 0.90 | 231 | 6.0 |
| Example 33 | 0.91 | 241 | 5.6 |
| Example 34 | 0.88 | 198 | 5.6 |
| Example 35 | 0.90 | 196 | 5.7 |

TABLE 11-continued

Properties of magnetic recording medium

| Examples | Young's modulus (relative value) | Linear absorption ($\mu m^{-1}$) | Surface resistivity value ($\Omega/cm^2$) |
| --- | --- | --- | --- |
| Example 25 | 138 | 1.58 | $2.1 \times 10^9$ |
| Example 26 | 136 | 1.56 | $7.6 \times 10^9$ |
| Example 27 | 135 | 1.66 | $6.3 \times 10^8$ |
| Example 28 | 138 | 1.60 | $1.6 \times 10^9$ |
| Example 29 | 137 | 1.54 | $8.9 \times 10^8$ |
| Example 30 | 139 | 1.95 | $5.4 \times 10^8$ |
| Example 31 | 141 | 1.60 | $1.3 \times 10^9$ |
| Example 32 | 141 | 1.55 | $6.8 \times 10^8$ |
| Example 33 | 139 | 1.74 | $9.4 \times 10^8$ |
| Example 34 | 140 | 1.91 | $5.9 \times 10^9$ |
| Example 35 | 140 | 1.68 | $6.1 \times 10^8$ |

Properties of magnetic recording medium Durability

| Examples | Running durability (min.) | Scratch resistance (-) |
| --- | --- | --- |
| Example 25 | ≧30 | A |
| Example 26 | 29.6 | A |
| Example 27 | ≧30 | A |
| Example 28 | 27.8 | B |
| Example 29 | 28.9 | A |
| Example 30 | ≧30 | A |
| Example 31 | ≧30 | A |
| Example 32 | ≧30 | A |
| Example 33 | ≧30 | A |
| Example 34 | 28.4 | A |
| Example 35 | 29.1 | A |

TABLE 12

Properties of magnetic recording medium

| Comparative Examples | Thickness of magnetic layer ($\mu m$) | Coercive force value (kA/m) | Coercive force value (Oe) |
| --- | --- | --- | --- |
| Comparative Example 15 | 1.0 | 129.8 | 1,631 |
| Comparative Example 16 | 1.1 | 129.6 | 1,628 |
| Comparative Example 17 | 1.1 | 130.0 | 1,634 |
| Comparative Example 18 | 1.1 | 130.4 | 1,638 |
| Comparative Example 19 | 1.0 | 129.9 | 1,632 |
| Comparative Example 20 | 1.1 | 130.0 | 1,634 |
| Comparative Example 21 | 1.3 | 128.3 | 1,612 |
| Comparative Example 22 | 1.2 | 128.4 | 1,613 |
| Comparative Example 23 | 1.4 | 128.8 | 1,618 |
| Comparative Example 24 | 1.3 | 129.0 | 1,621 |

TABLE 12-continued

Properties of magnetic recording medium

| Comparative Examples | Squareness Br/Bm (-) | Gloss (%) | Surface roughness Ra (nm) |
| --- | --- | --- | --- |
| Comparative Example 15 | 0.86 | 193 | 9.2 |
| Comparative Example 16 | 0.86 | 190 | 9.6 |
| Comparative Example 17 | 0.85 | 186 | 9.8 |
| Comparative Example 18 | 0.84 | 183 | 12.1 |
| Comparative Example 19 | 0.84 | 180 | 12.7 |
| Comparative Example 20 | 0.85 | 215 | 6.9 |
| Comparative Example 21 | 0.78 | 160 | 18.3 |
| Comparative Example 22 | 0.85 | 180 | 10.0 |
| Comparative Example 23 | 0.73 | 156 | 19.6 |
| Comparative Example 24 | 0.80 | 172 | 17.3 |

Properties of magnetic recording medium

| Comparative Examples | Young's modulus (relative value) | Linear absorption ($\mu m^{-1}$) | Surface resistivity value ($\Omega/cm^2$) |
| --- | --- | --- | --- |
| Comparative Example 15 | 125 | 1.16 | $7.2 \times 10^{11}$ |
| Comparative Example 16 | 126 | 1.17 | $6.8 \times 10^{11}$ |
| Comparative Example 17 | 124 | 1.24 | $7.3 \times 10^{10}$ |
| Comparative Example 18 | 125 | 1.10 | $3.6 \times 10^{11}$ |
| Comparative Example 19 | 125 | 1.19 | $8.4 \times 10^{10}$ |
| Comparative Example 20 | 124 | 2.08 | $6.0 \times 10^8$ |
| Comparative Example 21 | 100 | 1.21 | $1.2 \times 10^{11}$ |
| Comparative Example 22 | 123 | 1.02 | $7.6 \times 10^{10}$ |
| Comparative Example 23 | 110 | 1.88 | $2.8 \times 10^{10}$ |
| Comparative Example 24 | 106 | 1.22 | $1.1 \times 10^{11}$ |

Properties of magnetic recording medium Durability

| Comparative Examples | Running durability (min.) | Scratch resistance (-) |
| --- | --- | --- |
| Comparative Example 15 | 21.3 | C |
| Comparative Example 16 | 22.5 | C |
| Comparative Example 17 | 19.8 | C |
| Comparative Example 18 | 17.2 | C |
| Comparative Example 19 | 16.8 | C |
| Comparative Example 20 | 21.6 | C |
| Comparative Example 21 | 9.2 | D |
| Comparative Example 22 | 20.6 | C |

TABLE 12-continued

| | | |
|---|---|---|
| Comparative Example 23 | 16.2 | C |
| Comparative Example 24 | 12.1 | D |

What is claimed is:

1. A magnetic recording medium comprising: a non-magnetic base film;
   a non-magnetic undercoat layer formed on the non-magnetic base film, comprising non-magnetic acicular composite particles and a binder resin; and
   a magnetic recording layer formed on the non-magnetic undercoat layer, comprising magnetic particles and a binder resin,
   said non-magnetic acicular composite particles having an average major axis diameter of 0.01 to 0.3 μm and comprising:
      acicular hematite particles or acicular iron oxide hydroxide particles as non-magnetic core particles,
      a coating formed on surface of said acicular hematite particle or acicular iron oxide hydroxide particle, comprising at least one organosilicon compound selected from the group consisting of:
         (1) organosilane compounds obtainable from alkoxysilane compounds, and
         (2) polysiloxanes or modified polysiloxanes, and
      a phthalocyanine-based pigment coat formed on said coating layer comprising said organosilicon compound, in an amount of from 1 to 100 parts by weight based on 100 parts by weight of said acicular hematite particles or acicular iron oxide hydroxide particles.

2. A magnetic recording medium according to claim 1, wherein said acicular hematite particles or acicular iron oxide hydroxide particles are particles coated with at least one compound selected from the group consisting of hydroxides of aluminum, oxides of aluminum, hydroxides of silicon and oxides of silicon.

3. A magnetic recording medium according to claim 1, wherein said acicular hematite particles or acicular iron oxide hydroxide particles have a coating formed on the surface of said acicular hematite particle or acicular iron oxide hydroxide particle, comprising at least one organosilicon compound selected from the group consisting of:
   (1) organosilane compounds obtainable from alkoxysilane compounds, and
   (2) polysiloxanes or modified polysiloxanes, and
   a carbon black coat formed on at least a part of the surface of said coating layer comprising said organosilicon compound, in an amount of 1 to 50 parts by weight based on 100 parts by weight of the said acicular hematite particles or acicular iron oxide hydroxide particles.

4. A magnetic recording medium according to claim 3, wherein said acicular hematite particles or acicular iron oxide hydroxide particles have a coating layer comprising at least one compound selected from the group consisting of hydroxides of aluminum, oxides of aluminum, hydroxides of silicon and oxides of silicon between the surface of said acicular hematite particle or acicular iron oxide hydroxide particle and the coating comprising at least one organosilicon compound.

5. A magnetic recording medium according to claim 1, wherein said modified polysiloxanes are ones selected from the group consisting of:
   (A) polysiloxanes modified with at least one compound selected from the group consisting of polyethers, polyesters and epoxy compounds, and
   (B) polysiloxanes whose molecular terminal is modified with at least one group selected from the group consisting of carboxylic acid groups, alcohol groups and a hydroxyl group.

6. A magnetic recording medium according to claim 5, wherein said polysiloxanes modified with at least one compound selected from the group consisting of polyethers, polyesters and epoxy compounds are represented by the general formula (III), (IV) or (V):

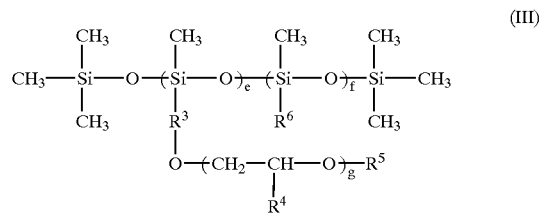

(III)

wherein $R^3$ is $-(-CH_2-)_h-$; $R^4$ is $-(-CH_2-)_i-CH_3$; $R^5$ is $-OH$, $-COOH$, $-CH=CH_2$, $-C(CH_3)=CH_2$ or $-(-CH_2-)_j-CH_3$; $R^6$ is $-(-CH_2-)_k-CH_3$; g and h are an integer from 1 to 15; i, j and k are an integer from 0 to 15; e is an integer from 1 to 50; and f is an integer from 1 to 300;

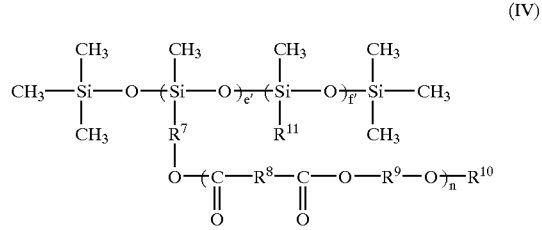

(IV)

wherein $R^7$, $R^8$ and $R^9$ are $-(-CH_2-)_q-$ and may be the same or different; $R^{10}$ is $-OH$, $-COOH$, $-CH=CH_2$, $-C(CH_3)=CH_2$ or $-(-CH_2-)_r-CH_3$; $R^{11}$ is $-(-CH_2-)_s-CH_3$; n and q are an integer from 1 to 15; r and s are an integer from f 0 to 15; e' is an integer from 1 to 50; and f' is an integer from 1 to 300; or

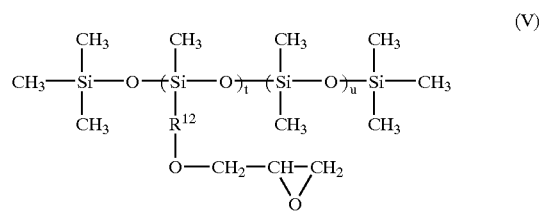

(V)

wherein $R^{12}$ is $-(-CH_2-)_v-$; v is an integer from 1 to 15; t is an integer from 1 to 50; and u is an integer from 1 to 300.

7. A magnetic recording medium according to claim 5, wherein said polysiloxanes whose molecular terminal is modified with at least one group selected from the group consisting of carboxylic acid groups, alcohol groups and hydroxyl groups are represented by the general formula (VI):

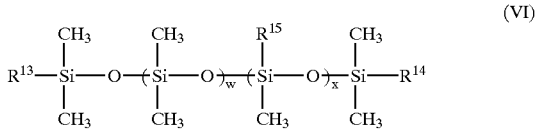

(VI)

wherein $R^{13}$ and $R^{14}$ are —OH, $R^{16}$OH or $R^{17}$COOH and may be the same or different; $R^{15}$ is —CH$_3$ or —C$_6$H$_5$; $R^{16}$ and $R^{17}$ are —(—CH$_2$—)$_y$—; y is an integer from 1 to 15; w is an integer from 1 to 200; and x is an integer from 0 to 100.

8. A magnetic recording medium according to claim 1, wherein said alkoxysilane compound is represented by the general formula (I):

(I)

wherein $R^1$ is C$_6$H$_5$—, (CH$_3$)$_2$CHCH$_2$— or n—C$_b$H$_{2b+1}$— (wherein b is an integer from 1 to 18); X is CH$_3$O— or C$_2$H$_5$O —; and a is an integer from 0 to 3.

9. A magnetic recording medium according to claim 8, wherein said alkoxysilane compound is methyltriethoxysilane, dimethyldiethoxysilane, phenyltriethoxysilane, diphenyldiethoxysilane, methyltrimethoxysilane, dimethyldimethoxysilane, phenyltrimethoxysilane, diphenyldimethoxysilane, isobutyltrimethoxysilane or decyltrimethoxysilane.

10. A magnetic recording medium according to claim 1, wherein said polysiloxanes are represented by the general formula (II):

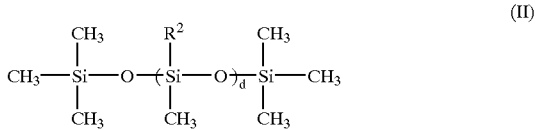

(II)

wherein $R^2$ is H— or CH$_3$—, and d is an integer from 15 to 450.

11. A magnetic recording medium according to claim 10, wherein said polysiloxanes are ones having methyl hydrogen siloxane units.

12. A magnetic recording medium according to claim 1, wherein said acicular hematite particles are acicular manganese-containing hematite particles.

13. A magnetic recording medium according to claim 1, wherein said acicular iron oxide hydroxide particles are acicular manganese-containing goethite particles.

14. A magnetic recording medium according to claim 1, wherein the amount of said coating organosilicon compounds is 0.02 to 5.0% by weight, calculated as Si, based on the total weight of the organosilicon compounds and said acicular hematite particles or acicular iron oxide hydroxide particles.

15. A magnetic recording medium according to claim 1, wherein said phthalocyanine-based pigment is a phthalocyanine blue pigment and a phthalocyanine green pigment.

16. A magnetic recording medium according to claim 1, said non-magnetic acicular composite particles have an aspect ratio of 2.0:1 to 20.0:1, a BET specific surface area of 35 to 250 m$^2$/g and a geometrical standard deviation value of the average major axis diameter of not more than 1.50.

17. A magnetic recording medium according to claim 1, which further comprises a gloss of coating film of 170 to 300%, a surface roughness Ra of coating film of not more than 11.5 nm, a linear absorption of coating film of 1.20 to 5.00 $\mu$m$^{-1}$ and a surface resistivity of not more than 5.0× 10$^{10}$ $\Omega$/cm$^2$.

18. Non-magnetic acicular composite particles for a non-magnetic undercoat layer of a magnetic recording medium, having an average major axis diameter of 0.01 to 0.3 $\mu$m, comprising:

acicular hematite particles as non-magnetic core particles, a coating formed on surface of said acicular hematite particle, comprising at least one organosilicon compound selected from the group consisting of:

(1) organosilane compounds obtainable from alkoxysilane compounds, and (2) polysiloxanes or modified polysiloxanes, and a phthalocyanine-based pigment coat formed on said coating layer comprising said organosilicon compound, in an amount of from 1 to 100 parts by weight based on 100 parts by weight of said acicular hematite particles.

19. Non-magnetic acicular composite particles according to claim 18, which have an aspect ratio of 2.0:1 to 20.0:1.

20. Non-magnetic acicular composite particles according to claim 18, wherein said acicular hematite particles are particles coated with at least one compound selected from the group consisting of hydroxides of aluminum, oxides of aluminum, hydroxides of silicon and oxides of silicon.

21. Non-magnetic acicular composite particles according to claim 18, wherein said acicular hematite particles have a coating formed on the surface of said acicular hematite particle, comprising at least one organosilicon compound selected from the group consisting of:

(1) organosilane compounds obtainable from alkoxysilane compounds, and (2) polysiloxanes or modified polysiloxanes, and a carbon black coat formed on at least a part of the surface of said coating layer comprising said organosilicon compound, in an amount of 1 to 50 parts by weight based on 100 parts by weight of the said acicular hematite particles.

22. Non-magnetic acicular composite particles according to claim 21, wherein said acicular hematite particles have a coating layer comprising at least one compound selected from the group consisting of hydroxides of aluminum, oxides of aluminum, hydroxides of silicon and oxides of silicon between the surface of said acicular hematite particle and the coating comprising at least one organosilicon compound.

23. Non-magnetic acicular composite particles according to claim 18, wherein said modified polysiloxanes are compounds selected from the group consisting of:

(A) polysiloxanes modified with at least one compound selected from the group consisting of polyethers, polyesters and epoxy compounds, and (B) polysiloxanes whose molecular terminal is modified with at least one group selected from the group consisting of carboxylic acid groups, alcohol groups and a hydroxyl group.

24. Non-magnetic acicular composite particles according to claim 23, wherein said polysiloxanes modified with at least one compound selected from the group consisting of polyethers, polyesters and epoxy compounds are represented by the general formula (III), (IV) or (V):

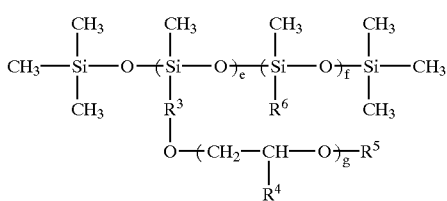 (III)

wherein $R^3$ is $-(-CH_2-)_h-$; $R^4$ is $-(-CH_2-)_i-CH_3$; $R^5$ is $-OH$, $-COOH$, $-CH=CH_2$, $-C(CH_3)=CH_2$ or $-(-CH_2-)_j-CH_3$; $R^6$ is $-(-CH_2-)_k-CH_3$; g and h are an integer from 1 to 15; i, j and k are an integer from 0 to 15; e is an integer from 1 to 50; and f is an integer from 1 to 300;

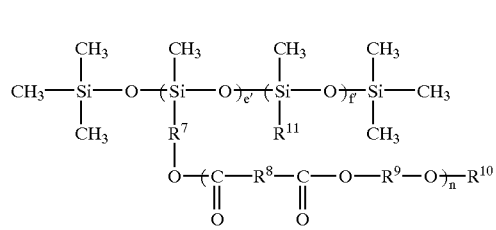 (IV)

wherein $R^7$, $R^8$ and $R^9$ are $-(-CH_2-)_q-$ and may be the same or different; $R^{10}$ is $-OH$, $-COOH$, $-CH=CH_2$, $-C(CH_3)=CH_2$ or $-(-CH_2-)_r-CH_3$; $R^{11}$ is $-(-CH_2-)_s-CH_3$; n and q are an integer from 1 to 15; r and s are an integer from 0 to 15; e' is an integer from 1 to 50; and f' is an integer from 1 to 300; or

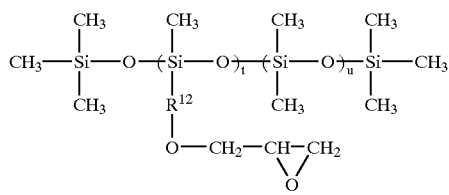 (V)

wherein $R^{12}$ is $-(-CH_2-)_v-$; v is an integer from 1 to 15; t is an integer from 1 to 50; and u is an integer from 1 to 300.

25. Non-magnetic acicular composite particles according to claim 23, wherein said polysiloxanes whose molecular terminal is modified with at least one group selected from the group consisting of carboxylic acid groups, alcohol groups and hydroxyl groups are represented by the general formula (VI):

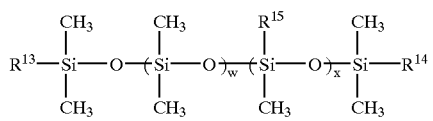 (VI)

wherein $R^{13}$ and $R^{14}$ are $-OH$, $R^{16}OH$ or $R^{17}COOH$ and may be the same or different; $R^{15}$ is $-CH_3$ or $-C_6H_5$; $R^{16}$ and $R^{17}$ are $-(-CH_2-)_y-$; y is an integer from 1 to 15; w is an integer from 1 to 200; and x is an integer from 0 to 100.

26. Non-magnetic acicular composite particles according to claim 18, wherein said alkoxysilane compound is represented by the general formula (I):

 (I)

wherein $R^1$ is $C_6H_5-$, $(CH_3)_2CHCH_2-$ or $n-C_bH_{2b+1}-$ (wherein b is an integer from 1 to 18); X is $CH_3O-$ or $C_2H_5O-$; and a is an integer from 0 to 3.

27. Non-magnetic acicular composite particles according to claim 26, wherein said alkoxysilane compound is methyltriethoxysilane, dimethyldiethoxysilane, phenyltriethoxysilane, diphenyldiethoxysilane, methyltrimethoxysilane, dimethyldimethoxysilane, phenyltrimethoxysilane, diphenyldimethoxysilane, isobutyltrimethoxysilane or decyltrimethoxysilane.

28. Non-magnetic acicular composite particles according to claim 18, wherein said polysiloxanes are represented by the general formula (II):

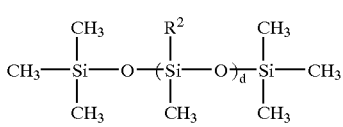 (II)

wherein $R^2$ is $H-$ or $CH_3-$, and d is an integer from 15 to 450.

29. Non-magnetic acicular composite particles according to claim 18, wherein the amount of said coating organosilicon compounds is 0.02 to 5.0% by weight, calculated as Si, based on the total weight of the organosilicon compounds and said acicular hematite particles.

30. Non-magnetic acicular composite particles according to claim 18, wherein said non-magnetic acicular composite particles have a BET specific surface area value of 35 to 250 m²/g, and a volume resistivity value of not more than $1.0 \times 10^9$ Ω·cm.

31. Non-magnetic acicular composite particles according to claim 18, wherein said non-magnetic acicular composite particles have a L* value of 4.0 to 20.0.

32. Non-magnetic acicular composite particles according to claim 18, wherein said phthalocyanine-based pigment is a phthalocyanine blue pigment and a phthalocyanine green pigment.

33. Non-magnetic acicular composite particles for a non-magnetic undercoat layer of a magnetic recording medium, having an average major axis diameter of 0.01 to 0.3 μm, comprising:

acicular iron oxide hydroxide particles as non-magnetic core particles, a coating formed on surface of said acicular iron oxide hydroxide particles, comprising at least one organosilicon compound selected from the group consisting of:
(1) organosilane compounds obtainable from alkoxysilane compounds, and
(2) polysiloxanes or modified polysiloxanes, and
a phthalocyanine-based pigment coat formed on said coating layer comprising said organosilicon compound, in an amount of from more than 30 to 100 parts by weight based on 100 parts by weight of said acicular iron oxide hydroxide particles.

34. Non-magnetic acicular composite particles according to claim 33, which have an aspect ratio of 2.0:1 to 20.0:1.

35. Non-magnetic acicular composite particles according to claim 33, wherein said acicular iron oxide hydroxide particles are particles coated with at least one compound selected from the group consisting of hydroxides of aluminum, oxides of aluminum, hydroxides of silicon and oxides of silicon.

36. Non-magnetic acicular composite particles according to claim 33, wherein said acicular iron oxide hydroxide particles have a coating formed on the surface of said acicular iron oxide hydroxide particles, comprising at least one organosilicon compound selected from the group consisting of:

(1) organosilane compounds obtainable from alkoxysilane compounds, and (2) polysiloxanes or modified polysiloxanes, and a carbon black coat formed on at least a part of the surface of said coating layer comprising said organosilicon compound, in an amount of 1 to 50 parts by weight based on 100 parts by weight of the said acicular iron oxide hydroxide particles.

37. Non-magnetic acicular composite particles according to claim 36, wherein said acicular iron oxide hydroxide particles have a coating layer comprising at least one compound selected from the group consisting of hydroxides of aluminum, oxides of aluminum, hydroxides of silicon and oxides of silicon between the surface of said acicular iron oxide hydroxide particle and the coating comprising at least one organosilicon compound.

38. Non-magnetic acicular composite particles according to claim 33, wherein said modified polysiloxanes are compounds selected from the group consisting of:

(A) polysiloxanes modified with at least one compound selected from the group consisting of polyethers, polyesters and epoxy compounds, and (B) polysiloxanes whose molecular terminal is modified with at least one group selected from the group consisting of carboxylic acid groups, alcohol groups and a hydroxyl group.

39. Non-magnetic acicular composite particles according to claim 38, wherein said polysiloxanes modified with at least one compound selected from the group consisting of polyethers, polyesters and epoxy compounds are represented by the general formula (III), (IV) or (V):

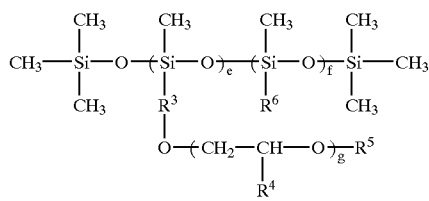

(III)

wherein $R^3$ is $-(-CH_2-)_h-$; $R^4$ is $-(-CH_2-)_i-CH_3$; $R^5$ is $-OH$, $-COOH$, $-CH=CH_2$, $-C(CH_3)=CH_2$ or $-(-CH_2-)_j-CH_3$; $R^6$ is $-(-CH_2-)_k-CH_3$; g and h are an integer from 1 to 15; i, j and k are an integer from 0 to 15; e is an integer from 1 to 50; and f is an integer from 1 to 300;

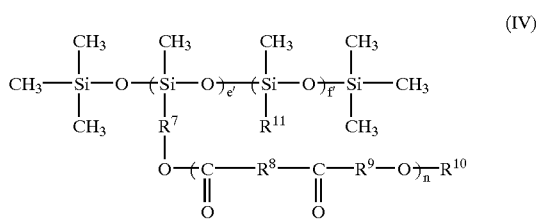

(IV)

wherein $R^7$, $R^8$ and $R^9$ are $-(-CH_2-)_q-$ and may be the same or different; $R^{10}$ is $-OH$, $-COOH$, $-CH=CH_2$, $-C(CH_3)=CH_2$ or $-(-CH_2-)_r-CH_3$; $R^{11}$ is $-(-CH_2-)_s-CH_3$; n and q are an integer from 1 to 15; r and s are an integer from 0 to 15; e' is an integer from 1 to 50; and f' is an integer from 1 to 300; or

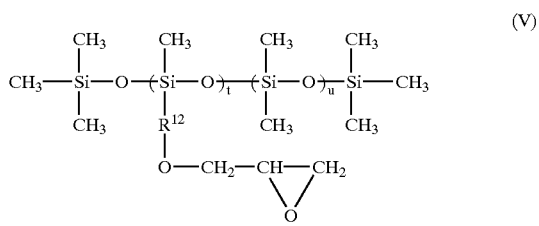

(V)

wherein $R^{12}$ is $-(-CH_2-)_v-$; v is an integer from 1 to 15; t is an integer from 1 to 50; and u is an integer from 1 to 300.

40. Non-magnetic acicular composite particles according to claim 38, wherein said polysiloxanes whose molecular terminal is modified with at least one group selected from the group consisting of carboxylic acid groups, alcohol groups and hydroxyl groups are represented by the general formula (VI):

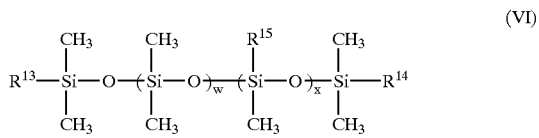

(VI)

wherein $R^{13}$ and $R^{14}$ are $-OH$, $R^{16}OH$ or $R^{17}COOH$ and may be the same or different; $R^{15}$ is $-CH_3$ or $-C_6H_5$; $R^{16}$ and $R^{17}$ are $-(-CH_2-)_y-$; y is an integer from 1 to 15; w is an integer from 1 to 200; and x is an integer from 0 to 100.

41. Non-magnetic acicular composite particles according to claim 33, wherein said alkoxysilane compound is represented by the general formula (I):

$$R^1{}_a SiX_{4-a} \quad (I)$$

wherein $R^1$ is $C_6H_5-$, $(CH_3)_2CHCH_2-$ or $n-C_bH_{2b+1}-$ (wherein b is an integer from 1 to 18); X is $CH_3O-$ or $C_2H_5O-$; and a is an integer from 0 to 3.

42. Non-magnetic acicular composite particles according to claim 41, wherein said alkoxysilane compound is methyltriethoxysilane, dimethyldiethoxysilane, phenyltriethoxysilane, diphenyldiethoxysilane, methyltrimethoxysilane, dimethyldimethoxysilane, phenyltrimethoxysilane, diphenyldimethoxysilane, isobutyltrimethoxysilane or decyltrimethoxysilane.

43. Non-magnetic acicular composite particles according to claim 33, wherein said polysiloxanes are represented by the general formula (II):

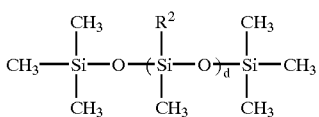

(II)

wherein R² is H— or CH₃—, and d is an integer from 15 to 450.

44. Non-magnetic acicular composite particles according to claim 33, wherein the amount of said coating organosilicon compounds is 0.02 to 5.0% by weight, calculated as Si, based on the total weight of the organosilicon compounds and said acicular iron oxide hydroxide particles.

45. Non-magnetic acicular composite particles according to claim 33, wherein said non-magnetic acicular composite particles have a BET specific surface area value of 35 to 250 m²/g, and a volume resistivity value of not more than $1.0 \times 10^9$ Ω·cm.

46. Non-magnetic acicular composite particles according to claim 33, wherein said non-magnetic acicular composite particles have a L* value of 4.0 to 20.0.

47. Non-magnetic acicular composite particles according to claim 33, wherein said phthalocyanine-based pigment is a phthalocyanine blue pigment and a phthalocyanine green pigment.

48. A process for producing said non-magnetic acicular composite particles defined in claim 18 or 33, which process comprises:
   mixing acicular hematite particles or acicular iron oxide hydroxide particles together with at least one compound selected from the group consisting of:
   (1) alkoxysilane compounds, and
   (2) polysiloxanes or modified polysiloxanes, by using an apparatus capable of applying a shear force to the acicular hematite particles or acicular iron oxide hydroxide particles, thereby coating the surface of said acicular hematite particles or acicular iron oxide hydroxide particles with the said compounds;
   mixing the obtained acicular hematite particles or acicular iron oxide hydroxide particles coated with the said compounds and a phthalocyanine-based pigments in an amount of 1 to 100 parts by weight based on 100 parts by weight of the acicular hematite particles or acicular iron oxide hydroxide particles by using an apparatus capable of applying a shear force to the acicular hematite particles or acicular iron oxide hydroxide particles coated with said compound, thereby forming a phthalocyanine-based pigments coat on the surface of a coating layer comprising the organosilicon compounds.

49. A process for producing non-magnetic acicular composite particles according to claim 48, wherein said acicular hematite particles or iron oxide hydroxide particles have:
   a coating formed on the surface of said acicular hematite particles or iron oxide hydroxide particles, comprising at least one organosilicon compound selected from the group consisting of:
   (1) organosilane compounds obtainable from alkoxysilane compounds, and
   (2) polysiloxanes or modified polysiloxanes, and
   a carbon black coat formed on at least a part of the surface of said coating layer comprising said organosilicon compound, in an amount of 1 to 50 parts by weight based on 100 parts by weight of the said acicular hematite particles or iron oxide hydroxide particles.

50. A process for producing non-magnetic acicular composite particles according to claim 48, wherein said acicular hematite particles or iron oxide hydroxide particles have a coating layer comprising at least one compound selected from the group consisting of hydroxides of aluminum, oxides of aluminum, hydroxides of silicon and oxides of silicon between the surface of said acicular hematite particle or acicular iron oxide hydroxide particle and the coating comprising at least one organosilicon compound.

51. A magnetic recording medium having a gloss of coating film of 170 to 300%, a surface roughness Ra of coating film of not more than 11.5 nm, a linear absorption of coating film of 1.20 to 5.00 $\mu m^{-1}$ and a surface resistivity of not more than $5.0 \times 10^{10}$ Ω/cm², comprising:
   a non-magnetic base film;
   a non-magnetic undercoat layer formed on the non-magnetic base film, comprising non-magnetic acicular composite particles and a binder resin; and
   a magnetic recording layer formed on the non-magnetic undercoat layer, comprising magnetic particles and a binder resin,
   said non-magnetic acicular composite particles having an average major axis diameter of 0.01 to 0.3 $\mu$m and comprising:
      acicular hematite particles or acicular iron oxide hydroxide particles as non-magnetic core particles,
      a coating formed on surface of said acicular hematite particle or acicular iron oxide hydroxide particle, comprising at least one organosilicon compound selected from the group consisting of:
         (1) organosilane compounds obtainable from alkoxysilane compounds, and
         (2) polysiloxanes or modified polysiloxanes, and
      a phthalocyanine-based pigment coat formed on said coating layer comprising said organosilicon compound, in an amount of from 1 to 100 parts by weight based on 100 parts by weight of said acicular hematite particles or acicular iron oxide hydroxide particles.

52. Non-magnetic acicular composite particles for a non-magnetic undercoat layer of a magnetic recording medium, having an average major axis diameter of 0.01 to 0.3 $\mu$m, an aspect ratio of 2.0:1 to 20.0:1, a BET specific surface area of 35 to 250 m²/g and a geometrical standard deviation value of the average major axis diameter of not more than 1.50, comprising:
   acicular hematite particles as non-magnetic core particles,
   a coating formed on surface of said acicular hematite particle, comprising at least one organosilicon compound selected from the group consisting of:
      (1) organosilane compounds obtainable from alkoxysilane compounds, and
      (2) polysiloxanes or modified polysiloxanes, and
   a phthalocyanine-based pigment coat formed on said coating layer comprising said organosilicon compound, in an amount of from 1 to 100 parts by weight based on 100 parts by weight of said acicular hematite particles.

53. Non-magnetic acicular composite particles for a non-magnetic undercoat layer of a magnetic recording medium, having an average major axis diameter of 0.01 to 0.3 μm, an aspect ratio of 2.0:1 to 20.0:1, a BET specific surface area of 35 to 250 m²/g and a geometrical standard deviation value of the average major axis diameter of not more than 1.50, comprising:

acicular iron oxide hydroxide particles as non-magnetic core particles, a coating formed on surface of said acicular iron oxide hydroxide particles, comprising at least one organosilicon compound selected from the group consisting of:

(1) organosilane compounds obtainable from alkoxysilane compounds, and (2) polysiloxanes or modified polysiloxanes, and a phthalocyanine-based pigment coat formed on said coating layer comprising said organosilicon compound, in an amount of from more than 30 to 100 parts by weight based on 100 parts by weight of said acicular iron oxide hydroxide particles.

* * * * *

UNITED STATES PATENT AND TRADEMARK OFFICE
CERTIFICATE OF CORRECTION

PATENT NO.     : 6,667,120 B2
DATED          : December 23, 2003
INVENTOR(S)    : Hayashi et al.

It is certified that error appears in the above-identified patent and that said Letters Patent is hereby corrected as shown below:

<u>Title page,</u>
Item [73], Assignee, "Todyo Kogyo Corporation" should read -- Toda Kogyo Corporation --.

Signed and Sealed this

Eighteenth Day of May, 2004

JON W. DUDAS
*Acting Director of the United States Patent and Trademark Office*